United States Patent
Yang et al.

(10) Patent No.: US 12,412,850 B2
(45) Date of Patent: Sep. 9, 2025

(54) ONE TIME PROGRAMMING MEMORY CELL AND MEMORY ARRAY FOR PHYSICALLY UNCLONABLE FUNCTION TECHNOLOGY AND ASSOCIATED RANDOM CODE GENERATING METHOD

(71) Applicant: eMemory Technology Inc., Hsin-Chu (TW)

(72) Inventors: Tsao-Hsin Yang, Hsinchu County (TW); Ping-Lung Ho, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 131 days.

(21) Appl. No.: 18/411,064

(22) Filed: Jan. 12, 2024

(65) Prior Publication Data

US 2024/0321778 A1    Sep. 26, 2024

Related U.S. Application Data

(60) Provisional application No. 63/453,182, filed on Mar. 20, 2023.

(51) Int. Cl.
*H10B 20/25* (2023.01)
*G06F 21/75* (2013.01)
*G11C 17/16* (2006.01)
*G11C 17/18* (2006.01)
*H01L 23/00* (2006.01)

(52) U.S. Cl.
CPC ............ *H01L 23/573* (2013.01); *G06F 21/75* (2013.01); *G11C 17/16* (2013.01); *G11C 17/18* (2013.01); *H10B 20/25* (2023.02)

(58) Field of Classification Search
CPC ........ H01L 23/573; H01L 23/57; H10B 20/25
USPC .......................................................... 365/96
See application file for complete search history.

(56) References Cited

U.S. PATENT DOCUMENTS

| | | | |
|---|---|---|---|
| 7,280,425 B2 | 10/2007 | Keshavarzi et al. | |
| 9,613,714 B1* | 4/2017 | Wong | G11C 17/16 |
| 2009/0262565 A1* | 10/2009 | Shin | G11C 17/18 |
| | | | 365/189.011 |
| 2010/0301334 A1* | 12/2010 | Nishimura | H01L 22/32 |
| | | | 257/734 |
| 2013/0010518 A1* | 1/2013 | Lu | H10B 20/25 |
| | | | 257/E27.06 |

(Continued)

FOREIGN PATENT DOCUMENTS

| | | |
|---|---|---|
| CA | 2952941 A1 | 7/2017 |
| EP | 3196888 B1 | 12/2019 |

*Primary Examiner* — Muna A Techane
(74) *Attorney, Agent, or Firm* — WPAT, PC

(57) ABSTRACT

An OTP memory cell for a PUFF technology includes a first select transistor, a first antifuse transistor and a second antifuse transistor. A first drain/source terminal of the first select transistor is connected with a bit line. A gate terminal of the first select transistor is connected with a word line. A gate terminal of the first antifuse transistor is connected with a second drain/source terminal of the first select transistor. Two drain/source terminals of the first antifuse transistor are connected with a first antifuse control line. A gate terminal of the second antifuse transistor is connected with a second drain/source terminal of the first select transistor. Two drain/source terminals of the second antifuse transistor are connected with a second antifuse control line.

22 Claims, 23 Drawing Sheets

(56) References Cited

U.S. PATENT DOCUMENTS

| | | | |
|---|---|---|---|
| 2013/0208525 A1* | 8/2013 | Peng | G11C 17/16 |
| | | | 365/96 |
| 2017/0125427 A1* | 5/2017 | Shum | H10D 62/151 |
| 2018/0102909 A1* | 4/2018 | Wu | H04L 9/3278 |
| 2020/0227103 A1* | 7/2020 | Shao | G11C 8/20 |

* cited by examiner

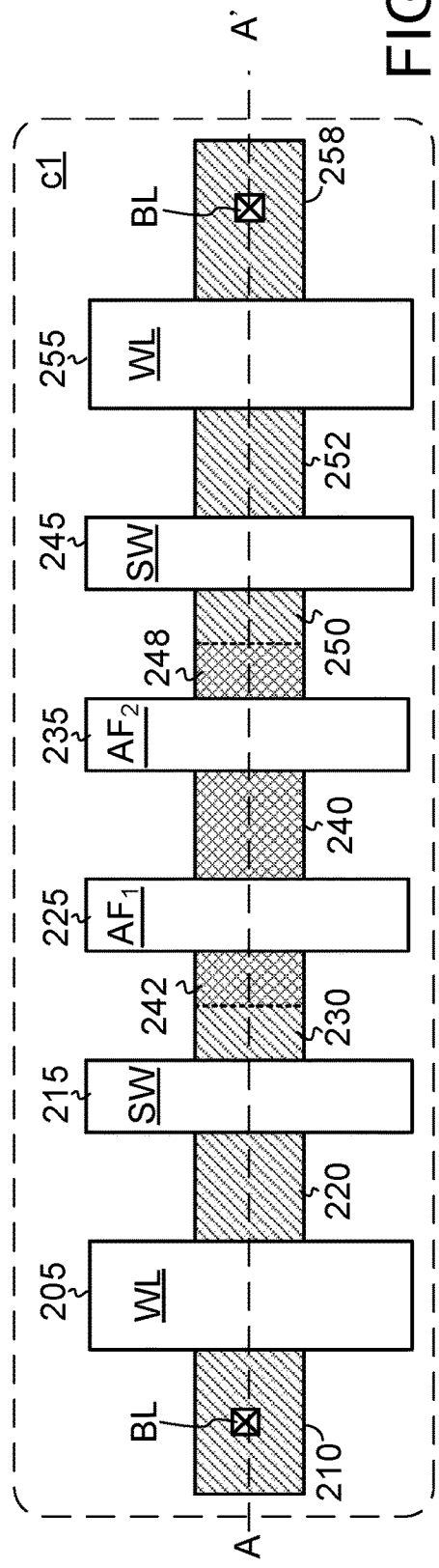
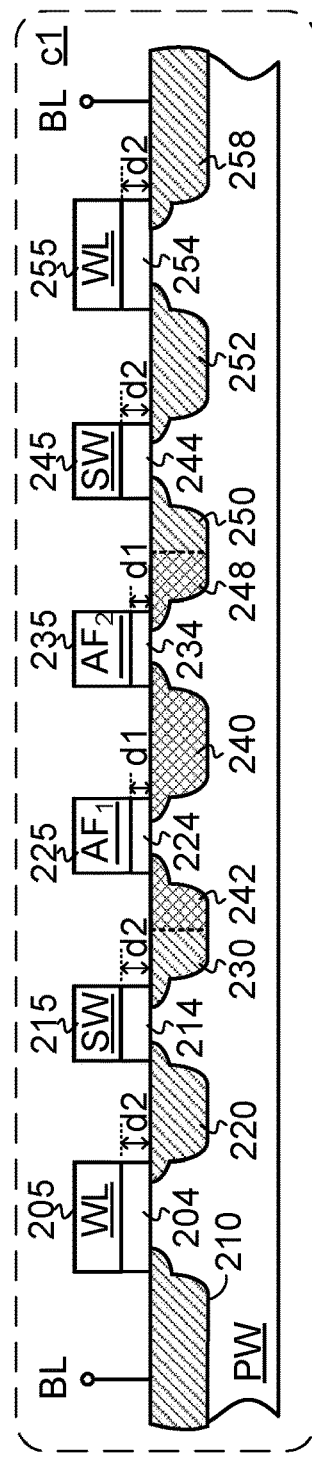
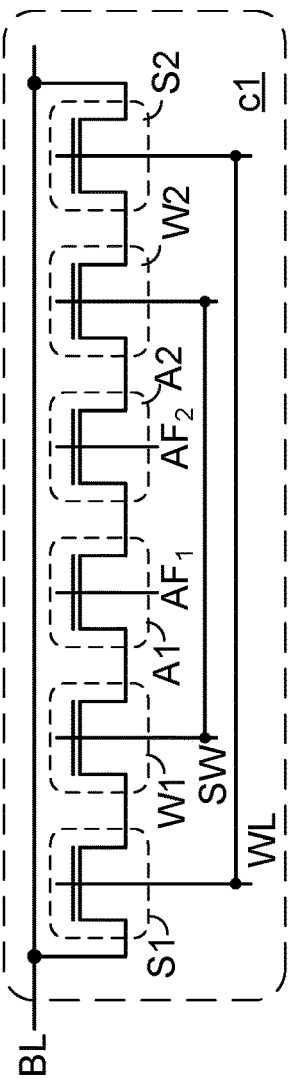
FIG. 6A
FIG. 6B
FIG. 6C

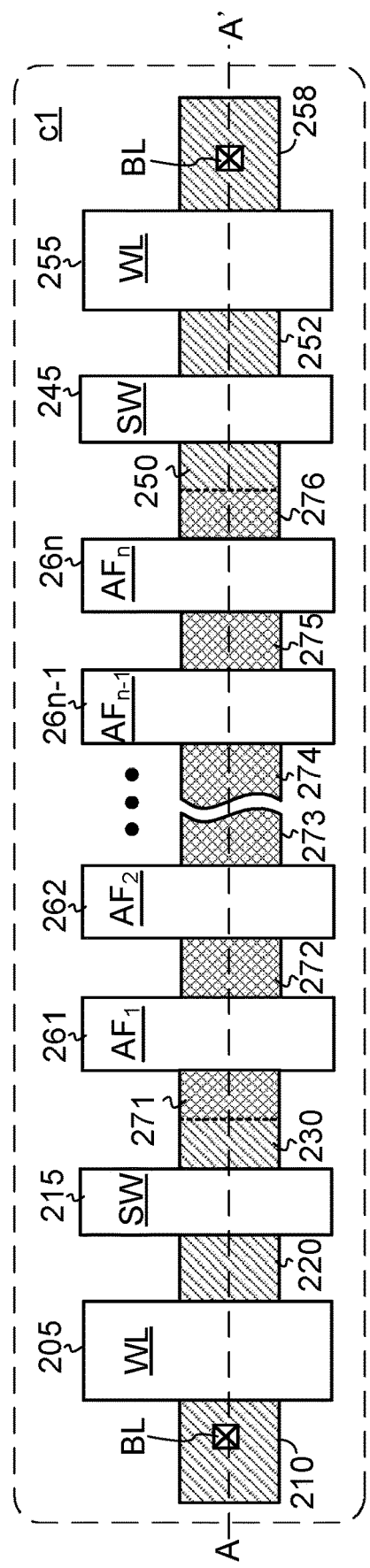
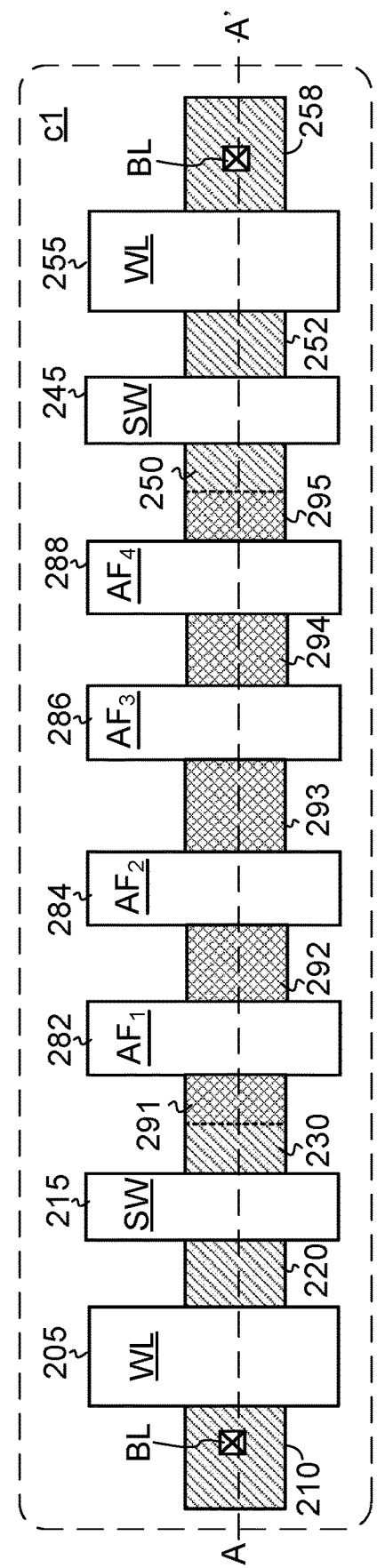

ONE TIME PROGRAMMING MEMORY CELL AND MEMORY ARRAY FOR PHYSICALLY UNCLONABLE FUNCTION TECHNOLOGY AND ASSOCIATED RANDOM CODE GENERATING METHOD

This application claims the benefit of U.S. provisional application Ser. No. 63/453,182, filed Mar. 20, 2023, the subject matters of which are incorporated herein by references.

FIELD OF THE INVENTION

The present invention relates to a memory cell and a memory array, and more particularly to a one time programming memory cell and a memory array for a physically unclonable function (PUF) technology and an associated random generating method.

BACKGROUND OF THE INVENTION

A physically unclonable function (PUF) technology is a novel method for protecting the data of a semiconductor chip. That is, the use of the PUF technology can prevent the data of the semiconductor chip from being stolen. In accordance with the PUF technology, the semiconductor chip is capable of providing a random code. This random code is used as a unique identity code (ID code) of the semiconductor chip to achieve the protecting function.

Generally, the PUF technology acquires the unique random code of the semiconductor chip according to the manufacturing variation of the semiconductor chip. This manufacturing variation includes the semiconductor process variation. That is, even if the PUF semiconductor chip is produced by a precise manufacturing process, the random code cannot be duplicated. Consequently, the semiconductor chip using the PUF technology is suitably used in the applications with high security requirements.

For example, U.S. Pat. No. 9,613,714 B1 disclosed a one time programming memory cell and a memory array for a PUF technology and an associated random code generating method. The present invention provides a novel structure of a one time programming memory cell and a memory array for the PUF technology.

SUMMARY OF THE INVENTION

An embodiment of the present invention provides a memory array for a physically unclonable function technology. The memory array includes a first memory cell. The first memory cell includes a first select transistor, a first antifuse transistor and a second antifuse transistor. A first drain/source terminal of the first select transistor is connected with a first bit line. A gate terminal of the first select transistor is connected with a first word line. A gate terminal of the first antifuse transistor is connected with a second drain/source terminal of the first select transistor. Two drain/source terminals of the first antifuse transistor are connected with a first antifuse control line. A gate terminal of the second antifuse transistor is connected with a second drain/source terminal of the first select transistor. Two drain/source terminals of the second antifuse transistor are connected with a second antifuse control line. When an enroll action is performed, the first memory cell is determined as a selected memory cell, the first select transistor is turned on, and a voltage stress is applied to a gate dielectric layer of the first antifuse transistor and a gate dielectric layer of the second antifuse transistor. Consequently, one of the first antifuse transistor and the second antifuse transistor is changed from a first storage state to a second storage state. When a read action is performed, a random code is determined according to a result of judging whether the first antifuse transistor of the selected memory cell is in the first storage state or the second storage state.

Another embodiment of the present invention provides a memory array for a physically unclonable function technology. The memory array includes a first memory cell. The first memory cell includes a first select transistor and n antifuse transistors. A first drain/source terminal of the first select transistor is connected with the first bit line. A gate terminal of the first select transistor is connected with a first word line. The n antifuse transistors are respectively connected with n antifuse control lines, wherein n is an even number larger than or equal to 4. The n antifuse transistors include a first antifuse transistor, a second antifuse transistor, a third antifuse transistor and a fourth antifuse transistor. A gate terminal of the first antifuse transistor is connected with a second drain/source terminal of the first select transistor. Two drain/source terminals of the first antifuse transistor are connected with a first antifuse control line. A gate terminal of the second antifuse transistor is connected with a second drain/source terminal of the first select transistor. Two drain/source terminals of the second antifuse transistor are connected with a second antifuse control line. A gate terminal of the third antifuse transistor is connected with a second drain/source terminal of the first select transistor. Two drain/source terminals of the third antifuse transistor are connected with a third antifuse control line. A gate terminal of the fourth antifuse transistor is connected with a second drain/source terminal of the first select transistor. Two drain/source terminals of the fourth antifuse transistor are connected with a fourth antifuse control line. When an enroll action is performed, the first select transistor is turned on, a voltage stress is applied to gate dielectric layers of the n antifuse transistors. Consequently, one of the n antifuse transistors is changed from a first storage state to a second storage state. A random code is determined according to the antifuse transistors in the second storage state.

Another embodiment of the present invention provides a one time programming memory cell for a physically unclonable function technology. The one time programming memory includes a first select transistor and n antifuse transistors. A first drain/source terminal of the first select transistor is connected with a bit line. A gate terminal of the first select transistor is connected with a word line. The n antifuse transistors are coupled to a second drain/source terminal of the first select transistor, and gate terminals of the n antifuse transistors are respectively connected with n antifuse control lines, wherein n is an even number larger than or equal to 4. When an enroll action is performed, the first select transistor is turned on, and a voltage stress is applied to gate dielectric layers of the n antifuse transistors. Consequently, one of the n antifuse transistors is changed from a first storage state to a second storage state. A random code is determined according to the antifuse transistor in the second storage state.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 6A is a schematic top view illustrating the OTP memory cell according to a third embodiment of the present invention;

FIG. 6B is a schematic cross-sectional view of the OTP memory cell memory cell of FIG. 6A and taken along a line AA';

FIG. 6C is a schematic equivalent circuit diagram of the OTP memory cell according to the third embodiment of the present invention;

FIG. 7 is a schematic top view illustrating an OTP memory cell according to a fourth embodiment of the present invention;

FIG. 8A is a schematic top view illustrating an OTP memory cell with eight gate structures according to the fourth embodiment of the present invention;

DETAILED DESCRIPTION OF PREFERRED EMBODIMENTS

The present invention provides a one time programming memory cell, which is also referred as an OTP memory cell.

Figure 1A:
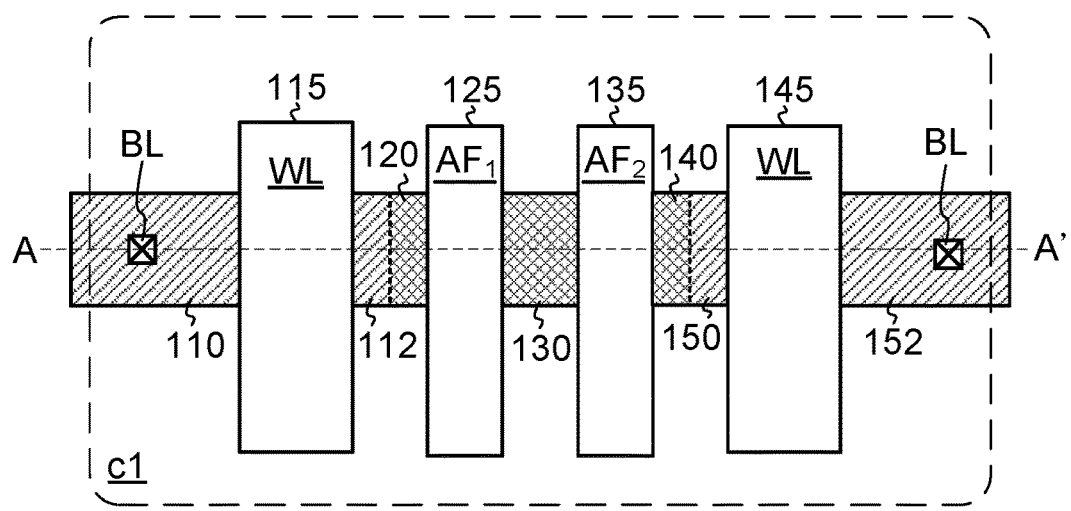
FIG. 1A is a schematic top view illustrating an OTP memory cell according to a first embodiment of the present invention.
Figure 1B:
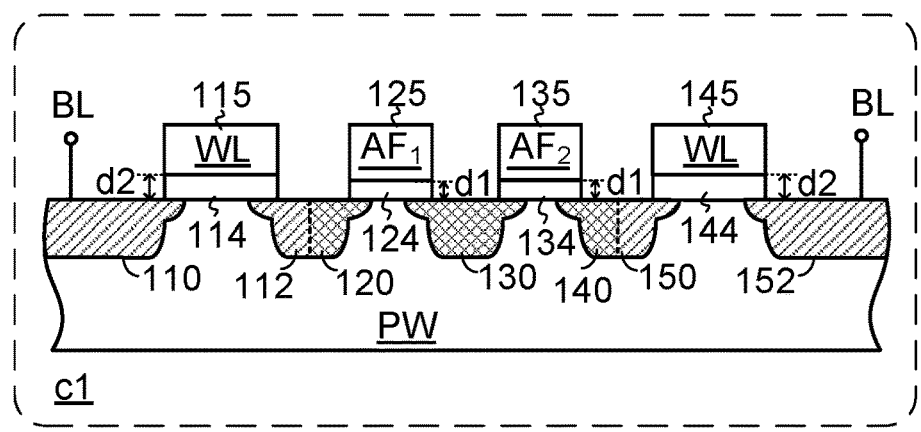
FIG. 1B is a schematic cross-sectional view of the OTP memory cell of FIG. 1A and taken along a line AA'.
Figure 1C:
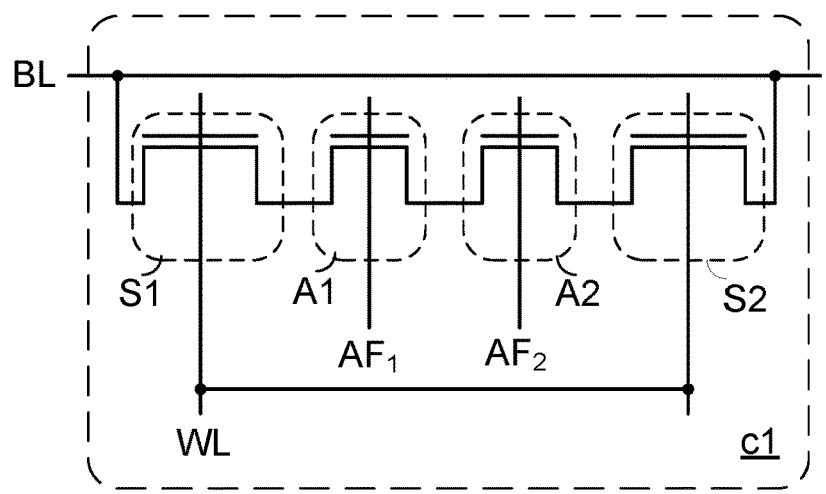
FIG. 1C is a schematic equivalent circuit diagram of the OTP memory cell according to the first embodiment of the present invention.

FIG. 1A is a schematic top view illustrating an OTP memory cell according to a first embodiment of the present invention. FIG. 1B is a schematic cross-sectional view of the OTP memory cell of FIG. 1A and taken along a line AA'. FIG. 1C is a schematic equivalent circuit diagram of the OTP memory cell according to the first embodiment of the present invention.

As shown in FIGS. 1A and 1B, the OTP memory cell c1 is constructed over a P-well region PW. In addition, four gate structures are formed on the surface of the P-well region PW. The first gate structure comprises a gate dielectric layer 114 and a gate layer 115. The second gate structure comprises a gate dielectric layer 124 and a gate layer 125. The third gate structure comprises a gate dielectric layer 134 and a gate layer 135. The fourth gate structure comprises a gate dielectric layer 144 and a gate layer 145.

After plural doping processes are performed, plural N-type doped regions are formed under the surface of the P-well region PW. Among these N-type doped regions, each of the doped regions 110, 112, 150 and 152 has a first dopant concentration, and each of the doped regions 120, 130 and 140 has a second dopant concentration. In the first embodiment, the OTP memory cell c1 is constructed over a P-well region PW. It is noted that numerous modifications and alterations may be made while retaining the teachings of the invention. For example, in a variant example of the second embodiment, the OTP memory cell c1 is constructed over an N-well region, and all doped regions are P-type doped regions.

The first gate structure is arranged between the doped region 110 and the doped region 112. The second gate structure is arranged between the doped region 120 and the doped region 130. The third gate structure is arranged between the doped region 130 and the doped region 140. The fourth gate structure is arranged between the doped region 150 and the doped region 152. In addition, the doped region 112 and the doped region 120 are contacted with each other, and the doped region 140 and the doped region 150 are contacted with each other.

Moreover, the gate layer 115 of the first gate structure is connected with a word line WL of the OTP memory cell c1. The gate layer 125 of the second gate structure is connected with a first antifuse control line $AF_1$ of the OTP memory cell c1. The gate layer 135 of the third gate structure is connected with a second antifuse control line $AF_2$ of the OTP memory cell c1. The gate layer 145 of the fourth gate structure is connected with the word line WL of the OTP memory cell c1. In addition, the doped regions 110 and 152 are connected with a bit line BL.

In this embodiment, the doped region 110, the doped region 112 and the first gate structure are collaboratively formed as a first select transistor S1. The doped region 120, the doped region 130 and the second gate structure are collaboratively formed as a first antifuse transistor A1. The doped region 130, the doped region 140 and the third gate structure are collaboratively formed as a second antifuse transistor A2. The doped region 150, the doped region 152 and the fourth gate structure are collaboratively formed as a second select transistor S2.

Please refer to FIG. 1C. The first drain/source terminal of the first select transistor S1 is connected with the bit line BL. The gate terminal of the first select transistor S1 is connected with the word line WL. The first drain/source terminal of the first antifuse transistor A1 is connected with the second drain/source terminal of the first select transistor S1. The gate terminal of the first antifuse transistor A1 is connected with the first antifuse control line $AF_1$. The first drain/source terminal of the second antifuse transistor A2 is connected with the second drain/source terminal of the first antifuse transistor A1. The gate terminal of the second antifuse transistor A2 is connected with the second antifuse control line $AF_2$. The first drain/source terminal of the second select transistor S2 is connected with the second drain/source terminal of the second antifuse transistor A2. The gate terminal of the second select transistor S2 is connected with the word line WL. The second drain/source terminal of the second select transistor S2 is connected with the bit line BL.

In this embodiment, the OTP memory cell c1 comprises two storing circuits. That is, the first antifuse transistor A1 is a first storing circuit, and the second antifuse transistor A2 is a second storing circuit. By providing proper bias voltages, an enroll action or a read action is selectively performed on the OTP memory cell c1. During the enroll action of the OTP memory cell c1, a high voltage stress is applied to both of the first antifuse transistor A1 and the second antifuse transistor A2. Under this circumstance, one of the gate dielectric layers 124 and 134 of the antifuse transistors A1 and A2 is ruptured. Consequently, the storage state is changed from a first storage state to a second storage state. For example, the first storage state is an unruptured state and the second storage state is a ruptured state.

When the read action is performed on the OTP memory cell c1, a random code for the PUF technology can be determined according to the result of judging whether the first antifuse transistor A1 is in the ruptured state or the unruptured state. For example, in case that the first antifuse transistor A1 is in the ruptured state, a first logic value, such as "1", is determined as the random code. Whereas, in case that the first antifuse transistor A1 is in the unruptured state, a second logic value, such as "0", is determined as the random code. In the following description, the first logic value is represented by the logic value "1", and the second logic value is represented by the logic value "0".

As mentioned above, in this embodiment, each of the doped regions 110, 112, 150 and 152 has the first dopant concentration, and the doped regions 120, 130 and 140 has the second dopant concentration. The first dopant concentration is higher than, lower than or equal to the second dopant concentration. Moreover, each of the gate dielectric layer 124 of the second gate structure and the gate dielectric layer 134 of the third gate structure has a thickness d1, and each of the gate dielectric layer 114 of the first gate structure and the gate dielectric layer 144 of the fourth gate structure has a thickness d2. The thickness d1 is smaller than or equal to the thickness d2.

In other words, the gate dielectric layer 124 of the second gate structure and the gate dielectric layer 134 of the third gate structure are thinner. When the OTP memory cell c1 is subjected to the enroll action, one of the gate dielectric layers 124 and 134 of the first antifuse transistor A1 and the second antifuse transistor A2 can be ruptured more easily. Consequently, the enrolling efficiency is enhanced.

Figure 2:
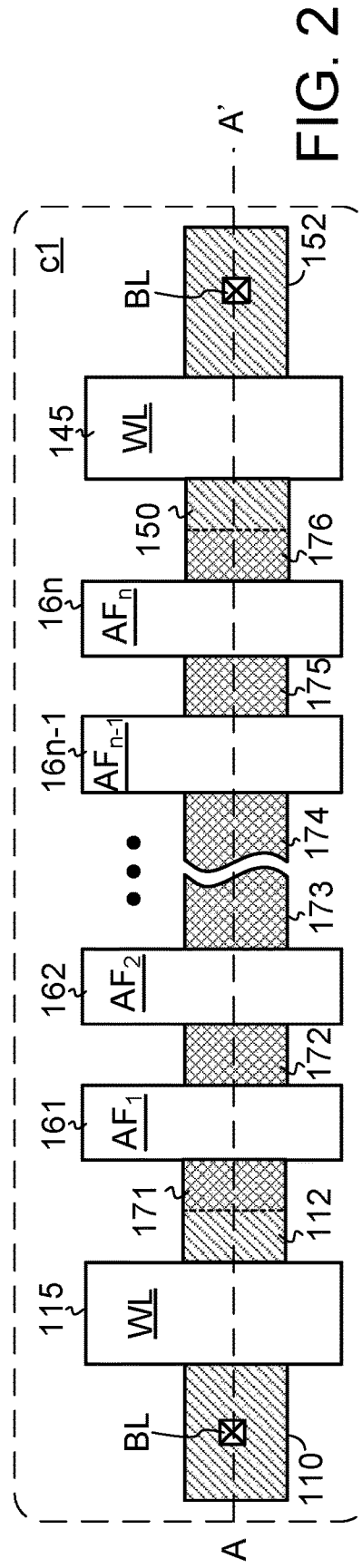
FIG. 2 is a schematic top view illustrating an OTP memory cell according to a second embodiment of the present invention.

FIG. 2 is a schematic top view illustrating an OTP memory cell according to a second embodiment of the present invention. In comparison with the first embodiment of FIG. 1A, the OTP memory cell c1 of this embodiment is equipped with more gate structures. As shown in FIG. 2, the gate layers 161~16n of the n gate structures are respectively connected with the corresponding n antifuse control lines $AF_1$~$AF_n$, and n is an even number larger than or equal to 4. In other words, the OTP memory cell c1 comprises (n+2) gate structures. For illustration, the number n in the following embodiment of the OTP memory cell c1 is 4. That is, the OTP memory cell c1 comprises six gate structures.

Figure 3A:
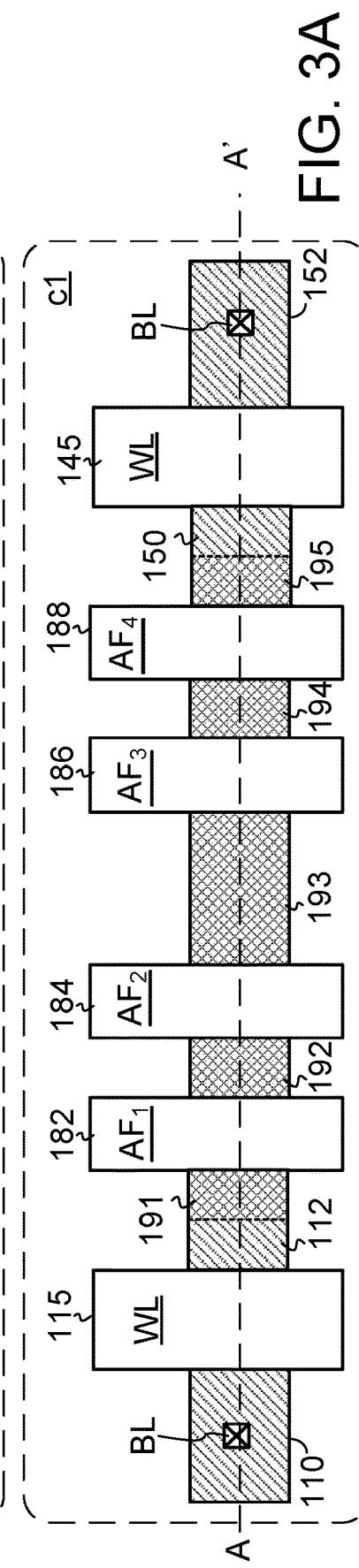
FIG. 3A is a schematic top view illustrating the OTP memory cell with the six gate structures according to the second embodiment of the present invention.
Figure 3B:
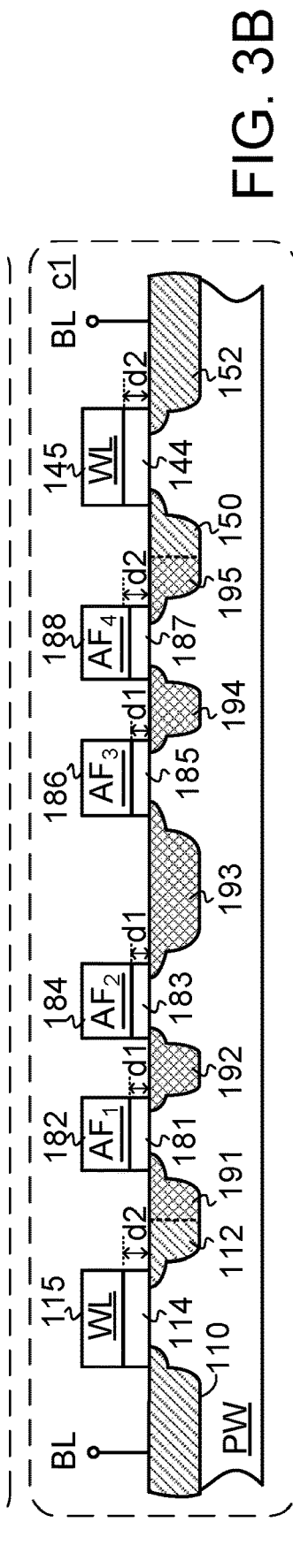
FIG. 3B is a schematic cross-sectional view of the OTP memory cell memory cell of FIG. 3A and taken along a line AA'.
Figure 3C:
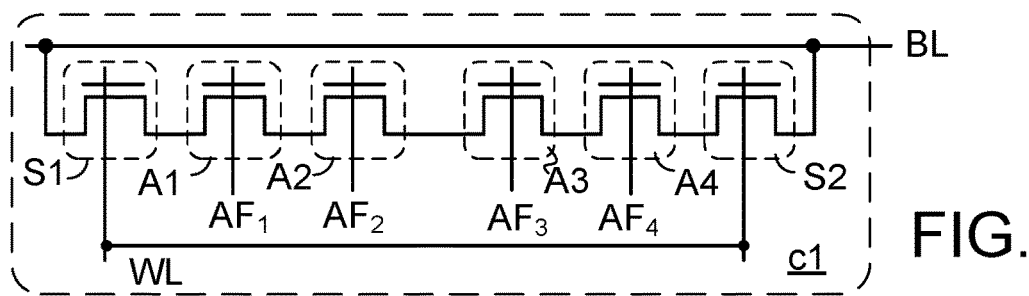
FIG. 3C is a schematic equivalent circuit diagram of the OTP memory cell according to the second embodiment of the present invention.

FIG. 3A is a schematic top view illustrating the OTP memory cell with the six gate structures according to the second embodiment of the present invention. FIG. 3B is a schematic cross-sectional view of the OTP memory cell memory cell of FIG. 3A and taken along a line AA'. FIG. 3C is a schematic equivalent circuit diagram of the OTP memory cell according to the second embodiment of the present invention.

As shown in FIGS. 3A and 3B, the OTP memory cell c1 is constructed over a P-well region PW. In addition, six gate structures are formed on the surface of the P-well region PW. The first gate structure comprises a gate dielectric layer 114 and a gate layer 115. The second gate structure comprises a gate dielectric layer 181 and a gate layer 182. The third gate structure comprises a gate dielectric layer 183 and a gate layer 184. The fourth gate structure comprises a gate dielectric layer 185 and a gate layer 186. The fifth gate structure comprises a gate dielectric layer 187 and a gate layer 188. The sixth gate structure comprises a gate dielectric layer 144 and a gate layer 145.

After plural doping processes are performed, plural N-type doped regions are formed under the surface of the P-well region PW. Among these N-type doped regions, each of the doped regions 110, 112, 150 and 152 has a first dopant concentration, and each of the doped regions 191, 192, 193, 194 and 195 has a second dopant concentration. It is noted that numerous modifications and alterations may be made while retaining the teachings of the invention. For example, in a variant example of the second embodiment, the OTP memory cell c1 is constructed over an N-well region, and all doped regions are P-type doped regions.

The first gate structure is arranged between the doped region 110 and the doped region 112. The second gate structure is arranged between the doped region 191 and the doped region 192. The third gate structure is arranged between the doped region 192 and the doped region 193. The fourth gate structure is arranged between the doped region 193 and the doped region 194. The fifth gate structure is arranged between the doped region 194 and the doped region 195. The sixth gate structure is arranged between the doped region 150 and the doped region 152. In addition, the doped region 112 and the doped region 191 are contacted with each other, and the doped region 195 and the doped region 150 are contacted with each other.

Moreover, the gate layer 115 of the first gate structure is connected with a word line WL of the OTP memory cell c1. The gate layer 182 of the second gate structure is connected with a first antifuse control line $AF_1$ of the OTP memory cell c1. The gate layer 184 of the third gate structure is connected with a second antifuse control line $AF_2$ of the OTP memory cell c1. The gate layer 186 of the fourth gate structure is connected with a third antifuse control line $AF_3$ of the OTP memory cell c1. The gate layer 188 of the fifth gate structure is connected with a fourth antifuse control line $AF_4$ of the OTP memory cell c1. The gate layer 145 of the sixth gate structure is connected with the word line WL of the OTP memory cell c1. In addition, the doped regions 110 and 152 are connected with a bit line BL.

In this embodiment, the doped region 110, the doped region 112 and the first gate structure are collaboratively formed as a first select transistor S1. The doped region 191, the doped region 192 and the second gate structure are collaboratively formed as a first antifuse transistor A1. The doped region 192, the doped region 193 and the third gate structure are collaboratively formed as a second antifuse transistor A2. The doped region 193, the doped region 194 and the fourth gate structure are collaboratively formed as a third antifuse transistor A3. The doped region 194, the doped region 195 and the fifth gate structure are collaboratively formed as a fourth antifuse transistor A4. The doped region 150 and the doped region 152 and the sixth gate structure are collaboratively formed as a second select transistor S2.

Please refer to FIG. 3C. The first drain/source terminal of the first select transistor S1 is connected with the bit line BL. The gate terminal of the first select transistor S1 is connected with the word line WL. The first drain/source terminal of the first antifuse transistor A1 is connected with the second drain/source terminal of the first select transistor S1. The gate terminal of the first antifuse transistor A1 is connected with the first antifuse control line $AF_1$. The first drain/source terminal of the second antifuse transistor A2 is connected with the second drain/source terminal of the first antifuse transistor A1. The gate terminal of the second antifuse transistor A2 is connected with the second antifuse control line $AF_2$. The first drain/source terminal of the third antifuse transistor A3 is connected with the second drain/source terminal of the second antifuse transistor A2. The gate terminal of the third antifuse transistor A3 is connected with the third antifuse control line $AF_3$. The first drain/source terminal of the fourth antifuse transistor A4 is connected with the second drain/source terminal of the third antifuse transistor A3. The gate terminal of the fourth antifuse transistor A4 is connected with the fourth antifuse control line $AF_4$. The first drain/source terminal of the second select transistor S2 is connected with the second drain/source terminal of the fourth antifuse transistor A4. The gate terminal of the second select transistor S2 is connected with the word line WL. The second drain/source terminal of the second select transistor S2 is connected with the bit line BL.

In this embodiment, the OTP memory cell c1 comprises four storing circuits. That is, the first antifuse transistor A1 is a first storing circuit, the second antifuse transistor A2 is a second storing circuit, the third antifuse transistor A3 is a third storing circuit, and the fourth antifuse transistor A4 is a fourth storing circuit. By providing proper bias voltages, an enroll action or a read action is selectively performed on the OTP memory cell c1. During the enroll action of the OTP memory cell c1, a high voltage stress is applied to all of the first antifuse transistor A1, the second antifuse transistor A2, the third antifuse transistor A3 and the fourth antifuse transistor A4. Under this circumstance, one of the gate dielectric layers 181, 183, 185 and 187 of the antifuse transistors A1, A2, A3 and A4 is ruptured. Consequently, the storage state is changed.

In this embodiment, the OTP memory cell c1 comprises the four antifuse transistors A1, A2, A3 and A4. After one or plural read actions are performed on the OTP memory cell c1, a one-bit random code or a multi-bit random code is generated. The reasons will be described as follows in brief.

FIGS. 4A~4D schematically illustrate a first scenario when an enroll action and a read action are performed on the OTP memory cell for the PUF technology according to the second embodiment of the present invention.

Figure 4A:
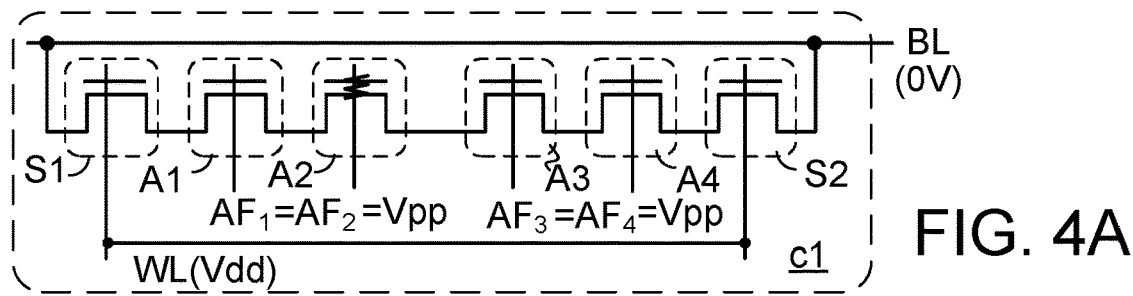
FIGS. 4A~4D schematically illustrate a first scenario when an enroll action and a read action are performed on the OTP memory cell for the PUF technology according to the second embodiment of the present invention.
Figure 4B:
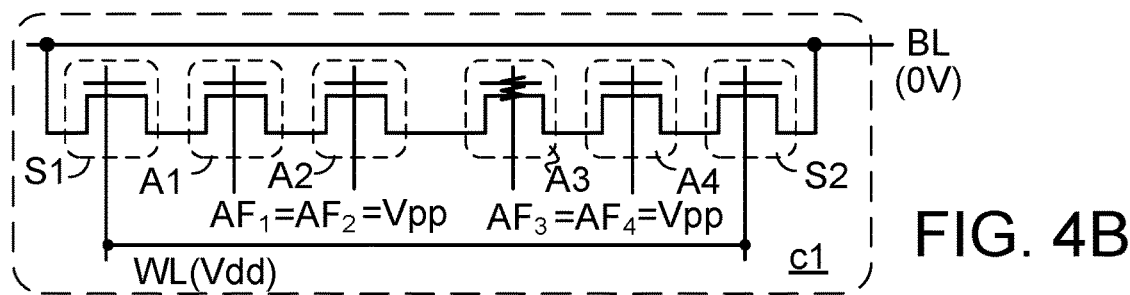

Please refer to FIGS. 4A and 4B. When the enroll action is performed, a ground voltage (0V) is provided to the bit line BL, a select voltage Vdd is provided to the word line WL, and an enroll voltage Vpp is provided to the first antifuse control line $AF_1$, the second antifuse control line $AF_2$, the third antifuse control line $AF_3$ and the fourth antifuse control line $AF_4$. For example, the select voltage Vdd is in the range between 0.75V and (2Vpp/3), and the enroll voltage Vpp is in the range between 3.6V and 11V.

When the word line WL receives the select voltage Vdd and the bit line BL receives the ground voltage, the first select transistor S1 and the second select transistor S2 are turned on. Consequently, a voltage stress is applied to the gate dielectric layers of the first antifuse transistor A1, the second antifuse transistor A2, the third antifuse transistor A3 and the fourth antifuse transistor A4. Since the enroll voltage Vpp is beyond the withstanding voltage range of the gate dielectric layer, the gate dielectric layer of one of the first antifuse transistor A1, the second antifuse transistor A2, the third antifuse transistor A3 and the fourth antifuse transistor A4 is ruptured. The ruptured gate dielectric layer is in a ruptured state corresponding to the low resistance value.

Due to the process variation of the OTP memory cell c1, the gate dielectric layer of which antifuse transistor is ruptured during the enroll action cannot be realized. Consequently, the OTP memory cell c1 can utilize the PUF technology. In a situation, when the OTP memory cell c1 in FIG. 4A is subjected to the enroll action, the gate dielectric layer of the second antifuse transistor A2 is ruptured, but the gate dielectric layers of the other antifuse transistors A1, A3 and A4 are not ruptured. In another situation, when the OTP memory cell c1 in FIG. 4B is subjected to the enroll action, the gate dielectric layer of the third antifuse transistor A3 is ruptured, but the gate dielectric layers of the other antifuse transistors A1, A2 and A4 are not ruptured.

After the enroll action on the OTP memory cell c1 is completed, a read action is performed to confirm a one-bit random code. Please refer to FIGS. 4C and 4D. When the read action is performed, the ground voltage (0V) is provided to the bit line BL, the select voltage Vdd is provided to the word line WL, a read voltage Vr is provided to the first antifuse control line $AF_1$ and the second antifuse control line $AF_2$, and the ground voltage (0V) is provided to the third antifuse control line $AF_3$ and the third antifuse control line $AF_4$. In an embodiment, the read voltage Vr is in the range between 0.75V and 3.6V.

Figure 4C:
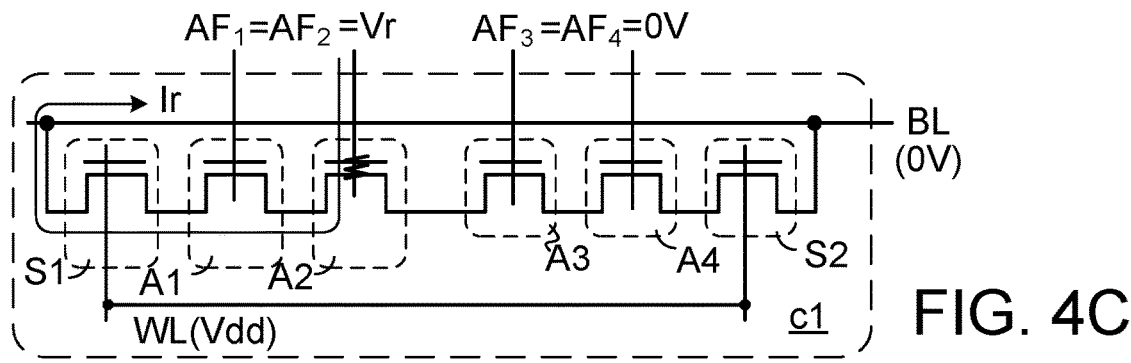

In the situation of FIG. 4C, the gate dielectric layer of the second antifuse transistor A2 is ruptured. Consequently, a larger read current Ir flows from the second antifuse control line $AF_2$ to the bit line BL through the gate dielectric layer of the second antifuse transistor A2, the first antifuse transistor A1 and the first select transistor S1. Since the read current Ir flowing to the bit line BL has the larger current value, it is confirmed that one of the first antifuse transistor A1 and the second antifuse transistor A2 is in the ruptured state corresponding to the low resistance value. In addition, the logic value "1" is determined as the one-bit random code.

Figure 4D:
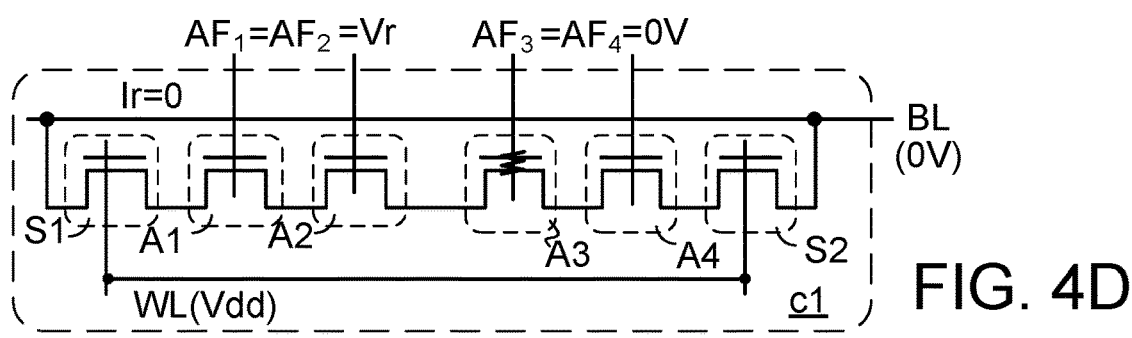

In the situation of FIG. 4D, the gate dielectric layers of both of the first antifuse transistor A1 and the second antifuse transistor A2 are not ruptured. Since the read current Ir on the bit line BL is very low (e.g., nearly zero), it is confirmed that both of the first antifuse transistor A1 and the second antifuse transistor A2 are in the unruptured state corresponding to the high resistance value. In addition, the logic value "0" is determined as the one-bit random code.

Please refer to FIGS. 4C and 4D again. In the second embodiment, the four antifuse transistors A1, A2, A3 and A4 in the OTP memory cell c1 are classified into two groups. Each group contains two antifuse transistors. If one of the two antifuse transistors in the first group is confirmed to be in the ruptured state, the logic value "1" is determined as the one-bit random code. Whereas, if both of the two antifuse transistors in the first group is confirmed to be in the unruptured state, the logic value "0" is determined as the one-bit random code.

Similarly, in case that the OTP memory cell c1 comprises n antifuse transistors, these n antifuse transistors are classified into two groups. Each group contains (n/2) antifuse transistors. If the antifuse transistor in the ruptured state belongs to the first group, it means that one of the antifuse transistors in the first group is in the ruptured state. Under this circumstance, the logic value "1" is determined as the one-bit random code. Whereas, if the antifuse transistor in the ruptured state does not belong to the first group, it means that all of the antifuse transistors in the first group are in the unruptured state. Under this circumstance, the logic value "0" is determined as the one-bit random code.

FIGS. 5A~5E schematically illustrate a second scenario when an enroll action and plural read actions are performed on the OTP memory cell for the PUF technology according to the second embodiment of the present invention.

Figure 5A:
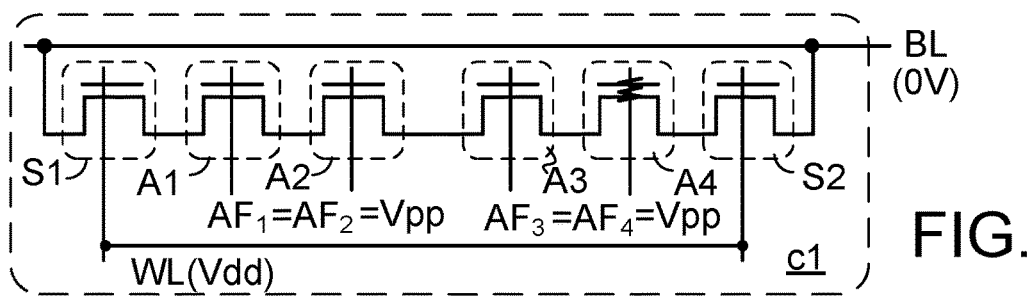
FIGS. 5A~5E schematically illustrate a second scenario when an enroll action and plural read actions are performed on the OTP memory cell for the PUF technology according to the second embodiment of the present invention.
Figure 5B:
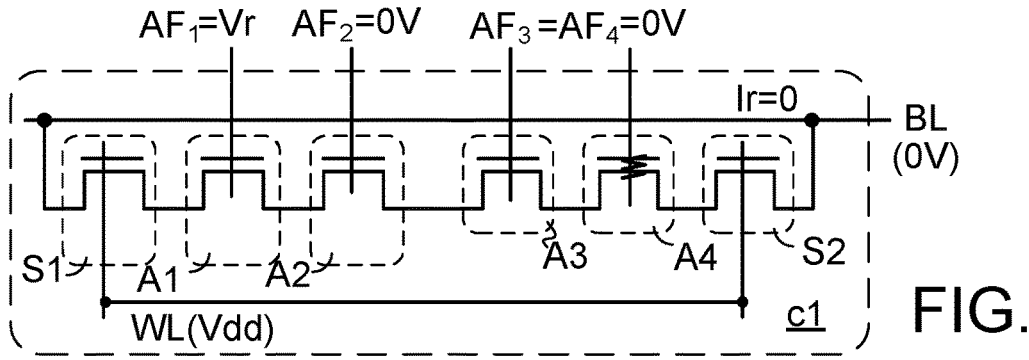

Please refer to FIG. 5A. When the enroll action is performed, a ground voltage (0V) is provided to the bit line BL, a select voltage Vdd is provided to the word line WL, and an enroll voltage Vpp is provided to the first antifuse control line $AF_1$, the second antifuse control line $AF_2$, the third antifuse control line $AF_3$ and the fourth antifuse control line $AF_4$. For example, the select voltage Vdd is in the range between 0.75V and (2Vpp/3), and the enroll voltage Vpp is in the range between 3.6V and 11V.

When the word line WL receives the select voltage Vdd and the bit line BL receives the ground voltage, the first select transistor S1 and the second select transistor S2 are turned on. Consequently, a voltage stress is applied to the gate dielectric layers of the first antifuse transistor A1, the second antifuse transistor A2, the third antifuse transistor A3 and the fourth antifuse transistor A4. Since the enroll voltage Vpp is beyond the withstanding voltage range of the gate dielectric layer, the gate dielectric layer of one of the first antifuse transistor A1, the second antifuse transistor A2, the third antifuse transistor A3 and the fourth antifuse transistor A4 is ruptured. The ruptured gate dielectric layer is in a ruptured state corresponding to the low resistance value.

Due to the process variation of the OTP memory cell c1, the gate dielectric layer of which antifuse transistor is ruptured during the enroll action cannot be realized. Consequently, the OTP memory cell c1 can utilize the PUF technology. For example, when the OTP memory cell c1 in FIG. 5A is subjected to the enroll action, the gate dielectric layer of the fourth antifuse transistor A4 is ruptured, but the gate dielectric layers of the other antifuse transistors A1, A2 and A3 are not ruptured.

After the enroll action on the OTP memory cell c1 is completed, plural read actions are performed to confirm a multi-bit random code. Please refer to FIG. 5B. When a first read action is performed, the ground voltage (0V) is provided to the bit line BL, the select voltage Vdd is provided to the word line WL, a read voltage Vr is provided to the first antifuse control line $AF_1$, and the ground voltage (0V) is provided to the second antifuse control line $AF_2$, the third antifuse control line $AF_3$ and the third antifuse control line $AF_4$. Since the read current Ir on the bit line BL is very low (e.g., nearly zero), it is confirmed that the first antifuse transistor A1 is in the unruptured state corresponding to the high resistance value.

Figure 5C:
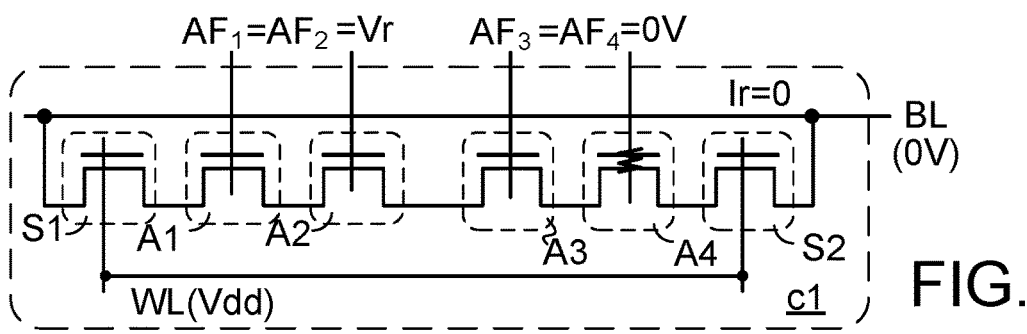

Please refer to FIG. 5C. When a second read action is performed, the ground voltage (0V) is provided to the bit line BL, the select voltage Vdd is provided to the word line WL, the read voltage Vr is provided to the first antifuse control line $AF_1$ and the second antifuse control line $AF_2$, and the ground voltage (0V) is provided to the third antifuse control line $AF_3$ and the third antifuse control line $AF_4$. Since the read current Ir on the bit line BL is very low (e.g., nearly zero), it is confirmed that both of the first antifuse transistor A1 and the second antifuse transistor A2 are in the unruptured state corresponding to the high resistance value.

Figure 5D:
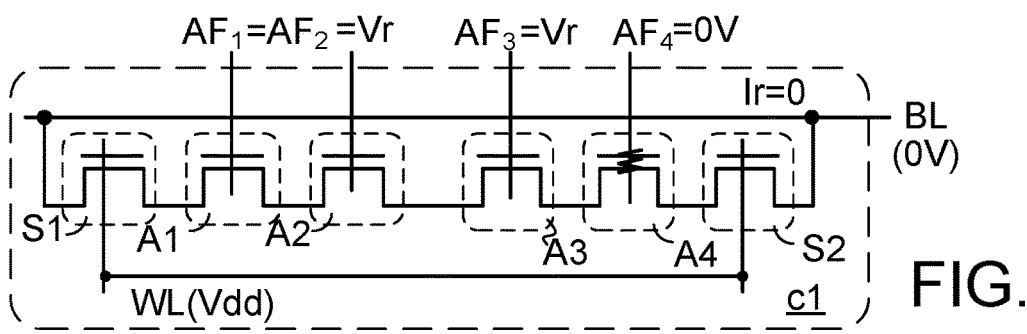

Please refer to FIG. 5D. When a third read action is performed, the ground voltage (0V) is provided to the bit line BL, the select voltage Vdd is provided to the word line WL, the read voltage Vr is provided to the first antifuse control line $AF_1$, the second antifuse control line $AF_2$ and the third antifuse control line $AF_3$, and the ground voltage (0V) is provided to the third antifuse control line $AF_4$. Since the read current Ir on the bit line BL is very low (e.g., nearly zero), it is confirmed that all of the first antifuse transistor A1, the second antifuse transistor A2 and the third antifuse transistor A3 are in the unruptured state corresponding to the high resistance value.

Figure 5E:
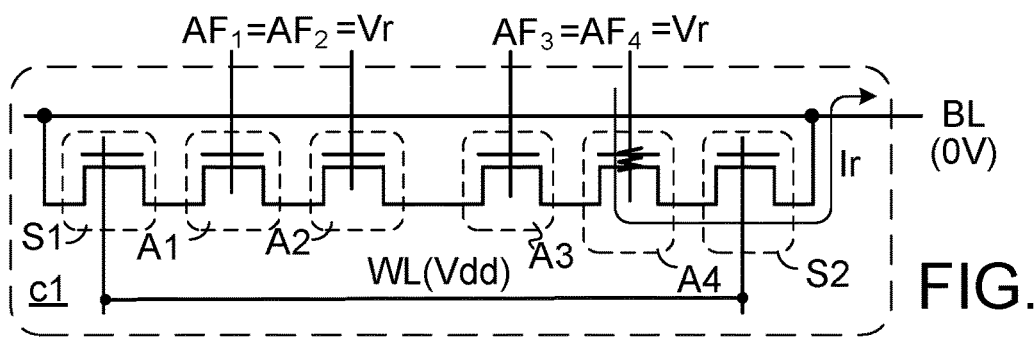

Please refer to FIG. 5E. When a fourth read action is performed, the ground voltage (0V) is provided to the bit line BL, the select voltage Vdd is provided to the word line WL, and the read voltage Vr is provided to the first antifuse control line $AF_1$, the second antifuse control line $AF_2$, the third antifuse control line $AF_3$ and the third antifuse control line $AF_4$. Under this circumstance, the read current Ir on the bit line BL has the larger current value. Since the results of the previous three read actions indicate that all of the antifuse transistors A1, A2 and A3 are in the unruptured state, it is confirmed that the fourth antifuse transistor A4 is in the ruptured state corresponding to the low resistance value. In addition, the two-bit logic value "11" is determined as the random code.

As mentioned in the implementation examples of FIGS. 5B, 5C, 5D and 5E, the random code is determined according to the result of judging which antifuse transistor is in the ruptured state after plural read actions are performed. If the first antifuse transistor A1 is in the ruptured state, the two-bit logic value "00" is determined as the random code. If the second antifuse transistor A2 is in the ruptured state, the two-bit logic value "01" is determined as the random code. If the third antifuse transistor A3 is in the ruptured state, the two-bit logic value "10" is determined as the random code. If the fourth antifuse transistor A4 is in the ruptured state, the two-bit logic value "11" is determined as the random code.

For example, the OTP memory cell c1 comprises n antifuse transistors, wherein $n=2^X$. After plural read actions are completed, an X-bit random code is generated.

As mentioned above, in the OTP memory cell c1 of FIG. 3B, each of the doped regions 110, 112, 150 and 152 has the first dopant concentration, and the doped regions 191, 192, 193, 194 and 195 has the second dopant concentration. The first dopant concentration is higher than, lower than or equal to the second dopant concentration. In an embodiment, each of the gate dielectric layer 181 of the second gate structure, the gate dielectric layer 183 of the third gate structure, the gate dielectric layer 185 of the fourth gate structure and the gate dielectric layer 187 of the fifth gate structure has a thickness d1, and each of the gate dielectric layer 114 of the first gate structure and the gate dielectric layer 144 of the sixth gate structure has a thickness d2. The thickness d1 is smaller than or equal to the thickness d2.

In other words, the gate dielectric layer 181 of the second gate structure, the gate dielectric layer 183 of the third gate structure, the gate dielectric layer 185 of the fourth gate structure and the gate dielectric layer 187 of the fifth gate structure are thinner. Consequently, when the OTP memory cell c1 is subjected to the enroll action, one of the gate dielectric layers 181, 183, 185 and 187 of the first antifuse transistor A1, the second antifuse transistor A2, the third antifuse transistor A3 and the fourth antifuse transistor A4 can be ruptured more easily. Consequently, the enrolling efficiency is enhanced.

FIG. 6A is a schematic top view illustrating the OTP memory cell according to a third embodiment of the present invention. FIG. 6B is a schematic cross-sectional view of the OTP memory cell memory cell of FIG. 6A and taken along a line AA'. FIG. 6C is a schematic equivalent circuit diagram of the OTP memory cell according to the third embodiment of the present invention.

Please refer to FIGS. 6A and 6B. The OTP memory cell c1 is constructed over a P-well region PW. In addition, six gate structures are formed on the surface of the P-well region PW. The first gate structure comprises a gate dielectric layer 204 and a gate layer 205. The second gate structure comprises a gate dielectric layer 214 and a gate layer 215. The third gate structure comprises a gate dielectric layer 224 and a gate layer 225. The fourth gate structure comprises a gate dielectric layer 234 and a gate layer 235. The fifth gate structure comprises a gate dielectric layer 244 and a gate layer 245. The sixth gate structure comprises a gate dielectric layer 254 and a gate layer 255.

After plural doping processes are performed, plural N-type doped regions are formed under the surface of the P-well region PW. Among these N-type doped regions, each of the doped regions 210, 220, 230, 250, 252 and 258 has a first dopant concentration, and each of the doped regions 242, 240 and 248 has a second dopant concentration. It is noted that numerous modifications and alterations may be made while retaining the teachings of the invention. For example, in a variant example of the third embodiment, the OTP memory cell c1 is constructed over an N-well region, and all doped regions are P-type doped regions.

The first gate structure is arranged between the doped region 210 and the doped region 220. The second gate structure is arranged between the doped region 220 and the doped region 230. The third gate structure is arranged between the doped region 242 and the doped region 240. The fourth gate structure is arranged between the doped region 240 and the doped region 248. The fifth gate structure is arranged between the doped region 250 and the doped region 252. The sixth gate structure is arranged between the doped region 252 and the doped region 258. In addition, the doped region 230 and the doped region 242 are contacted with each other, and the doped region 248 and the doped region 250 are contacted with each other.

Moreover, the gate layer 205 of the first gate structure is connected with a word line WL of the OTP memory cell c1. The gate layer 255 of the sixth gate structure is connected with the word line WL of the OTP memory cell c1. The gate layer 215 of the second gate structure is connected with a switch control line SW of the OTP memory cell c1. The gate layer 245 of the fifth gate structure is connected with the switch control line SW of the OTP memory cell c1. The gate layer 225 of the third gate structure is connected with a first antifuse control line $AF_1$ of the OTP memory cell c1. The gate layer 235 of the fourth gate structure is connected with a second antifuse control line $AF_2$ of the OTP memory cell c1. In addition, the doped regions 210 and 258 are connected with a bit line BL.

In this embodiment, the doped region 210, the doped region 220 and the first gate structure are collaboratively formed as a first select transistor S1. The doped region 220, the doped region 230 and the second gate structure are collaboratively formed as a first switch transistor W1. The doped region 242, the doped region 240 and the third gate structure are collaboratively formed as a first antifuse transistor A1. The doped region 240, the doped region 248 and the fourth gate structure are collaboratively formed as a second antifuse transistor A2. The doped region 250, the doped region 252 and the fifth gate structure are collaboratively formed as a second switch transistor W2. The doped region 252 and the doped region 258 and the sixth gate structure are collaboratively formed as a second select transistor S2.

Please refer to FIG. 6C again. The first drain/source terminal of the first select transistor S1 is connected with the bit line BL. The gate terminal of the first select transistor S1 is connected with the word line WL. The first drain/source terminal of the first switch transistor W1 is connected with the second drain/source terminal of the first select transistor S1. The gate terminal of the first switch transistor W1 is connected with the switch control line SW. The first drain/source terminal of the first antifuse transistor A1 is connected with the second drain/source terminal of the first switch transistor W1. The gate terminal of the first antifuse transistor A1 is connected with the first antifuse control line $AF_1$. The first drain/source terminal of the second antifuse transistor A2 is connected with the second drain/source terminal of the first antifuse transistor A1. The gate terminal of the second antifuse transistor A2 is connected with the second antifuse control line $AF_2$. The first drain/source terminal of the second switch transistor W2 is connected with the second drain/source terminal of the second antifuse transistor A2. The gate terminal of the second switch transistor W2 is connected with the switch control line SW. The first drain/source terminal of the second select transistor S2 is connected with the second drain/source terminal of the second switch transistor W2. The gate terminal of the second select transistor S2 is connected with the word line WL. The second drain/source terminal of the second select transistor S2 is connected with the bit line BL.

In this embodiment, the OTP memory cell c1 comprises two storing circuits. That is, the first antifuse transistor A1 is a first storing circuit and the second antifuse transistor A2 is a second storing circuit. By providing proper bias voltages, an enroll action or a read action is selectively performed on the OTP memory cell c1. During the enroll action of the OTP memory cell c1, a high voltage stress is applied to both of the first antifuse transistor A1 and the second antifuse transistor A2. Under this circumstance, one of the gate dielectric layers 224 and 234 of the antifuse transistors A1 and A2 is ruptured. Consequently, the storage state of the corresponding antifuse transistor is changed.

When the read action is performed on the OTP memory cell c1, a random code for the PUF technology can be determined according to the result of judging whether the first antifuse transistor A1 is in the ruptured state or the unruptured state. For example, in case that the first antifuse transistor A1 is in the ruptured state, the logic value "1" is determined as the random code. Whereas, in case that the first antifuse transistor A1 is in the unruptured state, the logic value "0" is determined as the random code.

As mentioned above, in the OTP memory cell c1 of FIG. 6B, each of the doped regions 210, 220, 230, 250, 252 and 258 has the first dopant concentration, and the doped regions 240, 242 and 248 has a second dopant concentration. The first dopant concentration is higher than, lower than or equal to the second dopant concentration. In an embodiment, each of the gate dielectric layer 224 of the third gate structure and the gate dielectric layer 234 of the fourth gate structure has a thickness d1, and each of the gate dielectric layer 204 of the first gate structure, the gate dielectric layer 214 of the second gate structure, the gate dielectric layer 244 of the fifth gate structure and the gate dielectric layer 254 of the sixth gate structure has a thickness d2. The thickness d1 is smaller than or equal to the thickness d2.

FIG. 7 is a schematic top view illustrating an OTP memory cell according to a fourth embodiment of the present invention. In comparison with the third embodiment of FIG. 6A, the OTP memory cell c1 of this embodiment is equipped with more gate structures. As shown in FIG. 7, n gate structures are formed over the surface of the P-well region PW and arranged between the doped regions 271~276 with the second dopant concentration, wherein n is an even number larger than or equal to 4. The gate layers 261~26n of the n gate structures are respectively connected with the corresponding n antifuse control lines $AF_1$~$AF_n$. In other words, the OTP memory cell c1 comprises (n+4) gate structures. For illustration, the number n in the following embodiment of the OTP memory cell c1 is 4. That is, the OTP memory cell c1 comprises eight gate structures.

Figure 8B:
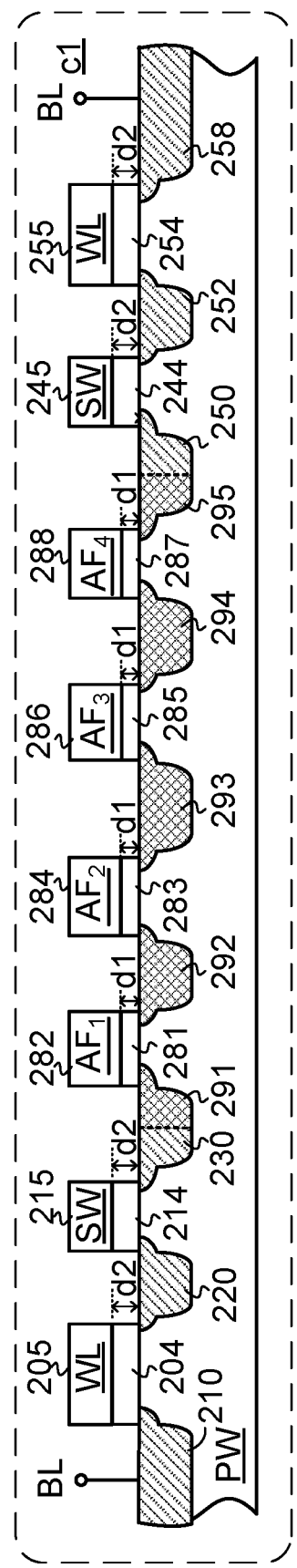
FIG. 8B is a schematic cross-sectional view of the OTP memory cell memory cell of FIG. 8A and taken along a line AA'.
Figure 8C:
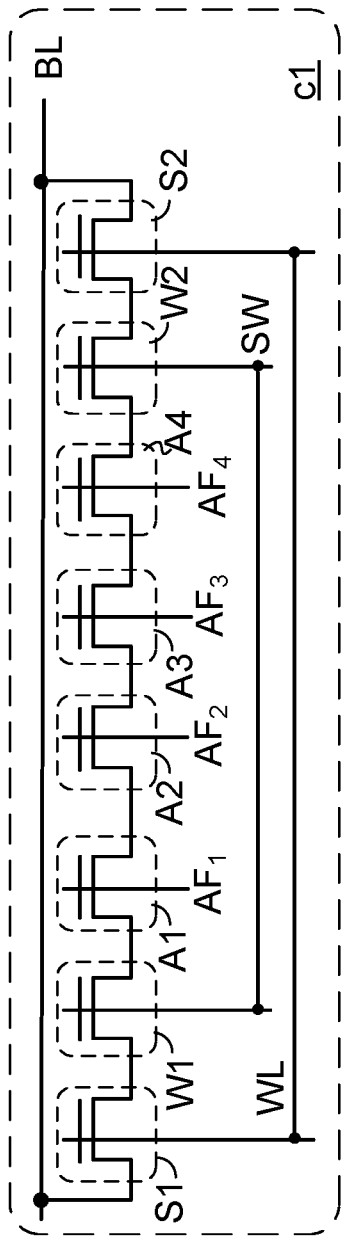
FIG. 8C is a schematic equivalent circuit diagram of the OTP memory cell according to the fourth embodiment of the present invention.

FIG. 8A is a schematic top view illustrating an OTP memory cell with eight gate structures according to the fourth embodiment of the present invention. FIG. 8B is a schematic cross-sectional view of the OTP memory cell of FIG. 8A and taken along a line AA'. FIG. 8C is a schematic equivalent circuit diagram of the OTP memory cell according to the fourth embodiment of the present invention.

As shown in FIGS. 8A and 8B, the OTP memory cell c1 is constructed over a P-well region PW. In addition, eight gate structures are formed on the surface of the P-well region PW. The first gate structure comprises a gate dielectric layer 204 and a gate layer 205. The second gate structure comprises a gate dielectric layer 214 and a gate layer 215. The third gate structure comprises a gate dielectric layer 281 and a gate layer 282. The fourth gate structure comprises a gate dielectric layer 283 and a gate layer 284. The fifth gate structure comprises a gate dielectric layer 285 and a gate layer 286. The sixth gate structure comprises a gate dielectric layer 287 and a gate layer 288. The seventh gate structure comprises a gate dielectric layer 244 and a gate layer 245. The eighth gate structure comprises a gate dielectric layer 254 and a gate layer 255.

After plural doping processes are performed, plural N-type doped regions are formed under the surface of the P-well region PW. Among these N-type doped regions, each of the doped regions 210, 220, 230, 250, 252 and 258 has a first dopant concentration, and each of the doped regions 291, 292, 293, 294 and 295 has a second dopant concentration. It is noted that numerous modifications and alterations may be made while retaining the teachings of the invention. For example, in a variant example of the fourth embodiment, the OTP memory cell c1 is constructed over an N-well region, and all doped regions are P-type doped regions.

The first gate structure is arranged between the doped region 210 and the doped region 220. The second gate structure is arranged between the doped region 220 and the doped region 230. The third gate structure is arranged between the doped region 291 and the doped region 292. The fourth gate structure is arranged between the doped region 292 and the doped region 293. The fifth gate structure is arranged between the doped region 293 and the doped region 294. The sixth gate structure is arranged between the doped region 294 and the doped region 295. The seventh gate structure is arranged between the doped region 250 and the doped region 252. The eighth gate structure is arranged between the doped region 252 and the doped region 258. In addition, the doped region 230 and the doped region 291 are contacted with each other, and the doped region 295 and the doped region 250 are contacted with each other.

Moreover, the gate layer 205 of the first gate structure is connected with a word line WL of the OTP memory cell c1. The gate layer 215 of the second gate structure is connected with a switch control line SW of the OTP memory cell c1. The gate layer 282 of the third gate structure is connected with a first antifuse control line $AF_1$ of the OTP memory cell c1. The gate layer 284 of the fourth gate structure is connected with a second antifuse control line $AF_2$ of the OTP memory cell c1. The gate layer 286 of the fifth gate structure is connected with a third antifuse control line $AF_3$ of the OTP memory cell c1. The gate layer 288 of the sixth gate structure is connected with a fourth antifuse control line $AF_4$ of the OTP memory cell c1. The gate layer 245 of the seventh gate structure is connected with the switch control line SW of the OTP memory cell c1. The gate layer 255 of the eighth gate structure is connected with the word line WL of the OTP memory cell c1. In addition, the doped regions 210 and 258 are connected with a bit line BL.

In this embodiment, the doped region 210, the doped region 220 and the first gate structure are collaboratively formed as a first select transistor S1. The doped region 220, the doped region 230 and the second gate structure are collaboratively formed as a first switch transistor W1. The doped region 291, the doped region 292 and the third gate structure are collaboratively formed as a first antifuse transistor A1. The doped region 292, the doped region 293 and the fourth gate structure are collaboratively formed as a second antifuse transistor A2. The doped region 293, the doped region 294 and the fifth gate structure are collaboratively formed as a third antifuse transistor A3. The doped region 294, the doped region 295 and the sixth gate structure are collaboratively formed as a fourth antifuse transistor A4. The doped region 250, the doped region 252 and the seventh gate structure are collaboratively formed as a second switch transistor W2. The doped region 252, the doped region 258 and the eighth gate structure are collaboratively formed as a second select transistor S2.

Please refer to FIG. 8C again. The first drain/source terminal of the first select transistor S1 is connected with the bit line BL. The gate terminal of the first select transistor S1 is connected with the word line WL. The first drain/source terminal of the first switch transistor W1 is connected with the second drain/source terminal of the first select transistor S1. The gate terminal of the first switch transistor W1 is connected with the switch control line SW. The first drain/source terminal of the first antifuse transistor A1 is connected with the second drain/source terminal of the first switch transistor W1. The gate terminal of the first antifuse transistor A1 is connected with the first antifuse control line $AF_1$. The first drain/source terminal of the second antifuse transistor A2 is connected with the second drain/source terminal of the first antifuse transistor A1. The gate terminal of the second antifuse transistor A2 is connected with the second antifuse control line $AF_2$. The first drain/source terminal of the third antifuse transistor A3 is connected with the second drain/source terminal of the second antifuse transistor A2. The gate terminal of the third antifuse transistor A3 is connected with the third antifuse control line $AF_3$. The first drain/source terminal of the fourth antifuse transistor A4 is connected with the second drain/source terminal of the third antifuse transistor A3. The gate terminal of the fourth antifuse transistor A4 is connected with the fourth antifuse control line $AF_4$. The first drain/source terminal of the second switch transistor W2 is connected with the second drain/source terminal of the fourth antifuse transistor A4. The gate terminal of the second switch transistor W2 is connected with the switch control line SW. The first drain/source terminal of the second select transistor S2 is connected with the second drain/source terminal of the second switch transistor W2. The gate terminal of the second select transistor S2 is connected with the word line WL. The second drain/source terminal of the second select transistor S2 is connected with the bit line BL.

In this embodiment, the OTP memory cell c1 comprises four storing circuits. That is, the first antifuse transistor A1 is a first storing circuit, the second antifuse transistor A2 is a second storing circuit, the third antifuse transistor A3 is a third storing circuit, and the fourth antifuse transistor A4 is a fourth storing circuit. By providing proper bias voltages, an enroll action or a read action is selectively performed on the OTP memory cell c1. During the enroll action of the OTP memory cell c1, a high voltage stress is applied to all of the first antifuse transistor A1, the second antifuse transistor A2, the third antifuse transistor A3 and the fourth antifuse transistor A4. Under this circumstance, one of the gate dielectric layers 281, 283, 285 and 287 of the antifuse transistors A1, A2, A3 and A4 is ruptured. Consequently, the storage state of the corresponding antifuse transistor is changed.

After one or plural read actions are performed on the OTP memory cell c1, a one-bit random code or a multi-bit random code is generated. The operations of the OTP memory cell c1 in the fourth embodiment are similar to the operations of the OTP memory cell c1 in the second embodiment, and not redundantly described herein.

When the enroll action is performed, the select voltage Vdd is provided to the word line WL. Meanwhile, the first select transistor S1 and the second select transistor S2 are turned on, a switching voltage Vsw is provided to the switch control line SW, and the first switch transistor W1 and the second switch transistor W2 are turned on. Consequently, a voltage stress is applied to the gate dielectric layers of the first antifuse transistor A1, the second antifuse transistor A2, the third antifuse transistor A3 and the fourth antifuse transistor A4. Since the enroll voltage Vpp is beyond the withstanding voltage range of the gate dielectric layer, the gate dielectric layer of one of the first antifuse transistor A1, the second antifuse transistor A2, the third antifuse transistor A3 and the fourth antifuse transistor A4 is ruptured. The ruptured gate dielectric layer is in a ruptured state corresponding to the low resistance value. For example, the switch voltage Vsw is higher than or equal to the select voltage Vdd.

Similarly, after the enrolling action on the OTP memory cell c1 is completed, a read action is performed to determine a one-bit random code. Similarly, in case that the OTP memory cell c1 comprises n antifuse transistors, these n antifuse transistors are classified into two groups. Each group contains (n/2) antifuse transistors. If the antifuse transistor in the ruptured state belongs to the first group, it means that one of the antifuse transistors in the first group is in the ruptured state. Under this circumstance, the first logic value is determined as the one-bit random code. Whereas, if the antifuse transistor in the ruptured state does not belong to the first group, it means that all of the antifuse transistors in the first group are in the unruptured state. Under this circumstance, the second logic value is determined as the one-bit random code. For example, n is an even number larger than or equal 4.

Similarly, after the enroll action on the OTP memory cell c1 is completed, plural read actions are performed to determine a multi-bit random code. For example, the OTP memory cell c1 comprises four antifuse transistors A1, A2, A3 and A4. If the first antifuse transistor A1 is in the ruptured state, the two-bit logic value "00" is determined as the random code. If the second antifuse transistor A2 is in the ruptured state, the two-bit logic value "01" is determined as the random code. If the third antifuse transistor A3 is in the ruptured state, the two-bit logic value "10" is determined as the random code. If the fourth antifuse transistor A4 is in the ruptured state, the two-bit logic value "11" is determined as the random code. In an embodiment, the OTP memory cell c1 comprises n antifuse transistors, wherein $n=2^X$. After plural read actions are completed, an X-bit random code is generated.

As mentioned above, in the OTP memory cell c1 of FIG. 8B, each of the doped regions 210, 220, 230, 250, 252 and 258 has the first dopant concentration, and the doped regions 291, 292, 293, 294 and 295 has a second dopant concentration. The first dopant concentration is higher than, lower than or equal to the second dopant concentration. In an embodiment, each of the gate dielectric layer 281 of the third gate structure, the gate dielectric layer 283 of the fourth gate structure, the gate dielectric layer 285 of the fifth gate structure and the gate dielectric layer 287 of the sixth gate structure has a thickness d1, and each of the gate dielectric layer 204 of the first gate structure, the gate dielectric layer 214 of the second gate structure, the gate dielectric layer 244 of the seventh gate structure and the gate dielectric layer 254 of the eighth gate structure has a thickness d2. The thickness d1 is smaller than or equal to the thickness d2.

Figure 9A:
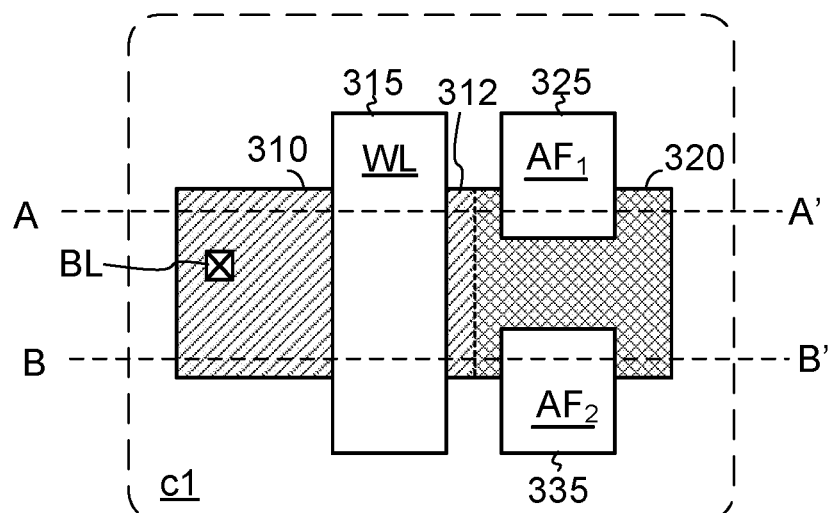
FIG. 9A is a schematic top view illustrating an OTP memory cell according to a fifth embodiment of the present invention.
Figure 9B:
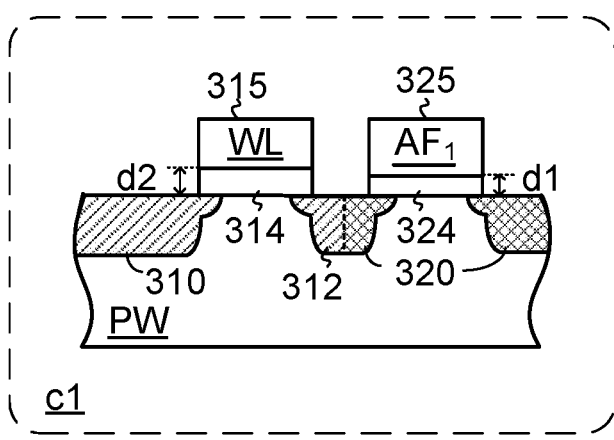
FIG. 9B is a schematic cross-sectional view illustrating the OTP memory cell of FIG. 9A and taken along a line AA'.
Figure 9C:
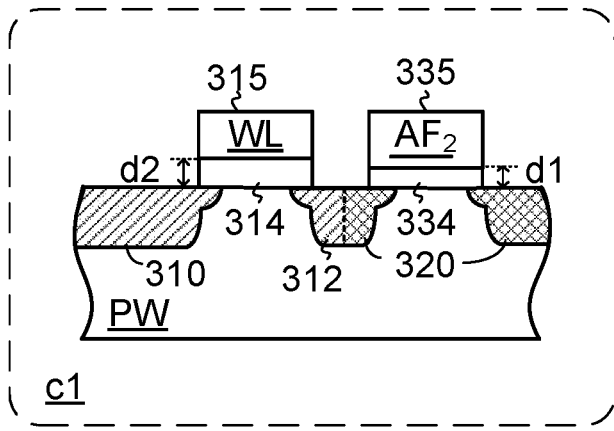
FIG. 9C is a schematic cross-sectional view illustrating the OTP memory cell of FIG. 9A and taken along a line BB'.
Figure 9D:
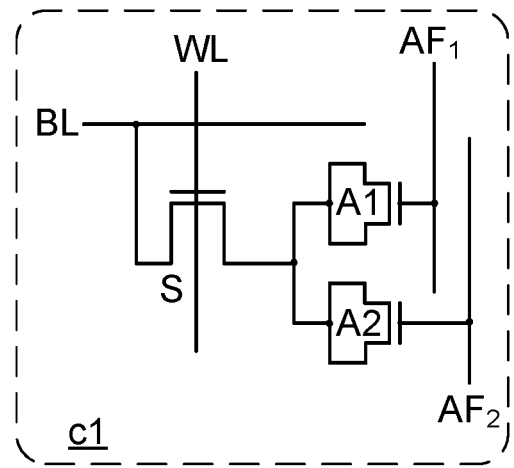
FIG. 9D is a schematic equivalent circuit diagram of the OTP memory cell according to the fifth embodiment of the present invention.

FIG. 9A is a schematic top view illustrating an OTP memory cell according to a fifth embodiment of the present invention. FIG. 9B is a schematic cross-sectional view illustrating the OTP memory cell of FIG. 9A and taken along a line AA'. FIG. 9C is a schematic cross-sectional view illustrating the OTP memory cell of FIG. 9A and taken along a line BB'. FIG. 9D is a schematic equivalent circuit diagram of the OTP memory cell according to the fifth embodiment of the present invention.

As shown in FIGS. 9A, 9B and 9C, the OTP memory cell c1 is constructed over a P-well region PW. In addition, three gate structures are formed on the surface of the P-well region PW. The first gate structure comprises a gate dielectric layer 314 and a gate layer 315. The second gate structure comprises a gate dielectric layer 324 and a gate layer 325. The third gate structure comprises a gate dielectric layer 334 and a gate layer 335.

After plural doping processes are performed, plural N-type doped regions are formed under the surface of the P-well region PW. Among these N-type doped regions, each of the doped regions 310 and 312 has a first dopant concentration, and the doped region 320 has a second dopant concentration. It is noted that numerous modifications and alterations may be made while retaining the teachings of the invention. For example, in a variant example of the fifth embodiment, the OTP memory cell c1 is constructed over an N-well region, and all doped regions are P-type doped regions.

The first gate structure is arranged between the doped region 310 and the doped region 312. The second gate structure is located beside the doped region 320. The third gate structure is located beside the doped region 320. In addition, the doped region 312 and the doped region 320 are contacted with each other.

Moreover, the gate layer 315 of the first gate structure is connected with a word line WL of the OTP memory cell c1. The gate layer 325 of the second gate structure is connected with a first antifuse control line $AF_1$ of the OTP memory cell c1. The gate layer 335 of the third gate structure is connected with a second antifuse control line $AF_2$ of the OTP memory cell c1. In addition, the doped region 310 is connected with a bit line BL.

In this embodiment, the doped region 310, the doped region 312 and the first gate structure are collaboratively formed as a select transistor S. The doped region 320 and the second gate structure are collaboratively formed as a first antifuse transistor A1. The doped region 320 and the third gate structure are collaboratively formed as a second antifuse transistor A2.

Please refer to FIG. 9D. The first drain/source terminal of the select transistor S is connected with the bit line BL. The gate terminal of the select transistor S is connected with the word line WL. The two drain/source terminals of the first antifuse transistor A1 are connected with the second drain/source terminal of the select transistor S. The gate terminal of the first antifuse transistor A1 is connected with the first antifuse control line $AF_1$. The two drain/source terminals of the second antifuse transistor A2 are connected with the second drain/source terminal of the select transistor S. The gate terminal of the second antifuse transistor A2 is connected with the second antifuse control line $AF_2$.

In this embodiment, the OTP memory cell c1 comprises two storing circuits. That is, the first antifuse transistor A1 is a first storing circuit, and the second antifuse transistor A2 is a second storing circuit. By providing proper bias voltages, an enroll action or a read action is selectively performed on the OTP memory cell c1. During the enroll action of the OTP memory cell c1, a high voltage stress is applied to both of the first antifuse transistor A1 and the second antifuse transistor A2. Under this circumstance, one of the gate dielectric layers 324 and 334 of the first antifuse transistor A1 and the second antifuse transistor A2 is ruptured. Consequently, the storage state is changed.

When the read action is performed on the OTP memory cell c1, a random code for the PUF technology can be determined according to the result of judging whether the first antifuse transistor A1 is in the ruptured state or the unruptured state. For example, in case that the first antifuse transistor A1 is in the ruptured state, the logic value "1" is determined as the random code. Whereas, in case that the first antifuse transistor A1 is in the unruptured state, the logic value "0" is determined as the random code.

As mentioned above, each of the doped regions 310 and 312 has the first dopant concentration, and the doped region 320 has the second dopant concentration. The first dopant concentration can be equal to or different from the second dopant concentration. That is, the first dopant concentration is higher than, lower than or equal to the second dopant concentration. In an embodiment, each of the gate dielectric layer 324 of the second gate structure and the gate dielectric layer 334 of the third gate structure has a thickness d1, and the gate dielectric layer 314 of the first gate structure has a thickness d2. The thickness d1 is smaller than or equal to the thickness d2.

Figure 10:
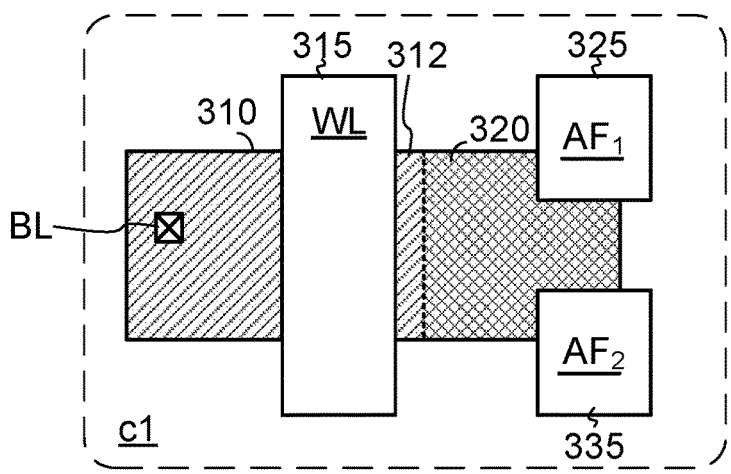
FIG. 10 is a schematic top view illustrating a variant example of the OTP memory cell according to the fifth embodiment of the present invention.

In order to increase the enrolling efficiency, the structure of the OTP memory cell in the fifth embodiment may be further modified. FIG. 10 is a schematic top view illustrating a variant example of the OTP memory cell according to the fifth embodiment of the present invention. In comparison with the fifth embodiment of FIG. 9A, the second gate structure and the third gate structure of the OTP memory cell c1 of FIG. 10 are located at two corners of the doped region 320. That is, the second gate structure and the third gate structure of the OTP memory cell c1 of FIG. 10 are located at the region formed by the meeting of two sides of the doped region 320. Due to the corona discharge effect, one of the gate dielectric layers 324 and 334 of the first antifuse transistor A1 and the second antifuse transistor A2 can be ruptured more easily. Consequently, the enrolling efficiency is enhanced.

Figure 11:
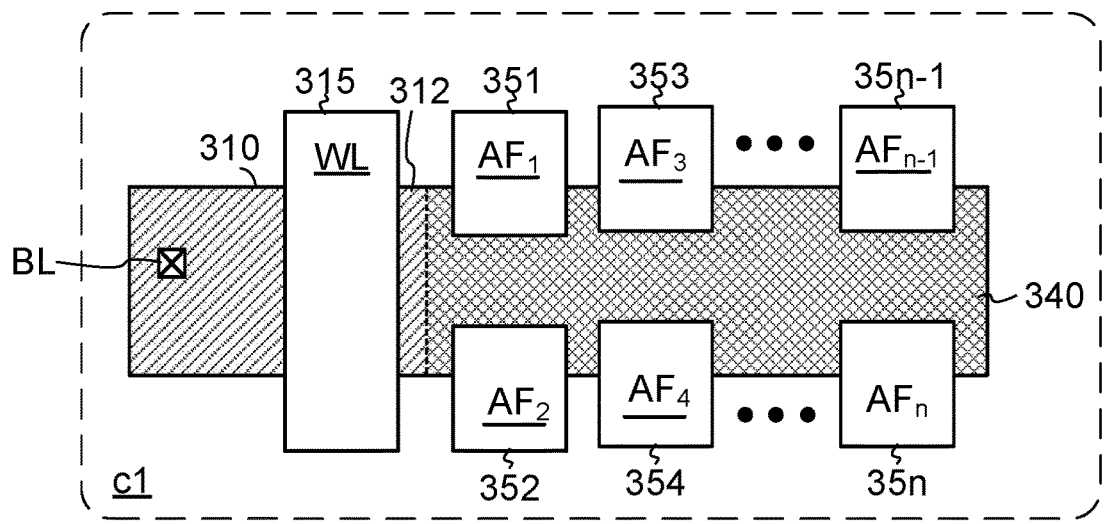
FIG. 11 is a schematic top view illustrating an OTP memory cell according to a sixth embodiment of the present invention.

FIG. 11 is a schematic top view illustrating an OTP memory cell according to a sixth embodiment of the present invention. In comparison with the fifth embodiment of FIG. 9A, the OTP memory cell c1 of this embodiment is equipped with more gate structures. As shown in FIG. 11, the gate layers 351~35n of the n gate structures are respectively connected with the corresponding n antifuse control lines $AF_1 \sim AF_n$. In other words, the OTP memory cell c1 comprises (n+1) gate structures. For illustration, the number n in the following embodiment of the OTP memory cell c1 is 4. That is, the OTP memory cell c1 comprises five gate structures.

Figure 12A:
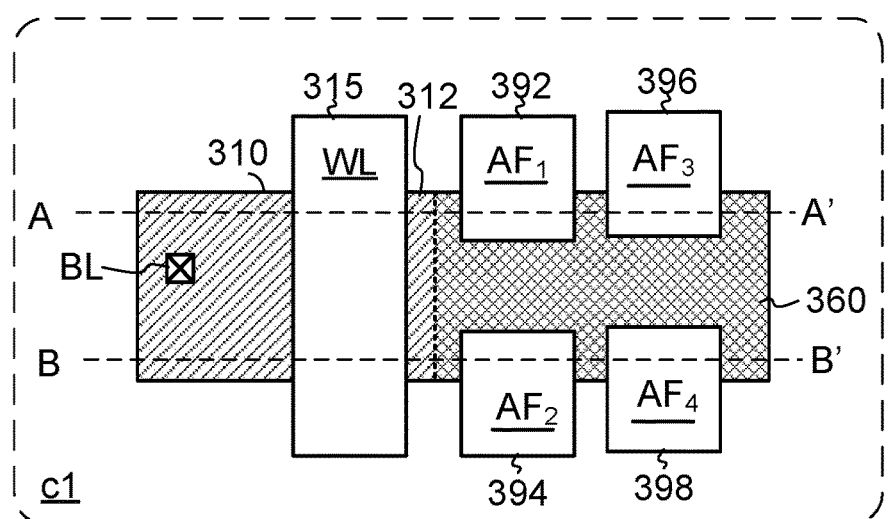
FIG. 12A is a schematic top view illustrating an OTP memory cell with five gate structures according to the sixth embodiment of the present invention.
Figure 12B:
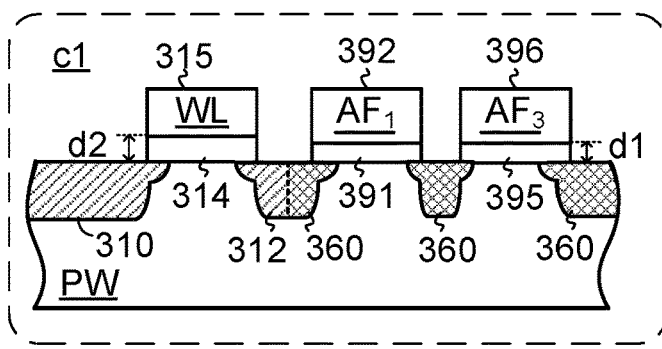
FIG. 12B is a schematic cross-sectional view illustrating the OTP memory cell of FIG. 12A and taken along a line AA'.
Figure 12C:
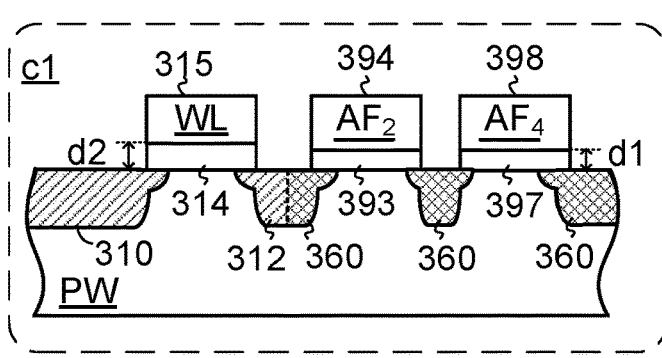
FIG. 12C is a schematic cross-sectional view illustrating the OTP memory cell of FIG. 12A and taken along a line BB'.
Figure 12D:
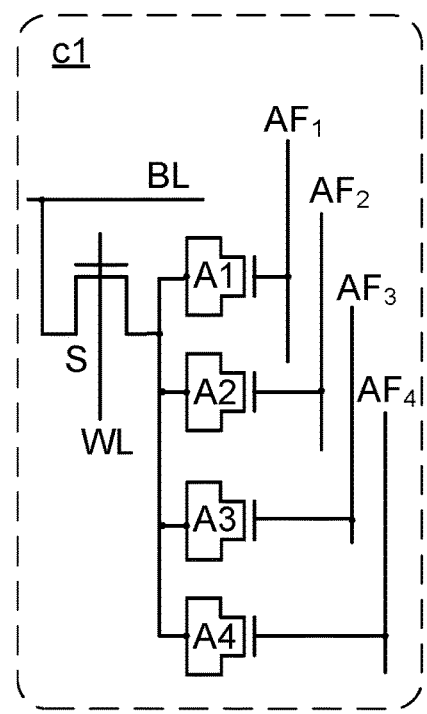
FIG. 12D is a schematic equivalent circuit diagram of the OTP memory cell according to the sixth embodiment of the present invention.

FIG. 12A is a schematic top view illustrating an OTP memory cell with five gate structures according to the sixth embodiment of the present invention. FIG. 12B is a schematic cross-sectional view illustrating the OTP memory cell of FIG. 12A and taken along a line AA'. FIG. 12C is a schematic cross-sectional view illustrating the OTP memory cell of FIG. 12A and taken along a line BB'. FIG. 12D is a schematic equivalent circuit diagram of the OTP memory cell according to the sixth embodiment of the present invention.

As shown in FIGS. 12A, 12B and 12C, the OTP memory cell c1 is constructed over a P-well region PW. In addition, five gate structures are formed on the surface of the P-well region PW. The first gate structure comprises a gate dielectric layer 314 and a gate layer 315. The second gate structure comprises a gate dielectric layer 391 and a gate layer 392. The third gate structure comprises a gate dielectric layer 393 and a gate layer 394. The fourth gate structure comprises a gate dielectric layer 395 and a gate layer 396. The fifth gate structure comprises a gate dielectric layer 397 and a gate layer 398.

After plural doping processes are performed, plural N-type doped regions are formed under the surface of the P-well region PW. Among these N-type doped regions, each of the doped regions 310 and 312 has a first dopant concentration, and the doped region 360 has a second dopant concentration. It is noted that numerous modifications and alterations may be made while retaining the teachings of the invention. For example, in a variant example of the sixth embodiment, the OTP memory cell c1 is constructed over an N-well region, and all doped regions are P-type doped regions.

The first gate structure is arranged between the doped region 310 and the doped region 312. The second gate structure is located beside the doped region 360. The third gate structure is located beside the doped region 360. The fourth gate structure is located beside the doped region 360. The fifth gate structure is located beside the doped region 360. In addition, the doped region 312 and the doped region 360 are contacted with each other.

Moreover, the gate layer 315 of the first gate structure is connected with a word line WL of the OTP memory cell c1. The gate layer 392 of the second gate structure is connected with a first antifuse control line $AF_1$ of the OTP memory cell c1. The gate layer 394 of the third gate structure is connected with a second antifuse control line $AF_2$ of the OTP memory cell c1. The gate layer 396 of the fourth gate structure is connected with a third antifuse control line $AF_3$ of the OTP memory cell c1. The gate layer 398 of the fifth gate structure is connected with a fourth antifuse control line $AF_4$ of the OTP memory cell c1. In addition, the doped region 310 is connected with a bit line BL.

In this embodiment, the doped region 310, the doped region 312 and the first gate structure are collaboratively formed as a select transistor S. The doped region 360 and the second gate structure are collaboratively formed as a first antifuse transistor A1. The doped region 360 and the third gate structure are collaboratively formed as a second antifuse transistor A2. The doped region 360 and the fourth gate structure are collaboratively formed as a third antifuse transistor A3. The doped region 360 and the fourth gate structure are collaboratively formed as a fourth antifuse transistor A4.

Please refer to FIG. 12D. The first drain/source terminal of the select transistor S is connected with the bit line BL. The gate terminal of the select transistor S is connected with the word line WL. The two drain/source terminals of the first antifuse transistor A1 are connected with the second drain/source terminal of the select transistor S. The gate terminal of the first antifuse transistor A1 is connected with the first antifuse control line $AF_1$. The two drain/source terminals of the second antifuse transistor A2 are connected with the second drain/source terminal of the select transistor S. The gate terminal of the second antifuse transistor A2 is connected with the second antifuse control line $AF_2$. The two drain/source terminals of the third antifuse transistor A3 are connected with the second drain/source terminal of the select transistor S. The gate terminal of the third antifuse transistor A3 is connected with the third antifuse control line $AF_3$. The two drain/source terminals of the fourth antifuse transistor A4 are connected with the second drain/source terminal of the select transistor S. The gate terminal of the fourth antifuse transistor A4 is connected with the fourth antifuse control line $AF_4$.

In this embodiment, the OTP memory cell c1 comprises four storing circuits. That is, the first antifuse transistor A1 is a first storing circuit, the second antifuse transistor A2 is a second storing circuit, the third antifuse transistor A3 is a third storing circuit, and the fourth antifuse transistor A4 is a fourth storing circuit. By providing proper bias voltages, an enroll action or a read action is selectively performed on the OTP memory cell c1. During the enroll action of the OTP memory cell c1, a high voltage stress is applied to all of the first antifuse transistor A1, the second antifuse transistor A2, the third antifuse transistor A3 and the fourth antifuse transistor A4. Under this circumstance, one of the gate dielectric layers 391, 393, 395 and 397 of the antifuse transistors A1, A2, A3 and A4 is ruptured. Consequently, the storage state is changed.

After one or plural read actions are performed on the OTP memory cell c1, a one-bit random code or a multi-bit random code is generated. The operations of the OTP memory cell c1 in the sixth embodiment are similar to the operations of the OTP memory cell c1 in the second embodiment, and not redundantly described herein.

When the enroll action is performed, a select voltage Vdd is provided to the word line WL. Consequently, the select transistor S is turned on, and a voltage stress is applied to the gate dielectric layers of the first antifuse transistor A1, the second antifuse transistor A2, the third antifuse transistor A3 and the fourth antifuse transistor A4. Since the enroll voltage Vpp is beyond the withstanding voltage range of the gate dielectric layer, the gate dielectric layer of one of the first antifuse transistor A1, the second antifuse transistor A2, the third antifuse transistor A3 and the fourth antifuse transistor A4 is ruptured. The ruptured gate dielectric layer is in a ruptured state corresponding to the low resistance value.

Similarly, after the enrolling action on the OTP memory cell c1 is completed, a read action is performed to determine a one-bit random code. Similarly, in case that the OTP memory cell c1 comprises n antifuse transistors, these n antifuse transistors are classified into two groups. Each group contains (n/2) antifuse transistors. If the antifuse transistor in the ruptured state belongs to the first group, it means that one of the antifuse transistors in the first group is in the ruptured state. Under this circumstance, the logic value "1" is determined as the one-bit random code. Whereas, if the antifuse transistor in the ruptured state does not belong to the first group, it means that all of the antifuse transistors in the first group are in the unruptured state. Under this circumstance, the logic value "0" is determined as the one-bit random code. For example, n is an even number larger than or equal 4.

Similarly, after the enrolling action on the OTP memory cell c1 is completed, plural read actions are performed to determine a multi-bit random code. For example, the OTP memory cell c1 comprises four antifuse transistors A1, A2, A3 and A4 (i.e., n=4). If the first antifuse transistor A1 is in the ruptured state, the two-bit logic value "00" is determined as the random code. If the second antifuse transistor A2 is in the ruptured state, the two-bit logic value "01" is determined as the random code. If the third antifuse transistor A3 is in the ruptured state, the two-bit logic value "10" is determined as the random code. If the fourth antifuse transistor A4 is in the ruptured state, the two-bit logic value "11" is determined as the random code. In an embodiment, the OTP memory cell c1 comprises n antifuse transistors, wherein $n=2^X$. After plural read actions are completed, an X-bit random code is generated.

As mentioned above, in the OTP memory cell c1 of FIGS. 12B and 12C, each of the doped regions 310 and 312 has the first dopant concentration, and the doped region 360 has the second dopant concentration. The first dopant concentration is higher than, lower than or equal to the second dopant concentration. In an embodiment, each of the gate dielectric layer 391 of the second gate structure, the gate dielectric layer 393 of the third gate structure, the gate dielectric layer 395 of the fourth gate structure and the gate dielectric layer 397 of the fifth gate structure has a thickness d1, and the gate dielectric layer 314 of the first gate structure has a thickness d2. The thickness d1 is smaller than or equal to the thickness d2.

Figure 13A:
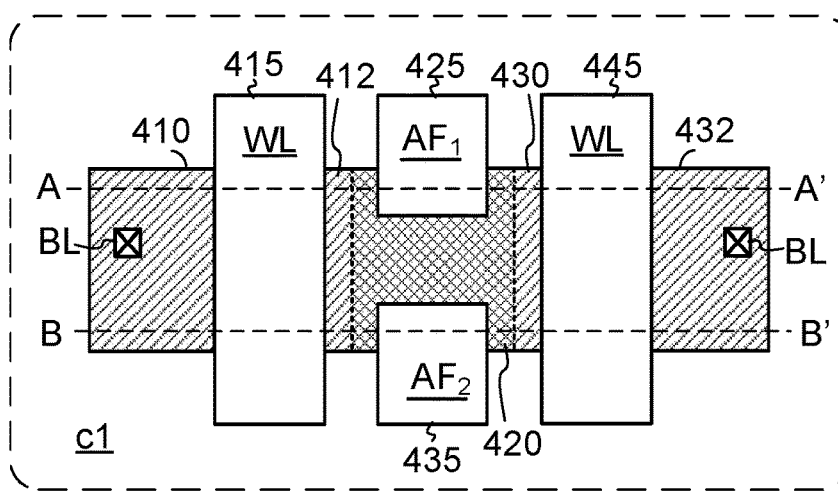
FIG. 13A is a schematic top view illustrating an OTP memory cell according to a seventh embodiment of the present invention.
Figure 13B:
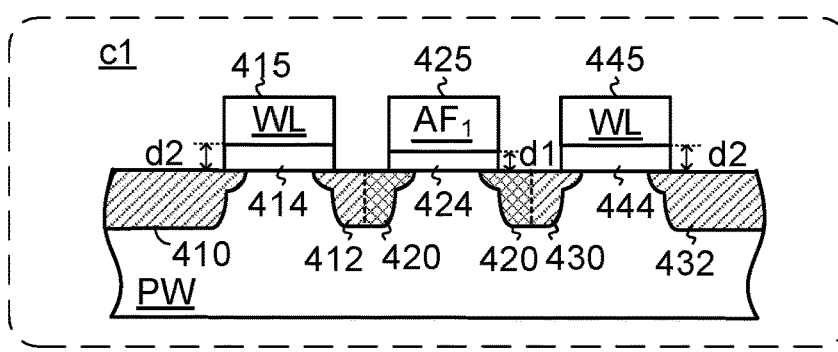
FIG. 13B is a schematic cross-sectional view illustrating the OTP memory cell of FIG. 13A and taken along a line AA'.
Figure 13C:
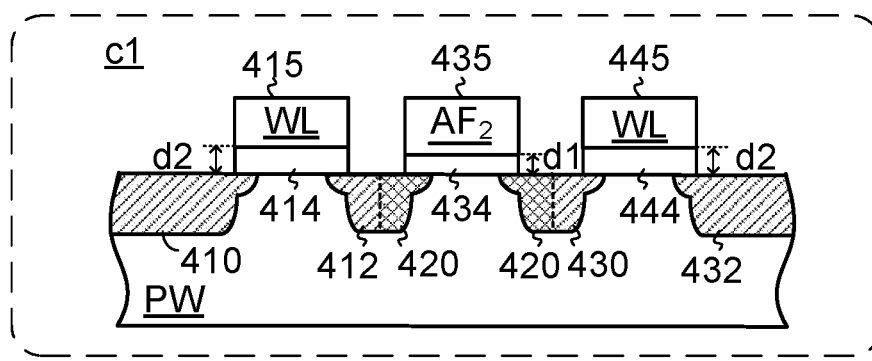
FIG. 13C is a schematic cross-sectional view illustrating the OTP memory cell of FIG. 13A and taken along a line BB'.
Figure 13D:
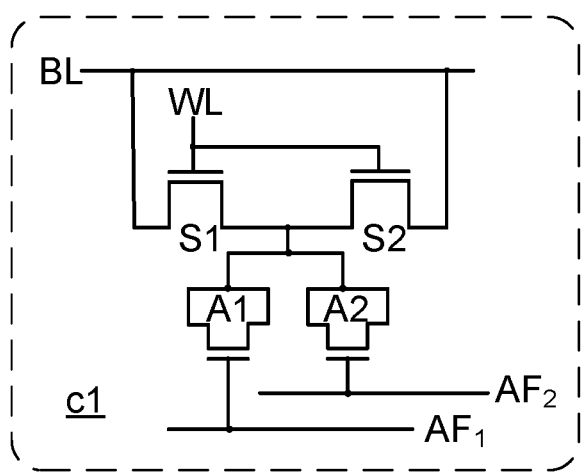
FIG. 13D is a schematic equivalent circuit diagram of the OTP memory cell according to the seventh embodiment of the present invention.

FIG. 13A is a schematic top view illustrating an OTP memory cell according to a seventh embodiment of the present invention. FIG. 13B is a schematic cross-sectional view illustrating the OTP memory cell of FIG. 13A and taken along a line AA'. FIG. 13C is a schematic cross-sectional view illustrating the OTP memory cell of FIG. 13A and taken along a line BB'. FIG. 13D is a schematic equivalent circuit diagram of the OTP memory cell according to the seventh embodiment of the present invention.

As shown in FIGS. 13A, 13B and 13C, the OTP memory cell c1 is constructed over a P-well region PW. In addition, four gate structures are formed on the surface of the P-well region PW. The first gate structure comprises a gate dielectric layer 414 and a gate layer 415. The second gate structure comprises a gate dielectric layer 424 and a gate layer 425. The third gate structure comprises a gate dielectric layer 434 and a gate layer 435. The fourth gate structure comprises a gate dielectric layer 444 and a gate layer 445.

After plural doping processes are performed, plural N-type doped regions are formed under the surface of the P-well region PW. Among these N-type doped regions, each of the doped regions 410, 412, 430 and 432 has a first dopant concentration, and the doped region 420 has a second dopant concentration. It is noted that numerous modifications and alterations may be made while retaining the teachings of the invention. For example, in a variant example of the seventh embodiment, the OTP memory cell c1 is constructed over an N-well region, and all doped regions are P-type doped regions.

The first gate structure is arranged between the doped region 410 and the doped region 412. The second gate structure is located beside the doped region 420. The third gate structure is located beside the doped region 420. The fourth gate structure is arranged between the doped region 430 and the doped region 432. In addition, the doped region 412 and the doped region 420 are contacted with each other, and the doped region 420 and the doped region 430 are contacted with each other.

Moreover, the gate layer 415 of the first gate structure is connected with a word line WL of the OTP memory cell c1. The gate layer 425 of the second gate structure is connected with a first antifuse control line $AF_1$ of the OTP memory cell c1. The gate layer 435 of the third gate structure is connected with a second antifuse control line $AF_2$ of the OTP memory cell c1. The gate layer 445 of the fourth gate structure is connected with the word line WL of the OTP memory cell c1. In addition, the doped regions 410 and 432 are connected with a bit line BL.

In this embodiment, the doped region 410, the doped region 412 and the first gate structure are collaboratively formed as a first select transistor S1. The doped region 420 and the second gate structure are collaboratively formed as a first antifuse transistor A1. The doped region 420 and the third gate structure are collaboratively formed as a second antifuse transistor A2. The doped region 430, the doped region 432 and the fourth gate structure are collaboratively formed as a second select transistor S2.

Please refer to FIG. 13D. The first drain/source terminal of the first select transistor S1 is connected with the bit line BL. The gate terminal of the first select transistor S1 is connected with the word line WL. The first drain/source terminal of the second select transistor S2 is connected with the bit line BL. The gate terminal of the second select transistor S2 is connected with the word line WL. The second drain/source terminal of the second select transistor S2 is connected with the second drain/source terminal of the first select transistor S1. The two drain/source terminals of the first antifuse transistor A1 are connected with the second drain/source terminal of the first select transistor S1 and the second drain/source terminal of the second select transistor S2. The gate terminal of the first antifuse transistor A1 is connected with the first antifuse control line $AF_1$. The two drain/source terminals of the second antifuse transistor A2 are connected with the second drain/source terminal of the first select transistor S1 and the second drain/source terminal of the second select transistor S2. The gate terminal of the second antifuse transistor A2 is connected with the second antifuse control line $AF_2$.

In this embodiment, the OTP memory cell c1 comprises two storing circuits. That is, the first antifuse transistor A1 is a first storing circuit, and the second antifuse transistor A2 is a second storing circuit. By providing proper bias voltages, an enroll action or a read action is selectively performed on the OTP memory cell c1. During the enroll action of the OTP memory cell c1, a high voltage stress is applied to both of the first antifuse transistor A1 and the second antifuse transistor A2. Under this circumstance, one of the gate dielectric layers 424 and 434 of the first antifuse transistor A1 and the second antifuse transistor A2 is ruptured. Consequently, the storage state is changed.

When the read action is performed on the OTP memory cell c1, a random code for the PUF technology can be determined according to the result of judging whether the first antifuse transistor A1 is in the ruptured state or the unruptured state. For example, in case that the first antifuse transistor A1 is in the ruptured state, the logic value "1" is determined as the random code. Whereas, in case that the first antifuse transistor A1 is in the unruptured state, the logic value "0" is determined as the random code.

As mentioned above, in this embodiment, each of the doped regions 410, 412, 430 and 432 has the first dopant concentration, and the doped region 420 has the second dopant concentration. The first dopant concentration is higher than, lower than or equal to the second dopant concentration. In an embodiment, each of the gate dielectric layer 424 of the second gate structure and the gate dielectric layer 434 of the third gate structure has a thickness d1, and each of the gate dielectric layer 414 of the first gate structure and the gate dielectric layer 444 of the fourth gate structure has a thickness d2. The thickness d1 is smaller than or equal to the thickness d2.

Figure 14:
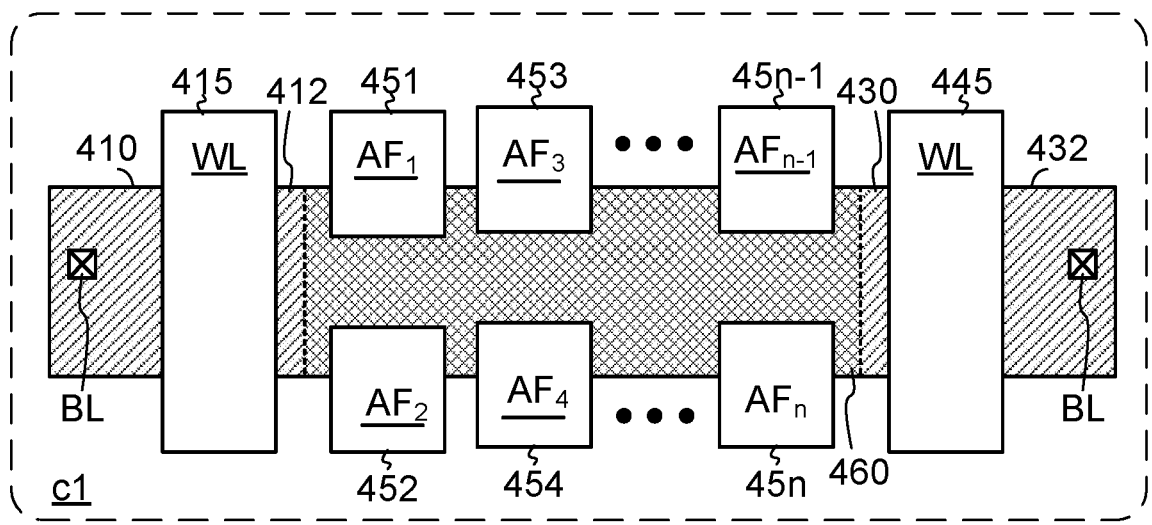
FIG. 14 is a schematic top view illustrating an OTP memory cell according to an eighth embodiment of the present invention.

FIG. 14 is a schematic top view illustrating an OTP memory cell according to an eighth embodiment of the present invention. In comparison with the seventh embodiment of FIG. 13A, the OTP memory cell c1 of this embodiment is equipped with more gate structures. As shown in FIG. 14, n gate structures are formed over the doped region 460 with the second dopant concentration, wherein n is an even number larger than or equal to 4. The gate layers $451 \sim 45n$ of the n gate structures are respectively connected with the corresponding n antifuse control lines $AF_1 \sim AF_n$. In other words, the OTP memory cell c1 comprises (n+2) gate structures. For illustration, the number n in the following embodiment of the OTP memory cell c1 is 4. That is, the OTP memory cell c1 comprises six gate structures.

Figure 15A:
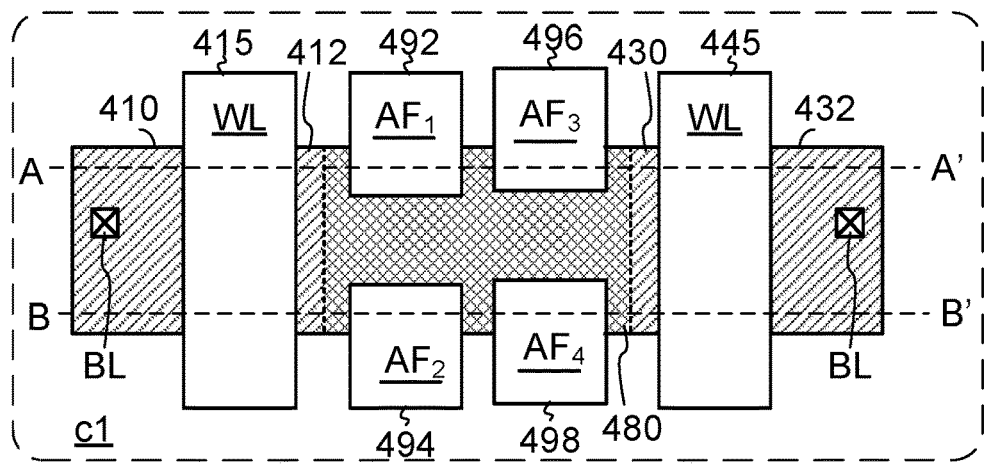
FIG. 15A is a schematic top view illustrating an OTP memory cell with six gate structures according to the eighth embodiment of the present invention.
Figure 15B:
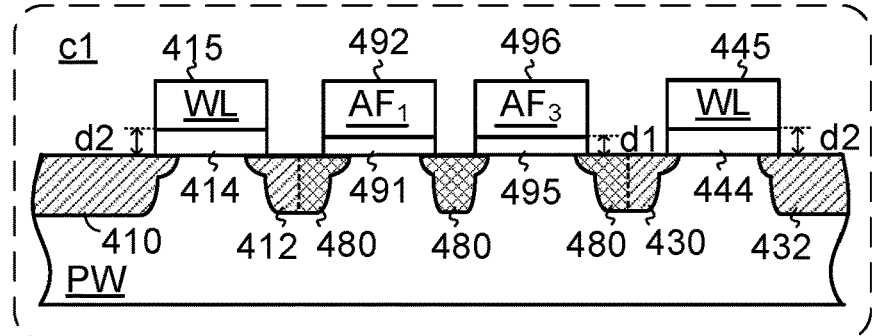
FIG. 15B is a schematic cross-sectional view illustrating the OTP memory cell of FIG. 15A and taken along a line AA'.
Figure 15C:
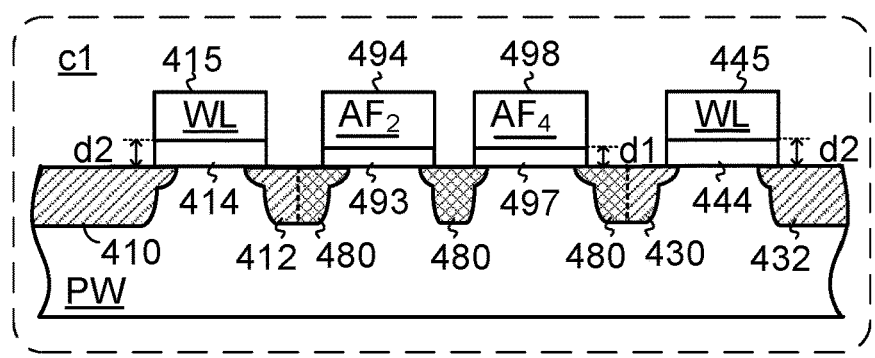
FIG. 15C is a schematic cross-sectional view illustrating the OTP memory cell of FIG. 15A and taken along a line BB'.
Figure 15D:
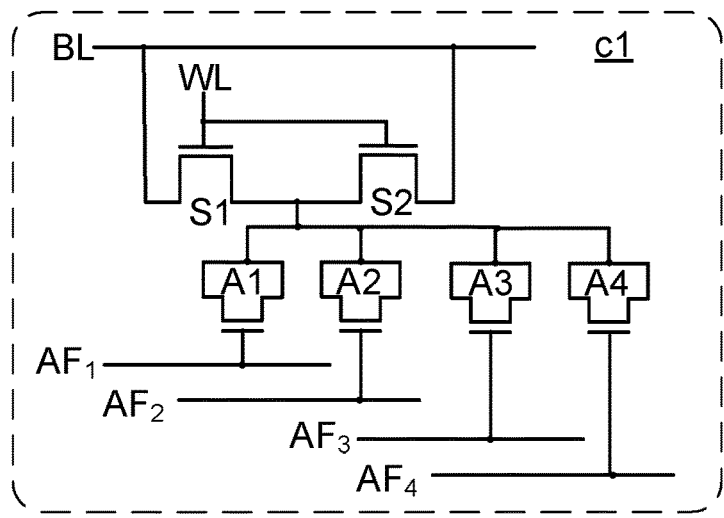
FIG. 15D is a schematic equivalent circuit diagram of the OTP memory cell according to the eighth embodiment of the present invention.

FIG. 15A is a schematic top view illustrating an OTP memory cell with six gate structures according to the eighth embodiment of the present invention. FIG. 15B is a schematic cross-sectional view illustrating the OTP memory cell of FIG. 15A and taken along a line AA'. FIG. 15C is a schematic cross-sectional view illustrating the OTP memory cell of FIG. 15A and taken along a line BB'. FIG. 15D is a schematic equivalent circuit diagram of the OTP memory cell according to the eighth embodiment of the present invention.

As shown in FIGS. 15A, 15B and 15C, the OTP memory cell c1 is constructed over a P-well region PW. In addition, sixth gate structures are formed on the surface of the P-well region PW. The first gate structure comprises a gate dielectric layer 414 and a gate layer 415. The second gate structure comprises a gate dielectric layer 491 and a gate layer 492. The third gate structure comprises a gate dielectric layer 493 and a gate layer 494. The fourth gate structure comprises a gate dielectric layer 495 and a gate layer 496. The fifth gate structure comprises a gate dielectric layer 497 and a gate layer 498. The sixth gate structure comprises a gate dielectric layer 444 and a gate layer 445.

After plural doping processes are performed, plural N-type doped regions are formed under the surface of the P-well region PW. Among these N-type doped regions, each of the doped regions 410, 412, 430 and 432 has a first dopant concentration, and the doped region 480 has a second dopant concentration. It is noted that numerous modifications and alterations may be made while retaining the teachings of the invention. For example, in a variant example of the eighth embodiment, the OTP memory cell c1 is constructed over an N-well region, and all doped regions are P-type doped regions.

The first gate structure is arranged between the doped region 410 and the doped region 412. The second gate structure is located beside the doped region 480. The third gate structure is located beside the doped region 480. The fourth gate structure is located beside the doped region 480. The fifth gate structure is located beside the doped region 480. The sixth gate structure is arranged between the doped region 430 and the doped region 432. In addition, the doped region 412 and the doped region 480 are contacted with each other, and the doped region 480 and the doped region 430 are contacted with each other.

Moreover, the gate layer 415 of the first gate structure is connected with a word line WL of the OTP memory cell c1. The gate layer 492 of the second gate structure is connected with a first antifuse control line $AF_1$ of the OTP memory cell c1. The gate layer 494 of the third gate structure is connected with a second antifuse control line $AF_2$ of the OTP memory cell c1. The gate layer 496 of the fourth gate structure is connected with a third antifuse control line $AF_3$ of the OTP memory cell c1. The gate layer 498 of the fifth gate structure is connected with a fourth antifuse control line $AF_4$ of the OTP memory cell c1. The gate layer 445 of the sixth gate structure is connected with the word line WL of the OTP memory cell c1. In addition, the doped region 410 and 432 connected with a bit line BL.

In this embodiment, the doped region 410, the doped region 412 and the first gate structure are collaboratively formed as a first select transistor S1. The doped region 480 and the second gate structure are collaboratively formed as a first antifuse transistor A1. The doped region 480 and the third gate structure are collaboratively formed as a second antifuse transistor A2. The doped region 480 and the fourth gate structure are collaboratively formed as a third antifuse transistor A3. The doped region 480 and the fifth gate structure are collaboratively formed as a fourth antifuse transistor A4. The doped region 430, the doped region 432 and the sixth gate structure are collaboratively formed as a second select transistor S2.

Please refer to FIG. 15D. The first drain/source terminal of the first select transistor S1 is connected with the bit line BL. The gate terminal of the first select transistor S1 is connected with the word line WL. The first drain/source terminal of the second select transistor S2 is connected with the bit line BL. The gate terminal of the second select transistor S2 is connected with the word line WL. The second drain/source terminal of the second select transistor S2 is connected with the second drain/source terminal of the first select transistor S1. The two drain/source terminals of the first antifuse transistor A1 are connected with the second drain/source terminal of the first select transistor S1 and the second drain/source terminal of the second select transistor S2. The gate terminal of the first antifuse transistor A1 is connected with the first antifuse control line $AF_1$. The two drain/source terminals of the second antifuse transistor A2 are connected with the second drain/source terminal of the first select transistor S1 and the second drain/source terminal of the second select transistor S2. The gate terminal of the second antifuse transistor A2 is connected with the second antifuse control line $AF_2$. The two drain/source terminals of the third antifuse transistor A3 are connected with the second drain/source terminal of the first select transistor S1 and the second drain/source terminal of the second select transistor S2. The gate terminal of the third antifuse transistor A3 is connected with the third antifuse control line $AF_3$. The two drain/source terminals of the fourth antifuse transistor A4 are connected with the second drain/source terminal of the first select transistor S1 and the second drain/source terminal of the second select transistor S2. The gate terminal of the fourth antifuse transistor A4 is connected with the fourth antifuse control line $AF_4$.

In this embodiment, the OTP memory cell c1 comprises four storing circuits. That is, the first antifuse transistor A1 is a first storing circuit, the second antifuse transistor A2 is a second storing circuit, the third antifuse transistor A3 is a third storing circuit, and the fourth antifuse transistor A4 is a fourth storing circuit. By providing proper bias voltages, an enroll action or a read action is selectively performed on the OTP memory cell c1. During the enroll action of the OTP memory cell c1, a high voltage stress is applied to all of the first antifuse transistor A1, the second antifuse transistor A2, the third antifuse transistor A3 and the fourth antifuse transistor A4. Under this circumstance, one of the gate dielectric layers 491, 493, 495 and 497 of the antifuse transistors A1, A2, A3 and A4 is ruptured. Consequently, the storage state is changed.

After one or plural read actions are performed on the OTP memory cell c1, a one-bit random code or a multi-bit random code is generated. The operations of the OTP memory cell c1 in the eighth embodiment are similar to the operations of the OTP memory cell c1 in the second embodiment, and not redundantly described herein.

When the enroll action is performed, a select voltage Vdd is provided to the word line WL. Consequently, the first select transistor S1 and the second select transistor S2 are turned on, and a voltage stress is applied to the gate dielectric layers of the first antifuse transistor A1, the second antifuse transistor A2, the third antifuse transistor A3 and the fourth antifuse transistor A4. Since the enroll voltage Vpp is beyond the withstanding voltage range of the gate dielectric layer, the gate dielectric layer of one of the first antifuse transistor A1, the second antifuse transistor A2, the third antifuse transistor A3 and the fourth antifuse transistor A4 is ruptured. The ruptured gate dielectric layer is in a ruptured state corresponding to the low resistance value.

Similarly, after the enrolling action on the OTP memory cell c1 is completed, a read action is performed to determine a one-bit random code. Similarly, in case that the OTP memory cell c1 comprises n antifuse transistors, these n antifuse transistors are classified into two groups. Each group contains (n/2) antifuse transistors. If the antifuse transistor in the ruptured state belongs to the first group, it means that one of the antifuse transistors in the first group is in the ruptured state. Under this circumstance, the logic value "1" is determined as the one-bit random code. Whereas, if the antifuse transistor in the ruptured state does not belong to the first group, it means that all of the antifuse transistors in the first group are in the unruptured state. Under this circumstance, the logic value "0" is determined as the one-bit random code. For example, n is an even number larger than or equal 4.

Similarly, after the enrolling action on the OTP memory cell c1 is completed, plural read actions are performed to determine a multi-bit random code. For example, the OTP memory cell c1 comprises four antifuse transistors A1, A2, A3 and A4 (i.e., n=4). If the first antifuse transistor A1 is in the ruptured state, the two-bit logic value "00" is determined as the random code. If the second antifuse transistor A2 is in the ruptured state, the two-bit logic value "01" is determined as the random code. If the third antifuse transistor A3 is in the ruptured state, the two-bit logic value "10" is determined as the random code. If the fourth antifuse transistor A4 is in the ruptured state, the two-bit logic value "11" is determined as the random code. In an embodiment, the OTP memory cell c1 comprises n antifuse transistors, wherein $n=2^x$. After plural read actions are completed, an X-bit random code is generated.

As mentioned above, in the OTP memory cell c1 of FIGS. 15B and 15C, each of the doped regions 410, 412, 430 and 432 has the first dopant concentration, and the doped region 480 has the second dopant concentration. The first dopant concentration is higher than, lower than or equal to the second dopant concentration. In an embodiment, each of the gate dielectric layer 491 of the second gate structure, the gate dielectric layer 493 of the third gate structure, the gate dielectric layer 495 of the fourth gate structure and the gate dielectric layer 497 of the fifth gate structure has a thickness d1, and each of the gate dielectric layer 414 of the first gate structure and the gate dielectric layer 444 of the sixth gate structure has a thickness d2. The thickness d1 is smaller than or equal to the thickness d2.

Figure 16A:
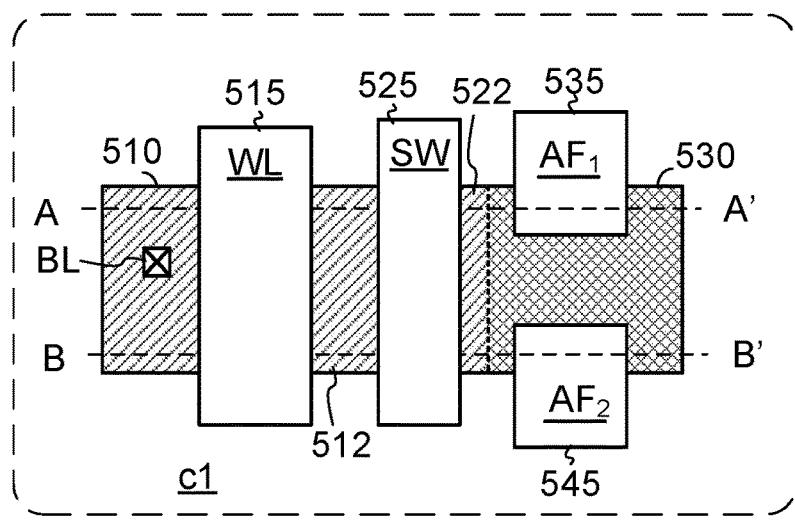
FIG. 16A is a schematic top view illustrating an OTP memory cell according to a ninth embodiment of the present invention.
Figure 16B:
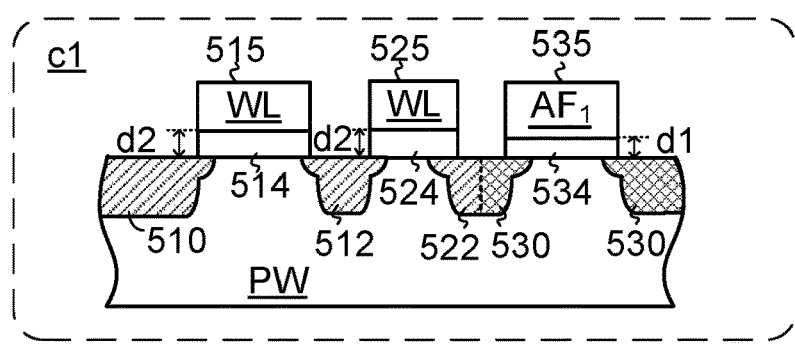
FIG. 16B is a schematic cross-sectional view illustrating the OTP memory cell of FIG. 16A and taken along a line AA'.
Figure 16C:
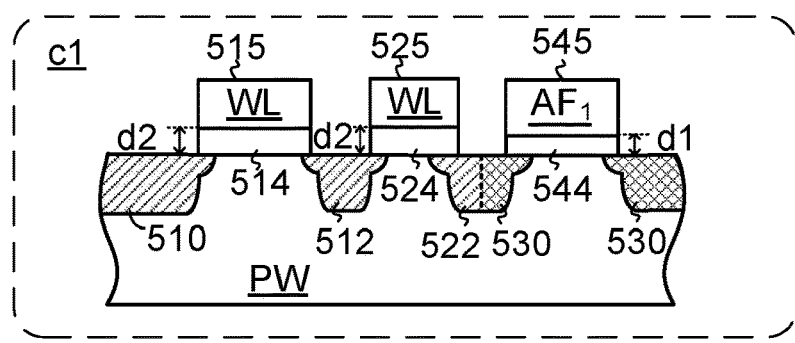
FIG. 16C is a schematic cross-sectional view illustrating the OTP memory cell of FIG. 16A and taken along a line BB'.
Figure 16D:
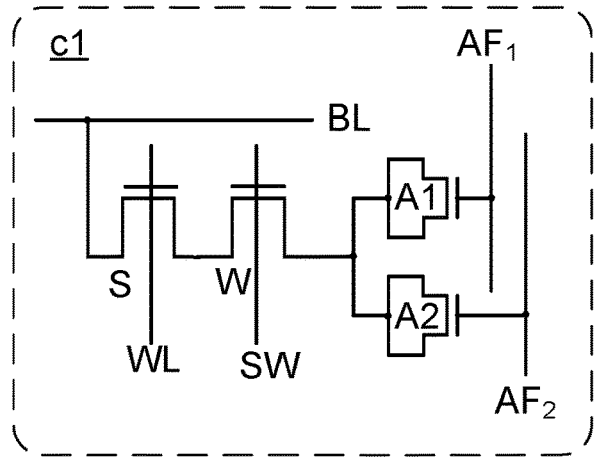
FIG. 16D is a schematic equivalent circuit diagram of the OTP memory cell according to the ninth embodiment of the present invention.

FIG. 16A is a schematic top view illustrating an OTP memory cell according to a ninth embodiment of the present invention. FIG. 16B is a schematic cross-sectional view illustrating the OTP memory cell of FIG. 16A and taken along a line AA'. FIG. 16C is a schematic cross-sectional view illustrating the OTP memory cell of FIG. 16A and taken along a line BB'. FIG. 16D is a schematic equivalent circuit diagram of the OTP memory cell according to the ninth embodiment of the present invention.

As shown in FIGS. 16A, 16B and 16C, the OTP memory cell c1 is constructed over a P-well region PW. In addition, four gate structures are formed on the surface of the P-well region PW. The first gate structure comprises a gate dielectric layer 514 and a gate layer 515. The second gate structure comprises a gate dielectric layer 524 and a gate layer 525. The third gate structure comprises a gate dielectric layer 534 and a gate layer 535. The fourth gate structure comprises a gate dielectric layer 544 and a gate layer 545.

After plural doping processes are performed, plural N-type doped regions are formed under the surface of the P-well region PW. Among these N-type doped regions, each of the doped regions 510, 512 and 522 has a first dopant concentration, and the doped region 530 has a second dopant concentration. It is noted that numerous modifications and alterations may be made while retaining the teachings of the invention. For example, in a variant example of the ninth embodiment, the OTP memory cell c1 is constructed over an N-well region, and all doped regions are P-type doped regions.

The first gate structure is arranged between the doped region 510 and the doped region 512. The second gate structure is arranged between the doped region 512 and the doped region 522. The third gate structure is located beside the doped region 530. The fourth gate structure is located beside the doped region 530. In addition, the doped region 522 and the doped region 530 are contacted with each other.

Moreover, the gate layer 515 of the first gate structure is connected with a word line WL of the OTP memory cell c1. The gate layer 525 of the second gate structure is connected with a switch control line SW of the OTP memory cell c1. The gate layer 535 of the third gate structure is connected with a first antifuse control line $AF_1$ of the OTP memory cell c1. The gate layer 545 of the fourth gate structure is connected with a second antifuse control line $AF_2$ of the OTP memory cell c1. In addition, the doped region 510 is connected with a bit line BL.

In this embodiment, the doped region 510, the doped region 512 and the first gate structure are collaboratively formed as a select transistor S. The doped region 512, the doped region 522 and the second gate structure are collaboratively formed as a switch transistor W. The doped region 530 and the third gate structure are collaboratively formed as a first antifuse transistor A1. The doped region 530 and the fourth gate structure are collaboratively formed as a second antifuse transistor A2.

Please refer to FIG. 16D. The first drain/source terminal of the select transistor S is connected with the bit line BL. The gate terminal of the select transistor S is connected with the word line WL. The first drain/source terminal of the switch transistor W is connected with the second drain/source terminal of the select transistor S. The gate terminal of the switch transistor W is connected with the switch control line SW. The two drain/source terminals of the first antifuse transistor A1 are connected with the second drain/source terminal of the switch transistor W. The gate terminal of the first antifuse transistor A1 is connected with the first antifuse control line $AF_1$. The two drain/source terminals of the second antifuse transistor A2 are connected with the second drain/source terminal of the switch transistor W. The gate terminal of the second antifuse transistor A2 is connected with the second antifuse control line $AF_2$.

In this embodiment, the OTP memory cell c1 comprises two storing circuits. That is, the first antifuse transistor A1 is a first storing circuit, and the second antifuse transistor A2 is a second storing circuit. By providing proper bias voltages, an enroll action or a read action is selectively performed on the OTP memory cell c1. During the enroll action of the OTP memory cell c1, a high voltage stress is applied to both of the first antifuse transistor A1 and the second antifuse transistor A2. Under this circumstance, one of the gate dielectric layers 534 and 544 of the first antifuse transistor A1 and the second antifuse transistor A2 is ruptured. Consequently, the storage state is changed.

When the read action is performed on the OTP memory cell c1, a random code for the PUF technology can be determined according to the result of judging whether the first antifuse transistor A1 is in the ruptured state or the unruptured state. For example, in case that the first antifuse transistor A1 is in the ruptured state, the logic value "1" is determined as the random code. Whereas, in case that the first antifuse transistor A1 is in the unruptured state, the logic value "0" is determined as the random code.

As mentioned above, each of the doped regions 510, 512 and 522 has the first dopant concentration, and the doped region 530 has the second dopant concentration. The first dopant concentration is higher than, lower than or equal to the second dopant concentration. In an embodiment, each of the gate dielectric layer 534 of the third gate structure and the gate dielectric layer 544 of the fourth gate structure has a thickness d1, and each of the gate dielectric layer 514 of the first gate structure and the gate dielectric layer 524 of the second gate structure has a thickness d2. The thickness d1 is smaller than or equal to the thickness d2.

Figure 17:
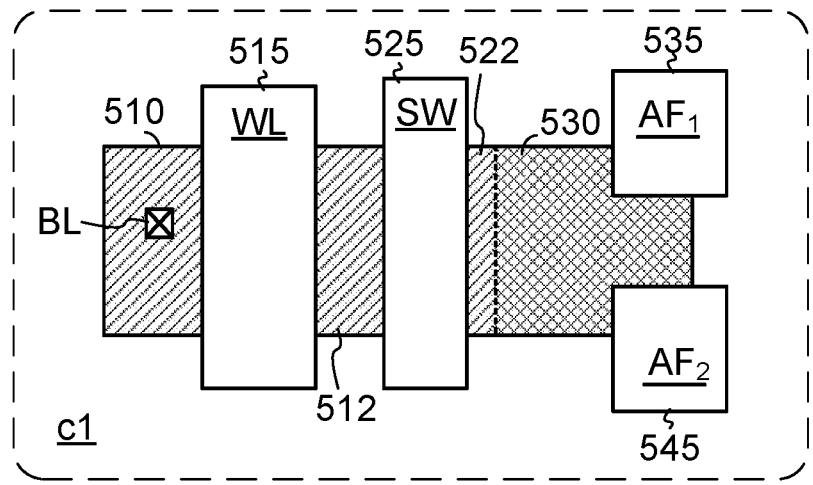
FIG. 17 is a schematic top view illustrating a variant example of the OTP memory cell according to the ninth embodiment of the present invention.

In order to increase the enrolling efficiency, the structure of the OTP memory cell in the ninth embodiment may be further modified. FIG. 17 is a schematic top view illustrating a variant example of the OTP memory cell according to the ninth embodiment of the present invention. In comparison with the ninth embodiment of FIG. 16A, the third gate structure and the fourth gate structure of the OTP memory cell c1 in this embodiment are located at the corners of the doped region 530. Due to the corona discharge effect, one of the gate dielectric layers 534 and 544 of the first antifuse transistor A1 and the second antifuse transistor A2 can be ruptured more easily. Consequently, the enrolling efficiency is enhanced.

Figure 18:
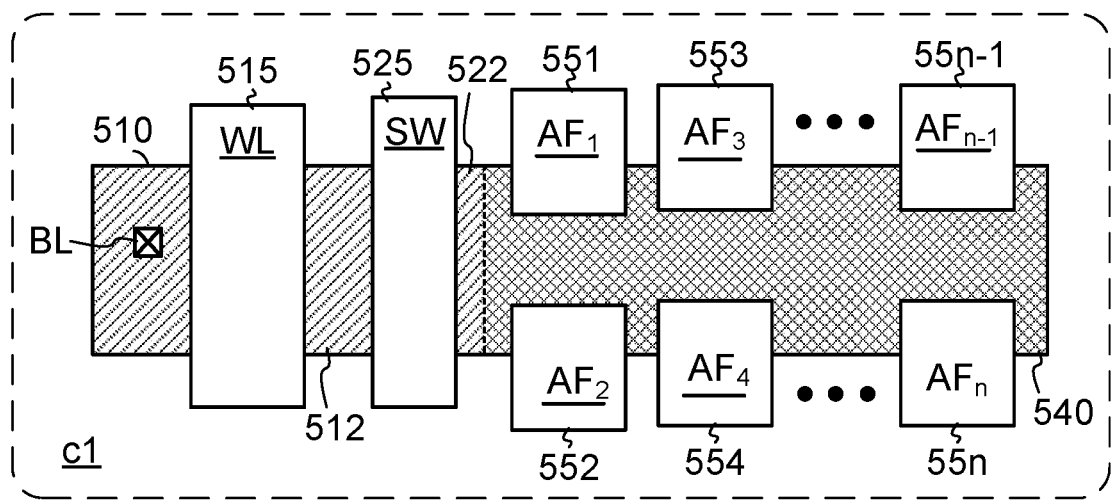
FIG. 18 is a schematic top view illustrating an OTP memory cell according to a tenth embodiment of the present invention.

FIG. 18 is a schematic top view illustrating an OTP memory cell according to a tenth embodiment of the present invention. In comparison with the ninth embodiment of FIG. 16A, the OTP memory cell c1 of this embodiment is equipped with more gate structures. As shown in FIG. 18, n gate structures are formed over the doped region 540 with the second dopant concentration, wherein n is an even number larger than or equal to 4. The gate layers 551~55n of the n gate structures are respectively connected with the corresponding n antifuse control lines $AF_1$~$AF_n$. In other words, the OTP memory cell c1 comprises (n+2) gate structures. For illustration, the number n in the following embodiment of the OTP memory cell c1 is 4. That is, the OTP memory cell c1 comprises six gate structures.

Figure 19A:
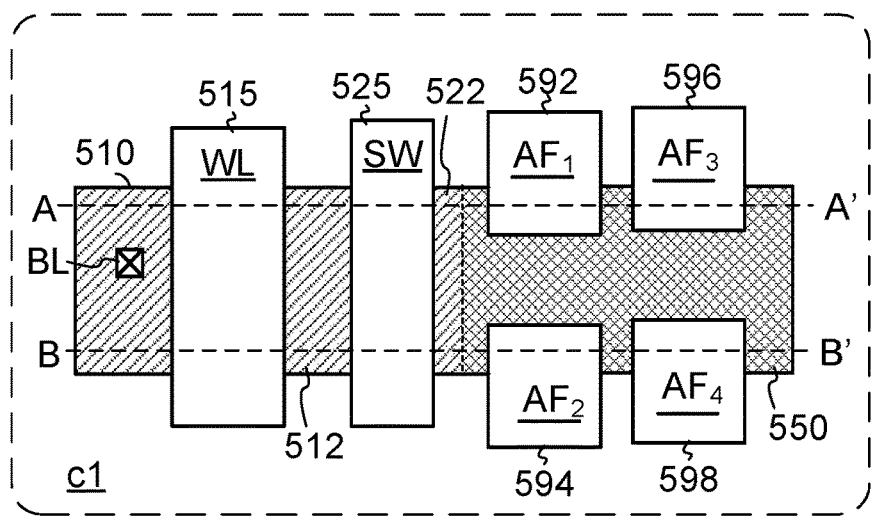
FIG. 19A is a schematic top view illustrating an OTP memory cell with six gate structures according to a tenth embodiment of the present invention.
Figure 19B:
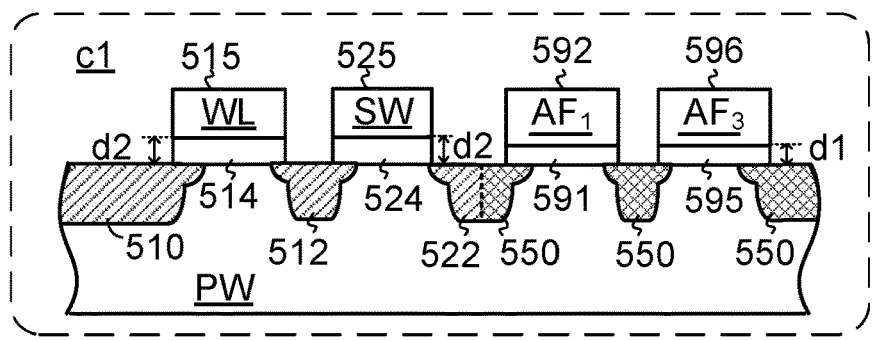
FIG. 19B is a schematic cross-sectional view illustrating the OTP memory cell of FIG. 19A and taken along a line AA'.
Figure 19C:
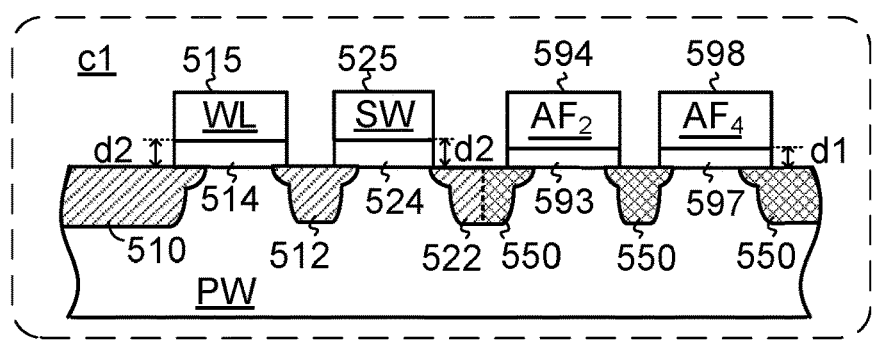
FIG. 19C is a schematic cross-sectional view illustrating the OTP memory cell of FIG. 19A and taken along a line BB'.
Figure 19D:
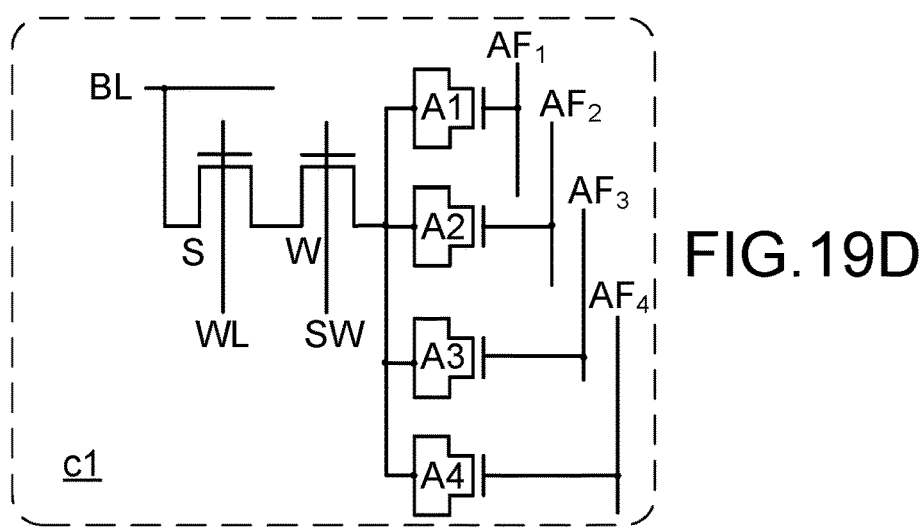
FIG. 19D is a schematic equivalent circuit diagram of the OTP memory cell according to the tenth embodiment of the present invention.

FIG. 19A is a schematic top view illustrating an OTP memory cell with six gate structures according to a tenth embodiment of the present invention. FIG. 19B is a schematic cross-sectional view illustrating the OTP memory cell of FIG. 19A and taken along a line AA'. FIG. 19C is a schematic cross-sectional view illustrating the OTP memory cell of FIG. 19A and taken along a line BB'. FIG. 19D is a schematic equivalent circuit diagram of the OTP memory cell according to the tenth embodiment of the present invention.

As shown in FIGS. 19A, 19B and 19C, the OTP memory cell c1 is constructed over a P-well region PW. In addition, six gate structures are formed on the surface of the P-well region PW. The first gate structure comprises a gate dielectric layer 514 and a gate layer 515. The second gate structure comprises a gate dielectric layer 524 and a gate layer 525. The third gate structure comprises a gate dielectric layer 591 and a gate layer 592. The fourth gate structure comprises a gate dielectric layer 593 and a gate layer 594. The fifth gate structure comprises a gate dielectric layer 595 and a gate layer 596. The sixth gate structure comprises a gate dielectric layer 597 and a gate layer 598.

After plural doping processes are performed, plural N-type doped regions are formed under the surface of the P-well region PW. Among these N-type doped regions, each of the doped regions 510, 512 and 522 has a first dopant concentration, and the doped region 550 has a second dopant concentration. It is noted that numerous modifications and alterations may be made while retaining the teachings of the invention. For example, in a variant example of the tenth embodiment, the OTP memory cell c1 is constructed over an N-well region, and all doped regions are P-type doped regions.

The first gate structure is arranged between the doped region 510 and the doped region 512. The second gate structure is arranged between the doped region 512 and the doped region 522. The third gate structure is located beside the doped region 550. The fourth gate structure is located beside the doped region 550. The fifth gate structure is located beside the doped region 550. The sixth gate structure is located beside the doped region 550. In addition, the doped region 522 and the doped region 550 are contacted with each other.

Moreover, the gate layer 515 of the first gate structure is connected with a word line WL of the OTP memory cell c1. The gate layer 525 of the second gate structure is connected with a switch control line SW of the OTP memory cell c1. The gate layer 592 of the third gate structure is connected with a first antifuse control line $AF_1$ of the OTP memory cell c1. The gate layer 594 of the fourth gate structure is connected with a second antifuse control line $AF_2$ of the OTP memory cell c1. The gate layer 596 of the fifth gate structure is connected with a third antifuse control line $AF_3$ of the OTP memory cell c1. The gate layer 598 of the sixth gate structure is connected with a fourth antifuse control line $AF_4$ of the OTP memory cell c1. In addition, the doped region 510 is connected with a bit line BL.

In this embodiment, the doped region 510, the doped region 512 and the first gate structure are collaboratively formed as a select transistor S. The doped region 512, the doped region 522 and the second gate structure are collaboratively formed as a switch transistor W. The doped region 550 and the third gate structure are collaboratively formed as a first antifuse transistor A1. The doped region 550 and the fourth gate structure are collaboratively formed as a second antifuse transistor A2. The doped region 550 and the fifth gate structure are collaboratively formed as a third antifuse transistor A3. The doped region 550 and the sixth gate structure are collaboratively formed as a fourth antifuse transistor A4.

Please refer to FIG. 19D. The first drain/source terminal of the select transistor S is connected with the bit line BL. The gate terminal of the select transistor S is connected with the word line WL. The first drain/source terminal of the switch transistor W is connected with the second drain/source terminal of the select transistor S. The gate terminal of the switch transistor W is connected with the switch control line SW. The two drain/source terminals of the first antifuse transistor A1 are connected with the second drain/source terminal of the switch transistor W. The gate terminal of the first antifuse transistor A1 is connected with the first antifuse control line $AF_1$. The two drain/source terminals of the second antifuse transistor A2 are connected with the second drain/source terminal of the switch transistor W. The gate terminal of the second antifuse transistor A2 is connected with the second antifuse control line $AF_2$. The two drain/source terminals of the third antifuse transistor A3 are connected with the second drain/source terminal of the switch transistor W. The gate terminal of the third antifuse transistor A3 is connected with the third antifuse control line $AF_3$. The two drain/source terminals of the fourth antifuse transistor A4 are connected with the second drain/source terminal of the switch transistor W. The gate terminal of the fourth antifuse transistor A4 is connected with the fourth antifuse control line $AF_4$.

In this embodiment, the OTP memory cell c1 comprises four storing circuits. That is, the first antifuse transistor A1 is a first storing circuit, the second antifuse transistor A2 is a second storing circuit, the third antifuse transistor A3 is a third storing circuit, and the fourth antifuse transistor A4 is a fourth storing circuit. By providing proper bias voltages, an enroll action or a read action is selectively performed on the OTP memory cell c1. During the enroll action of the OTP memory cell c1, a high voltage stress is applied to all of the antifuse transistors A1-A4. Under this circumstance, one of the gate dielectric layers 591, 593, 595 and 597 of the antifuse transistors A1-A4 is ruptured. Consequently, the storage state is changed.

After one or plural read actions are performed on the OTP memory cell c1, a one-bit random code or a multi-bit random code is generated. The operation of the OTP memory cell c1 in the tenth embodiment is similar to those of the second embodiment, and it is not described herein.

When the enroll action is performed, the select voltage Vdd is provided to the word line WL. Consequently, the select transistor S is turned on. In addition, a switching voltage Vsw is provided to the switch control line SW.

Consequently, the switch transistor W is turned on. Under this circumstance, a voltage stress of the Vpp is applied to the gate dielectric layers of all of the first antifuse transistor A1, the second antifuse transistor A2, the third antifuse transistor A3 and the fourth antifuse transistor A4. Consequently, one of the gate dielectric layers of the first antifuse transistor A1, the second antifuse transistor A2, the third antifuse transistor A3 and the fourth antifuse transistor A4 is ruptured. The ruptured gate dielectric layer is in a ruptured state corresponding to the low resistance value.

After the enroll action of the OTP memory cell c1 is completed, a read action is performed to determine the one-bit random code. Similarly, in case that the OTP memory cell c1 comprises n antifuse transistors, these n antifuse transistors are classified into two groups, wherein n is an even higher than or equal to 4. Each group contains (n/2) antifuse transistors. If the antifuse transistor in the ruptured state belongs to the first group, it means that one of the antifuse transistors in the first group is in the ruptured state. Under this circumstance, the logic value "1" is determined as the one-bit random code. Whereas, if the antifuse transistor in the ruptured state does not belong to the first group, it means that all of the antifuse transistors in the first group are in the unruptured state. Under this circumstance, the logic value "0" is determined as the one-bit random code.

Similarly, after the enrolling action on the OTP memory cell c1 is completed, plural read actions are performed to determine a multi-bit random code. For example, the OTP memory cell c1 comprises four antifuse transistors A1, A2, A3 and A4. If the first antifuse transistor A1 is in the ruptured state, the two-bit logic value "00" is determined as the random code. If the second antifuse transistor A2 is in the ruptured state, the two-bit logic value "01" is determined as the random code. If the third antifuse transistor A3 is in the ruptured state, the two-bit logic value "10" is determined as the random code. If the fourth antifuse transistor A4 is in the ruptured state, the two-bit logic value "11" is determined as the random code. In an embodiment, the OTP memory cell c1 comprises n antifuse transistors, wherein n=$2^X$. After plural read actions are completed, an X-bit random code is generated.

As mentioned above, in this embodiment, each of the doped regions 510, 512 and 522 has the first dopant concentration, and the doped region 550 has the second dopant concentration. The first dopant concentration is higher than, lower than or equal to the second dopant concentration. In an embodiment, each of the gate dielectric layer 591 of the third gate structure, the gate dielectric layer 593 of the fourth gate structure, the gate dielectric layer 595 of the fifth gate structure and the gate dielectric layer 597 of the sixth gate structure has a thickness d1, and each of the gate dielectric layer 514 of the first gate structure and the gate dielectric layer 524 of the second gate structure has a thickness d2. The thickness d1 is smaller than or equal to the thickness d2.

Figure 20A:
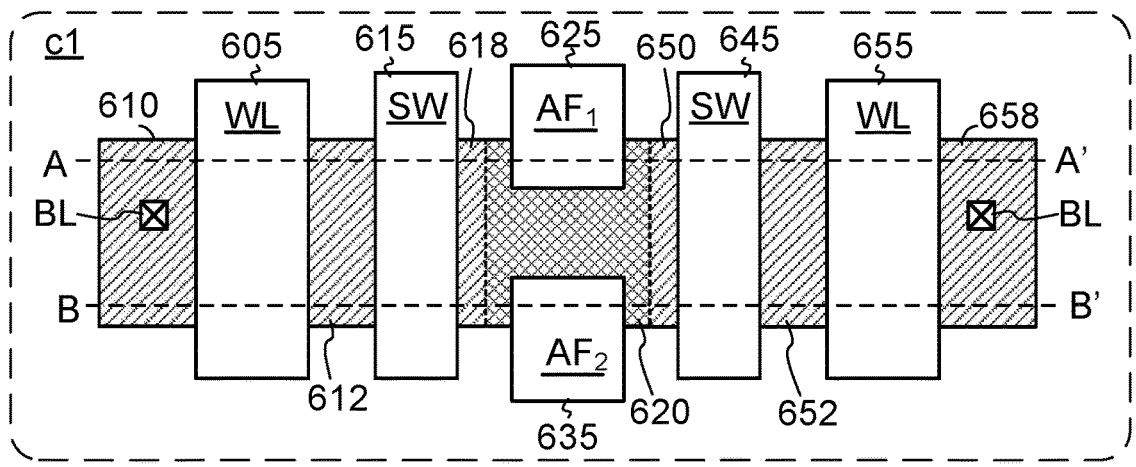
FIG. 20A is a schematic top view illustrating an OTP memory cell according to an eleventh embodiment of the present invention.
Figure 20B:
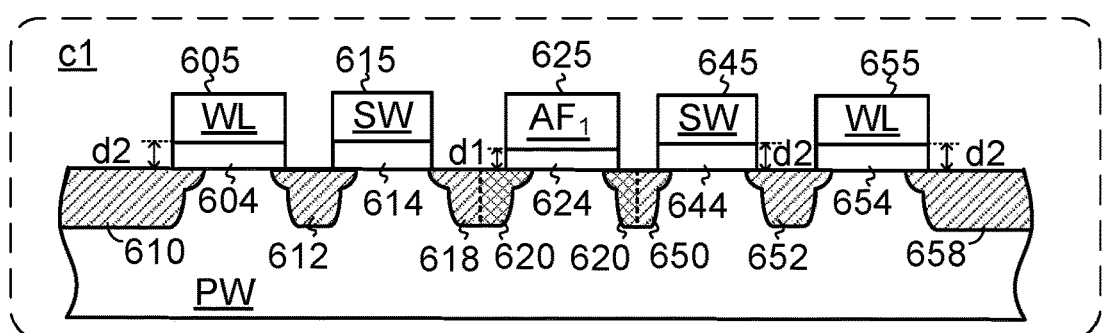
FIG. 20B is a schematic cross-sectional view illustrating the OTP memory cell of FIG. 20A and taken along a line AA'.
Figure 20C:
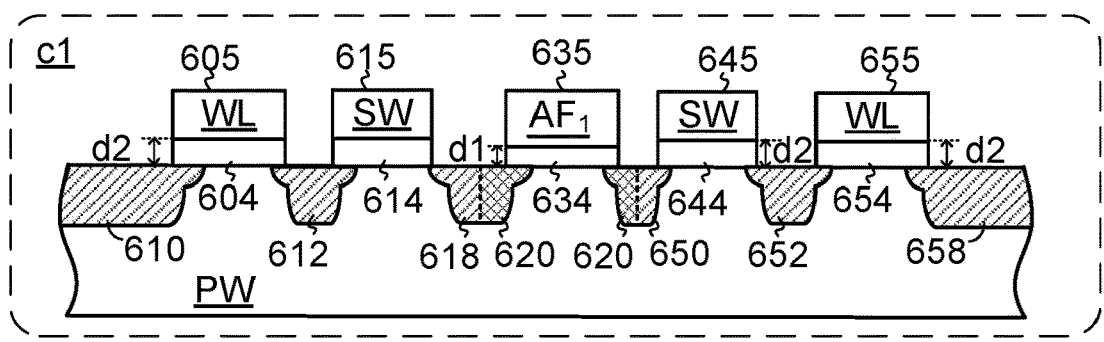
FIG. 20C is a schematic cross-sectional view illustrating the OTP memory cell of FIG. 20A and taken along a line BB'.
Figure 20D:
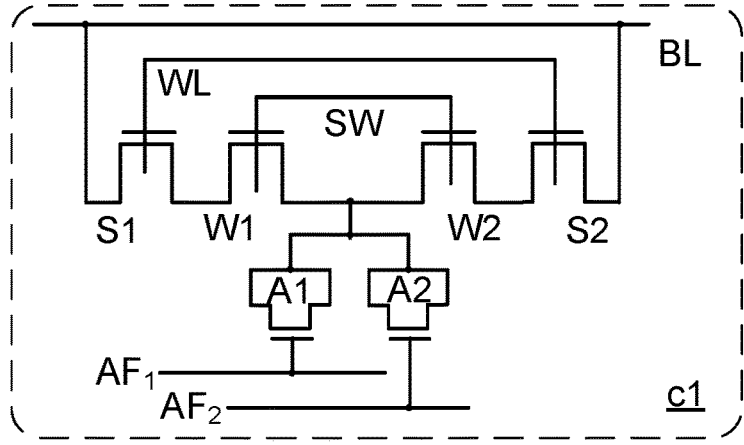
FIG. 20D is a schematic equivalent circuit diagram of the OTP memory cell according to the eleventh embodiment of the present invention.

FIG. 20A is a schematic top view illustrating an OTP memory cell according to an eleventh embodiment of the present invention. FIG. 20B is a schematic cross-sectional view illustrating the OTP memory cell of FIG. 20A and taken along a line AA'. FIG. 20C is a schematic cross-sectional view illustrating the OTP memory cell of FIG. 20A and taken along a line BB'. FIG. 20D is a schematic equivalent circuit diagram of the OTP memory cell according to the eleventh embodiment of the present invention.

As shown in FIGS. 20A, 20B and 20C, the OTP memory cell c1 is constructed over a P-well region PW. In addition, six gate structures are formed on the surface of the P-well region PW. The first gate structure comprises a gate dielectric layer 604 and a gate layer 605. The second gate structure comprises a gate dielectric layer 614 and a gate layer 615. The third gate structure comprises a gate dielectric layer 624 and a gate layer 625. The fourth gate structure comprises a gate dielectric layer 634 and a gate layer 635. The fifth gate structure comprises a gate dielectric layer 644 and a gate layer 645. The sixth gate structure comprises a gate dielectric layer 654 and a gate layer 655.

After plural doping processes are performed, plural N-type doped regions are formed under the surface of the P-well region PW. Among these N-type doped regions, each of the doped regions 610, 612, 618, 650, 652 and 658 has a first dopant concentration, and the doped region 620 has a second dopant concentration. It is noted that numerous modifications and alterations may be made while retaining the teachings of the invention. For example, in a variant example of the eleventh embodiment, the OTP memory cell c1 is constructed over an N-well region, and all doped regions are P-type doped regions.

The first gate structure is arranged between the doped region 610 and the doped region 612. The second gate structure is arranged between the doped region 612 and the doped region 618. The third gate structure is located beside the doped region 620. The fourth gate structure is located beside the doped region 620. The fifth gate structure is arranged between the doped region 650 and the doped region 652. The sixth gate structure is arranged between the doped region 652 and the doped region 658. In addition, the doped region 618 and the doped region 620 are contacted with each other, and the doped region 620 and the doped region 650 are contacted with each other.

Moreover, the gate layer 605 of the first gate structure is connected with a word line WL of the OTP memory cell c1. The gate layer 615 of the second gate structure is connected with a switch control line SW of the OTP memory cell c1. The gate layer 625 of the third gate structure is connected with a first antifuse control line $AF_1$ of the OTP memory cell c1. The gate layer 635 of the fourth gate structure is connected with a second antifuse control line $AF_2$ of the OTP memory cell c1. The gate layer 645 of the fourth gate structure is connected with the switch control line SW of the OTP memory cell c1. The gate layer 655 of the first gate structure is connected with the word line WL of the OTP memory cell c1. In addition, the doped regions 610, 658 are connected with a bit line BL.

In this embodiment, the doped region 610, the doped region 612 and the first gate structure are collaboratively formed as a first select transistor S1. The doped region 612, the doped region 618 and the second gate structure are collaboratively formed as a first switch transistor W1. The doped region 620 and the third gate structure are collaboratively formed as a first antifuse transistor A1. The doped region 620 and the fourth gate structure are collaboratively formed as a second antifuse transistor A2. The doped region 650, the doped region 652 and the fifth gate structure are collaboratively formed as a second switch transistor W2. The doped region 652, the doped region 658 and the sixth gate structure are collaboratively formed as a second select transistor S2.

Please refer to FIG. 20D. The first drain/source terminal of the first select transistor S1 is connected with the bit line BL. The gate terminal of the first select transistor S1 is connected with the word line WL. The first drain/source terminal of the first switch transistor W1 is connected with the second drain/source terminal of the first select transistor S1. The gate terminal of the first switch transistor W1 is connected with the switch control line SW. The first drain/source terminal of the second select transistor S2 is connected with the bit line BL. The gate terminal of the second select transistor S2 is connected with the word line WL. The first drain/source terminal of the second switch transistor W2 is connected with the second drain/source terminal of the second select transistor S2. The gate terminal of the second switch transistor W2 is connected with the switch control line SW. The second drain/source terminal of the second switch transistor W2 is connected with the second drain/source terminal of the first switch transistor W1. The two drain/source terminals of the first antifuse transistor A1 are connected with the second drain/source terminal of the first switch transistor W1. The gate terminal of the first antifuse transistor A1 is connected with the first antifuse control line $AF_1$. The two drain/source terminals of the second antifuse transistor A2 are connected with the second drain/source terminal of the first switch transistor W1. The gate terminal of the second antifuse transistor A2 is connected with the second antifuse control line $AF_2$.

In this embodiment, the OTP memory cell c1 comprises two storing circuits. That is, the first antifuse transistor A1 is a first storing circuit, and the second antifuse transistor A2 is a second storing circuit. By providing proper bias voltages, an enroll action or a read action is selectively performed on the OTP memory cell c1. During the enroll action of the OTP memory cell c1, a high voltage stress is applied to both of the first antifuse transistor A1 and the second antifuse transistor A2. Under this circumstance, one of the gate dielectric layers 624 and 634 of the first antifuse transistor A1 and the second antifuse transistor A2 is ruptured. Consequently, the storage state is changed.

When the read action is performed on the OTP memory cell c1, a random code for the PUF technology can be determined according to the result of judging whether the first antifuse transistor A1 is in the ruptured state or the unruptured state. For example, in case that the first antifuse transistor A1 is in the ruptured state, the logic value "1" is determined as the random code. Whereas, in case that the first antifuse transistor A1 is in the unruptured state, the logic value "0" is determined as the random code.

As mentioned above, each of the doped regions 610, 612, 618, 650, 652 and 658 has the first dopant concentration, and the doped region 620 has the second dopant concentration. The first dopant concentration is higher than, lower than or equal to the second dopant concentration. In an embodiment, each of the gate dielectric layer 624 of the third gate structure and the gate dielectric layer 634 of the fourth gate structure has a thickness d1, and each of the gate dielectric layer 604 of the first gate structure, the gate dielectric layer 614 of the second gate structure, the gate dielectric layer 644 of the fifth gate structure and the gate dielectric layer 654 of the sixth gate structure has a thickness d2. The thickness d1 is smaller than or equal to the thickness d2.

Figure 21:
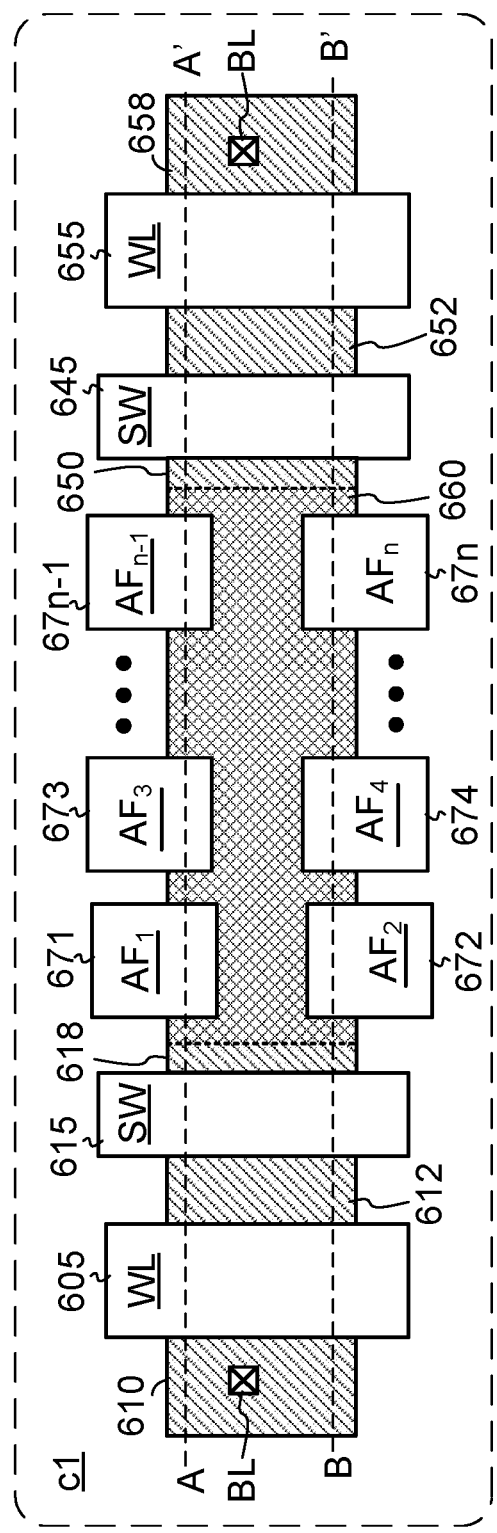
FIG. 21 is a schematic top view illustrating an OTP memory cell according to a twelfth embodiment of the present invention.

FIG. 21 is a schematic top view illustrating an OTP memory cell according to a twelfth embodiment of the present invention. In comparison with the eleventh embodiment of FIG. 20A, the OTP memory cell c1 of this embodiment is equipped with more gate structures. As shown in FIG. 21, n gate structures are formed over the doped region 660 with the second dopant concentration, wherein n is an even number larger than or equal to 4. The gate layers 671~67n of the n gate structures are respectively connected with the corresponding n antifuse control lines $AF_1$~$AF_n$. In other words, the OTP memory cell c1 comprises (n+4) gate structures. For illustration, the number n in the following embodiment of the OTP memory cell c1 is 4. That is, the OTP memory cell c1 comprises eight gate structures.

Figure 22A:
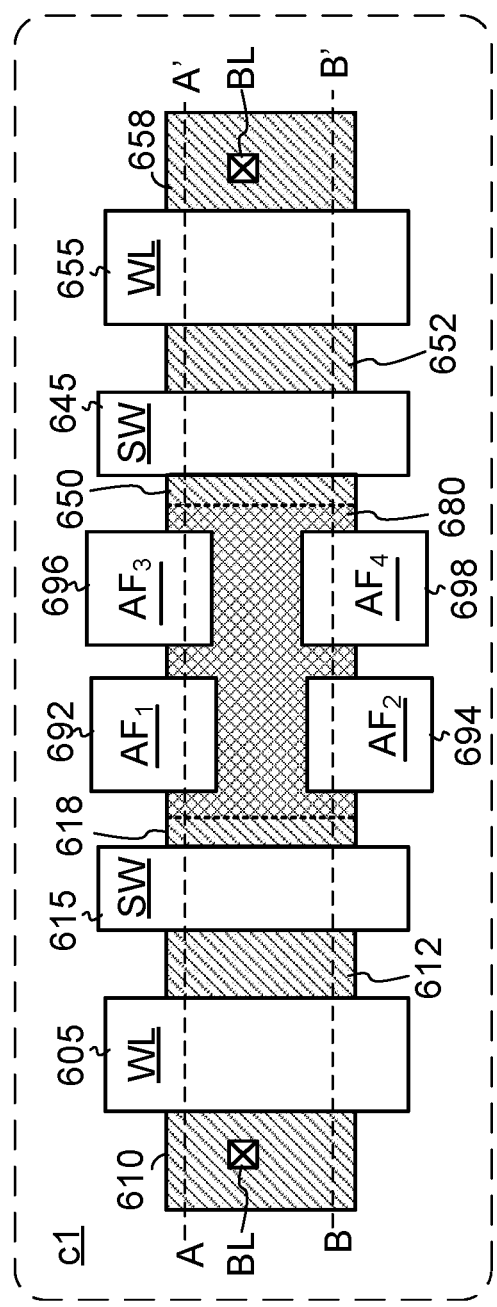
FIG. 22A is a schematic top view illustrating an OTP memory cell with eight gate structures according to a twelfth embodiment of the present invention.
Figure 22B:
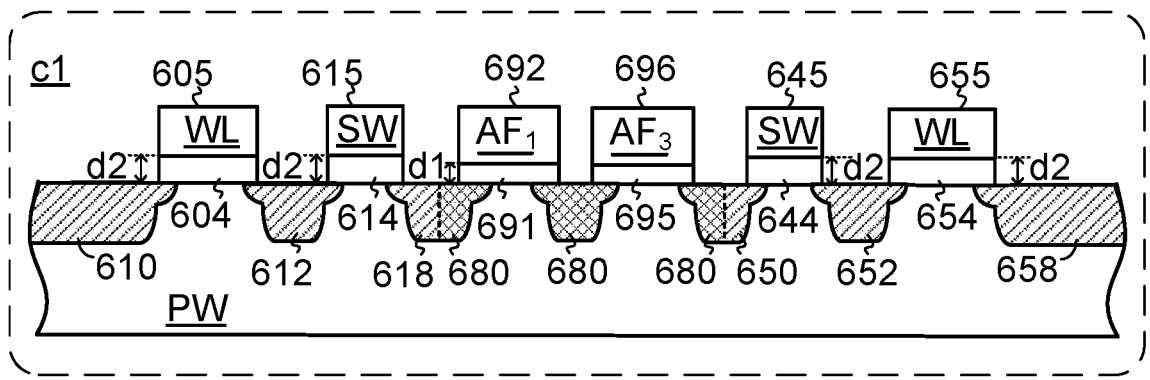
FIG. 22B is a schematic cross-sectional view illustrating the OTP memory cell of FIG. 22A and taken along a line AA'.
Figure 22C:
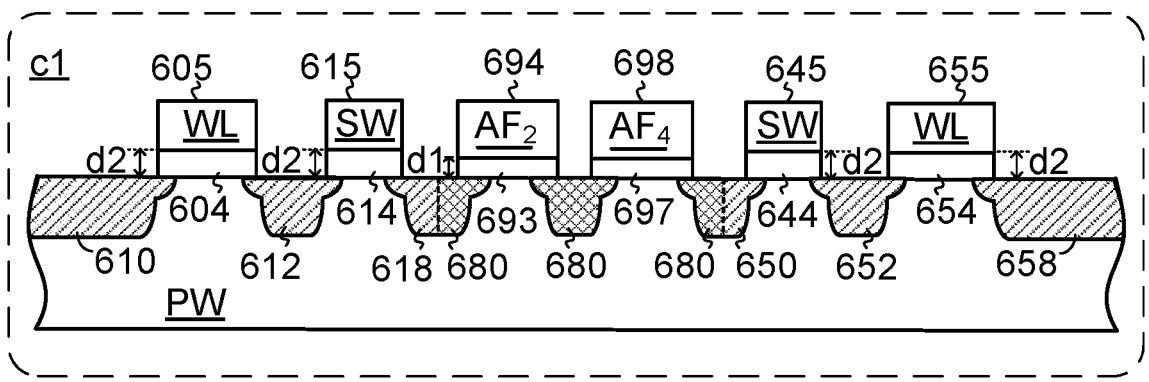
FIG. 22C is a schematic cross-sectional view illustrating the OTP memory cell of FIG. 22A and taken along a line BB'.
Figure 22D:
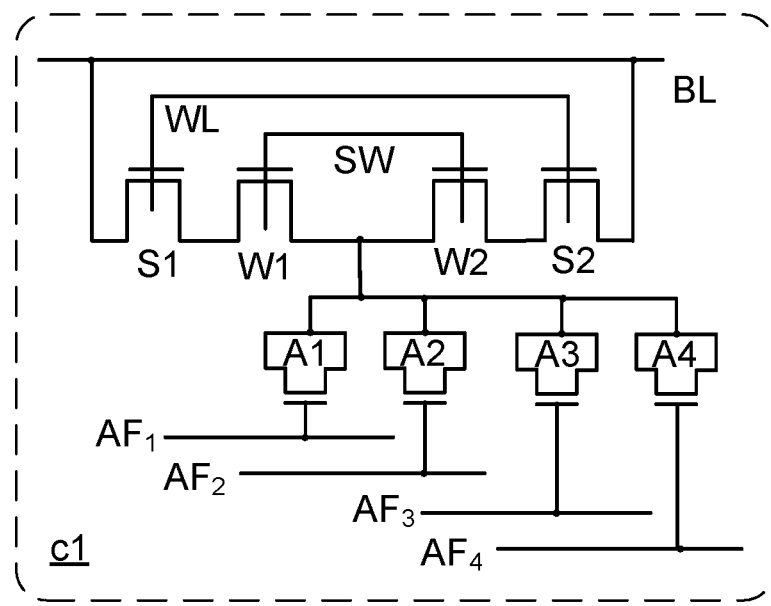
FIG. 22D is a schematic equivalent circuit diagram of the OTP memory cell according to the twelfth embodiment of the present invention.

FIG. 22A is a schematic top view illustrating an OTP memory cell with eight gate structures according to a twelfth embodiment of the present invention. FIG. 22B is a schematic cross-sectional view illustrating the OTP memory cell of FIG. 22A and taken along a line AA'. FIG. 22C is a schematic cross-sectional view illustrating the OTP memory cell of FIG. 22A and taken along a line BB'. FIG. 22D is a schematic equivalent circuit diagram of the OTP memory cell according to the twelfth embodiment of the present invention.

As shown in FIGS. 22A, 22B and 22C, the OTP memory cell c1 is constructed over a P-well region PW. In addition, eight gate structures are formed on the surface of the P-well region PW. The first gate structure comprises a gate dielectric layer 604 and a gate layer 605. The second gate structure comprises a gate dielectric layer 614 and a gate layer 615. The third gate structure comprises a gate dielectric layer 691 and a gate layer 692. The fourth gate structure comprises a gate dielectric layer 693 and a gate layer 694. The fifth gate structure comprises a gate dielectric layer 695 and a gate layer 696. The sixth gate structure comprises a gate dielectric layer 697 and a gate layer 698. The seventh gate structure comprises a gate dielectric layer 644 and a gate layer 645. The eighth gate structure comprises a gate dielectric layer 654 and a gate layer 655.

After plural doping processes are performed, plural N-type doped regions are formed under the surface of the P-well region PW. Among these N-type doped regions, each of the doped regions 610, 612, 618, 650, 652 and 658 has a first dopant concentration, and the doped region 680 has a second dopant concentration. It is noted that numerous modifications and alterations may be made while retaining the teachings of the invention. For example, in a variant example of the twelfth embodiment, the OTP memory cell c1 is constructed over an N-well region PW, and all doped regions are P-type doped regions.

The first gate structure is arranged between the doped region 610 and the doped region 612. The second gate structure is arranged between the doped region 612 and the doped region 618. The third gate structure is located beside the doped region 680. The fourth gate structure is located beside the doped region 680. The fifth gate structure is located beside the doped region 680. The sixth gate structure is located beside the doped region 680. The seventh gate structure is arranged between the doped region 650 and the doped region 652. The eighth gate structure is arranged between the doped region 652 and the doped region 658. In addition, the doped region 618 and the doped region 680 are contacted with each other, and the doped region 680 and the doped region 650 are contacted with each other.

Moreover, the gate layer 605 of the first gate structure is connected with a word line WL of the OTP memory cell c1. The gate layer 615 of the second gate structure is connected with a switch control line SW of the OTP memory cell c1. The gate layer 692 of the third gate structure is connected with a first antifuse control line $AF_1$ of the OTP memory cell c1. The gate layer 694 of the fourth gate structure is connected with a second antifuse control line $AF_2$ of the OTP memory cell c1. The gate layer 696 of the fifth gate structure is connected with a third antifuse control line $AF_3$ of the OTP memory cell c1. The gate layer 698 of the sixth gate structure is connected with a fourth antifuse control line $AF_4$ of the OTP memory cell c1. The gate layer 645 of the seventh gate structure is connected with the switch control line SW of the OTP memory cell c1. The gate layer 655 of the eighth gate structure is connected with the word line WL of the OTP memory cell c1. In addition, the doped regions 610 and 658 are connected with a bit line BL.

In this embodiment, the doped region 610, the doped region 612 and the first gate structure are collaboratively formed as a first select transistor S1. The doped region 612, the doped region 618 and the second gate structure are collaboratively formed as a first switch transistor W1. The doped region 680 and the third gate structure are collaboratively formed as a first antifuse transistor A1. The doped region 680 and the fourth gate structure are collaboratively formed as a second antifuse transistor A2. The doped region 680 and the fifth gate structure are collaboratively formed as a third antifuse transistor A3. The doped region 680 and the sixth gate structure are collaboratively formed as a fourth antifuse transistor A4. The doped region 650, the doped region 652 and the seventh gate structure are collaboratively formed as a second switch transistor W2. The doped region 652, the doped region 658 and the eighth gate structure are collaboratively formed as a second select transistor S2.

Please refer to FIG. 22D. The first drain/source terminal of the first select transistor S1 is connected with the bit line BL. The gate terminal of the first select transistor S1 is connected with the word line WL. The first drain/source terminal of the first switch transistor W1 is connected with the second drain/source terminal of the first select transistor S1. The gate terminal of the first switch transistor W1 is connected with the switch control line SW. The first drain/source terminal of the second select transistor S2 is connected with the bit line BL. The gate terminal of the second select transistor S2 is connected with the word line WL. The first drain/source terminal of the second switch transistor W2 is connected with the second drain/source terminal of the second select transistor S2. The gate terminal of the second switch transistor W2 is connected with the switch control line SW. The second drain/source terminal of the second switch transistor W2 is connected with the second drain/source terminal of the first switch transistor W1. The two drain/source terminals of the first antifuse transistor A1 are connected with the second drain/source terminal of the first switch transistor W1. The gate terminal of the first antifuse transistor A1 is connected with the first antifuse control line $AF_1$. The two drain/source terminals of the second antifuse transistor A2 are connected with the second drain/source terminal of the first switch transistor W1. The gate terminal of the second antifuse transistor A2 is connected with the second antifuse control line $AF_2$. The two drain/source terminals of the third antifuse transistor A3 are connected with the second drain/source terminal of the first switch transistor W1. The gate terminal of the third antifuse transistor A3 is connected with the third antifuse control line $AF_3$. The two drain/source terminals of the fourth antifuse transistor A4 are connected with the second drain/source terminal of the first switch transistor W1. The gate terminal of the fourth antifuse transistor A4 is connected with the fourth antifuse control line $AF_4$.

In this embodiment, the OTP memory cell c1 comprises four storing circuits. That is, the first antifuse transistor A1 is a first storing circuit, the second antifuse transistor A2 is a second storing circuit, the third antifuse transistor A3 is a third storing circuit, and the fourth antifuse transistor A4 is a fourth storing circuit. By providing proper bias voltages, an enroll action or a read action is selectively performed on the OTP memory cell c1. During the enroll action of the OTP memory cell c1, a high voltage stress is applied to all of the antifuse transistors A1~A4. Under this circumstance, one of the gate dielectric layers 691, 693, 695 and 697 of the antifuse transistors A1~A4 is ruptured. Consequently, the storage state is changed.

After one or plural read actions are performed on the OTP memory cell c1, a one-bit random code or a multi-bit random code is generated. The operations of the OTP memory cell c1 in the twelfth embodiment are similar to the operations of the OTP memory cell c1 in the second embodiment, and not redundantly described herein.

When the enroll action is performed, the select voltage Vdd is provided to the word line WL. Meanwhile, the first select transistor S1 and the second select transistor S2 are turned on, a switching voltage Vsw is provided to the switch control line SW, and the first switch transistor W1 and the second switch transistor W2 are turned on. Consequently, a voltage stress is applied to the gate dielectric layers of the first antifuse transistor A1, the second antifuse transistor A2, the third antifuse transistor A3 and the fourth antifuse transistor A4. Since the enroll voltage Vpp is beyond the withstanding voltage range of the gate dielectric layer, the gate dielectric layer of one of the first antifuse transistor A1, the second antifuse transistor A2, the third antifuse transistor A3 and the fourth antifuse transistor A4 is ruptured. The ruptured gate dielectric layer is in a ruptured state corresponding to the low resistance value.

Similarly, after the enrolling action on the OTP memory cell c1 is completed, a read action is performed to determine a one-bit random code. Similarly, in case that the OTP memory cell c1 comprises n antifuse transistors, these n antifuse transistors are classified into two groups. Each group contains (n/2) antifuse transistors. If the antifuse transistor in the ruptured state belongs to the first group, it means that one of the antifuse transistors in the first group is in the ruptured state. Under this circumstance, the logic value "1" is determined as the one-bit random code. Whereas, if the antifuse transistor in the ruptured state does not belong to the first group, it means that all of the antifuse transistors in the first group are in the unruptured state. Under this circumstance, the logic value "0" is determined as the one-bit random code. For example, n is an even number larger than or equal 4.

Similarly, after the enrolling action on the OTP memory cell c1 is completed, plural read actions are performed to determine a multi-bit random code. For example, the OTP memory cell c1 comprises four antifuse transistors A1, A2, A3 and A4. If the first antifuse transistor A1 is in the ruptured state, the two-bit logic value "00" is determined as the random code. If the second antifuse transistor A2 is in the ruptured state, the two-bit logic value "01" is determined as the random code. If the third antifuse transistor A3 is in the ruptured state, the two-bit logic value "10" is determined as the random code. If the fourth antifuse transistor A4 is in the ruptured state, the two-bit logic value "11" is determined as the random code. In an embodiment, the OTP memory cell c1 comprises n antifuse transistors, wherein $n=2^X$. After plural read actions are completed, an X-bit random code is generated.

As mentioned above, in the OTP memory cell c1 of FIGS. 22B and 22C, each of the doped regions 610, 612, 618, 650, 652 and 658 has the first dopant concentration, and the doped region 680 has the second dopant concentration. The first dopant concentration is higher than, lower than or equal to the second dopant concentration. In an embodiment, each of the gate dielectric layer 691 of the third gate structure, the gate dielectric layer 693 of the fourth gate structure, the gate dielectric layer 695 of the fifth gate structure and the gate dielectric layer 697 of the sixth gate structure has a thickness d1, and each of the gate dielectric layer 604 of the first gate structure, the gate dielectric layer 614 of the second gate structure, the gate dielectric layer 644 of the seventh gate structure and the gate dielectric layer 654 of the eighth gate structure has a thickness d2. The thickness d1 is smaller than or equal to the thickness d2.

Figure 23A:
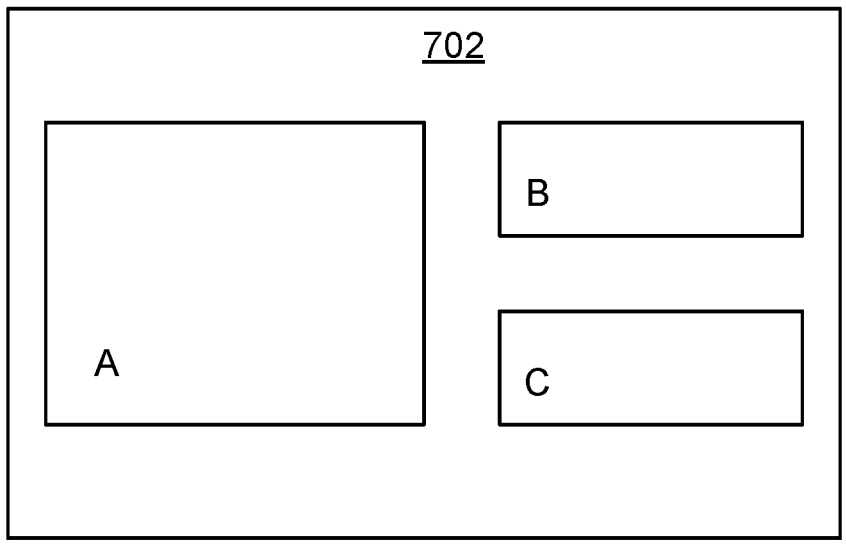
FIGS. 23A-23D are schematic top views illustrating a process of manufacturing an OTP memory cell according to a thirteenth embodiment of the present invention.
Figure 23B:
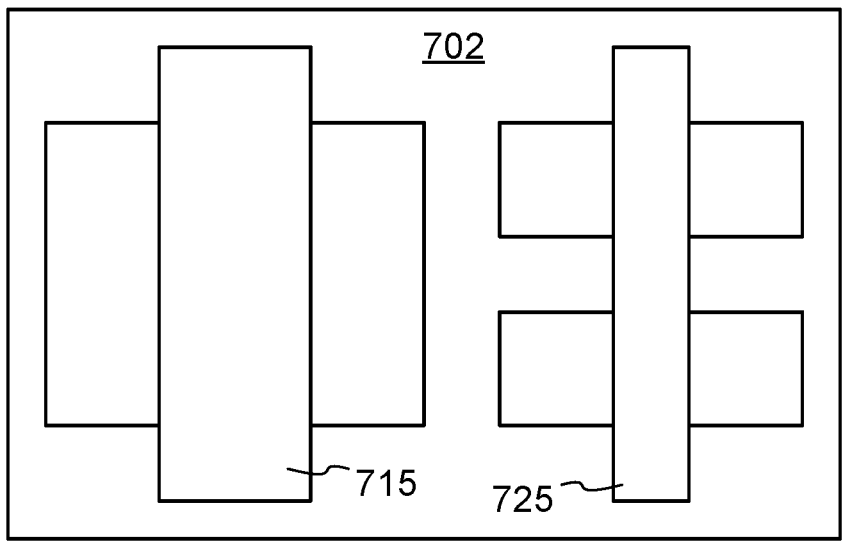
Figure 23C:
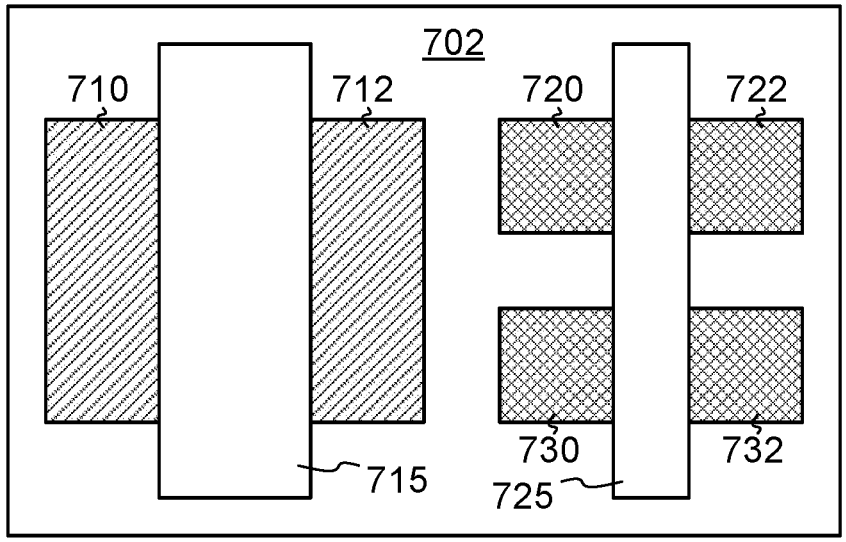
Figure 23D:
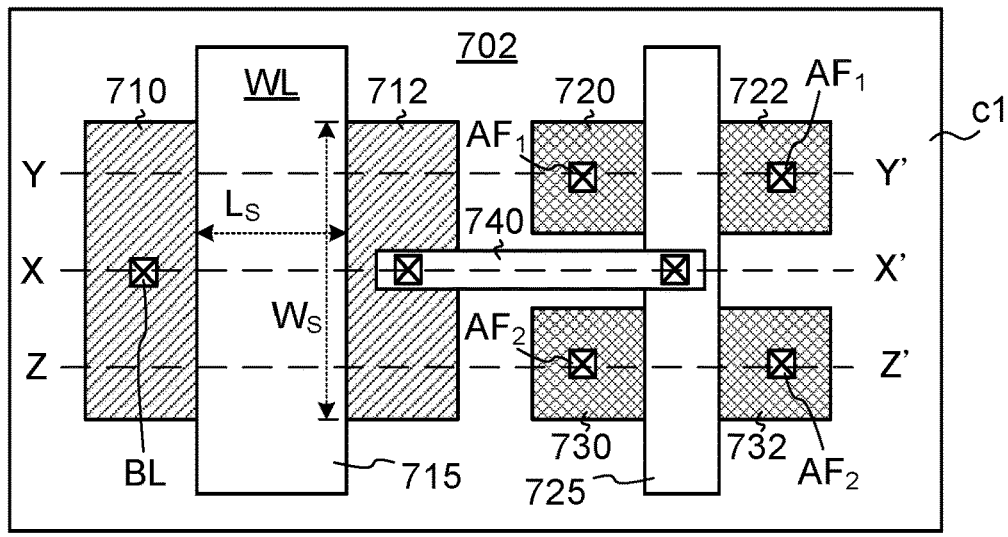
Figure 23E:
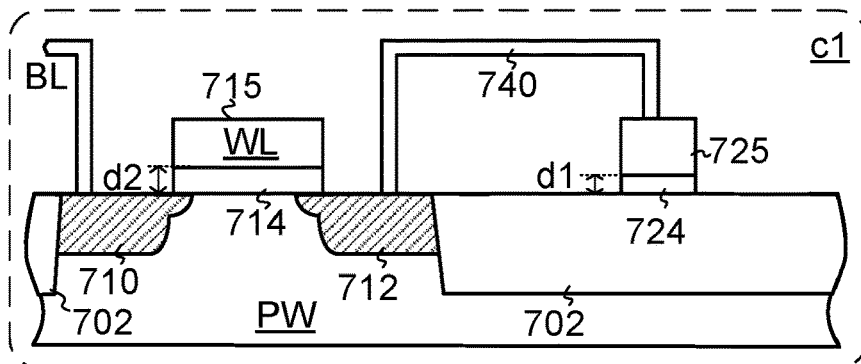
FIG. 23E is a schematic cross-sectional view illustrating the OTP memory cell of FIG. 23D and taken along a line XX'.
Figure 23F:
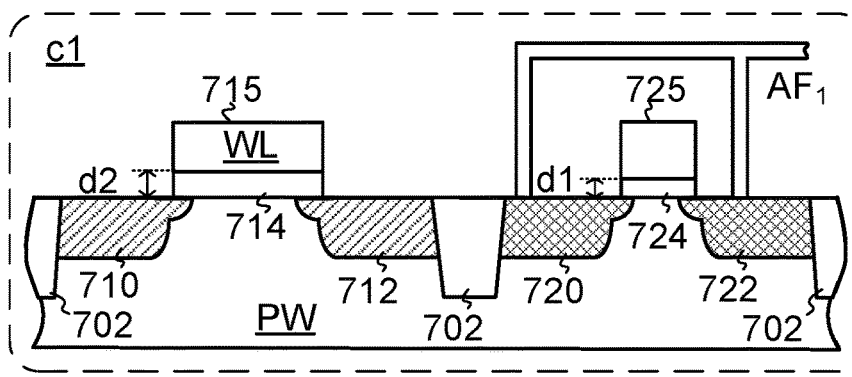
FIG. 23F is a schematic cross-sectional view illustrating the OTP memory cell of FIG. 23D and taken along a line YY'.
Figure 23G:
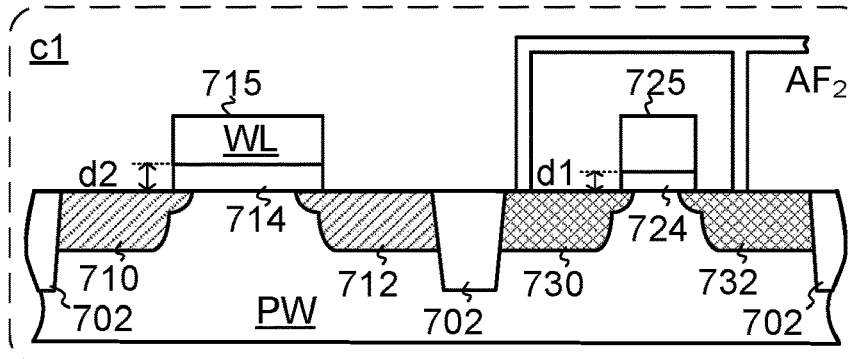
FIG. 23G is a schematic cross-sectional view illustrating the OTP memory cell of FIG. 23D and taken along a line ZZ'.
Figure 23H:
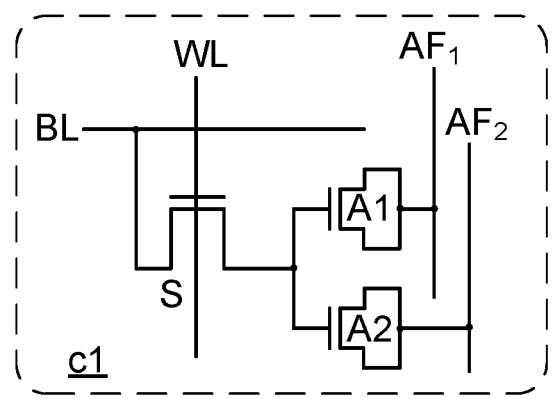
FIG. 23H is a schematic equivalent circuit diagram of the OTP memory cell according to the thirteenth embodiment of the present invention.

FIGS. 23A-23D are schematic top views illustrating a process of manufacturing an OTP memory cell according to a thirteenth embodiment of the present invention. FIG. 23E is a schematic cross-sectional view illustrating the OTP memory cell of FIG. 23D and taken along a line XX'. FIG. 23F is a schematic cross-sectional view illustrating the OTP memory cell of FIG. 23D and taken along a line YY'. FIG. 23G is a schematic cross-sectional view illustrating the OTP memory cell of FIG. 23D and taken along a line ZZ'. FIG. 23H is a schematic equivalent circuit diagram of the OTP memory cell according to the thirteenth embodiment of the present invention.

Firstly, an isolation structure forming process is performed. As shown in FIG. 23A, an isolation structure 702 is formed in a surface of the P-well region PW in a semiconductor substrate. In other words, the isolation structure 720 is formed to cover a portion of the P-well region PW. For example, the isolation structure 702 is a shallow trench isolation (STI) structure. By the isolation structure 702, three regions A, B and C are defined. That is, only the three regions A, B and C are exposed to the surface of the P-well region PW.

Then, a gate structure forming process is performed. As shown in FIG. 23B, a first gate structure and a second gate structure are formed. The first gate structure includes a gate layer 715, and the second gate structure includes a gate layer 725. The region A is covered by the first gate structure. Consequently, the region A is classified into two sub-regions by the first gate structure. The region B and the region C are covered by the second gate structure. Consequently, each of the region B and the region C is classified into two sub-regions by the second gate structure. In other words, the second gate structure is extended from the region B to the region C through the surface of the isolation structure 702.

Then, a doping region forming process is performed. As shown in FIG. 23C, a doping process is performed to form doped regions in the surface of the P-well region PW by using the first gate structure and the second gate structure as masks. Consequently, the sub-regions of the regions A, B and C uncovered by the first gate structure and the second gate structure are formed as doped regions 710, 712, 720, 722, 730 and 732. For example, the doped regions 710, 712, 720, 722, 730 and 732 are N-type doped regions.

After a connection process is performed to form a metal contact line, an OTP memory cell c1 is formed. As shown in FIG. 23D, the doped region 710 is connected with a bit line BL, the gate layer 715 of the first gate structure is connected with a word line WL, the metal contact line 740 is connected with the doped region 712 and the gate layer 725 of the second gate structure, the doped regions 720 and 722 are connected with a first antifuse control line $AF_1$, and the doping regions 730 and 732 are connected with the second antifuse control line $AF_2$.

Please refer to FIGS. 23D, 23E, 23F and 23G. The first gate structure comprises a gate dielectric layer 714 and the gate layer 715. The second gate structure comprises a gate dielectric layer 724 and the gate layer 725. In this embodiment, the doped region 710, the doped region 712 and the first gate structure are collaboratively formed as a select transistor S. The doped region 720, the doped region 722 and the second gate structure are collaboratively formed as a first antifuse transistor A1. The doped region 730, the doped region 732 and the second gate structure are collaboratively formed as a second antifuse transistor A2.

In the OTP memory cell c1 of this embodiment, all of the doped regions 710, 712, 720, 722, 730 and 732 are N-type doped regions, which are formed in the P-well region PW. It is noted that numerous modifications and alterations may be made while retaining the teachings of the invention. For example, in a variant example of the thirteenth embodiment, the OTP memory cell c1 is constructed over an N-well region, and all of the doped regions 710, 712, 720, 722, 730 and 732 are P-type doped regions. In another variant example of the thirteenth embodiment, the doped regions 710 and 712 are N-type doped regions formed in the P-well region, and the doped regions 720, 722, 730 and 732 are P-type doped regions formed in the N-well region. In another variant example of the thirteenth embodiment, the doped regions 710 and 712 are P-type doped region formed in the N-well region, and the doped regions 720, 722, 730 and 732 are N-type doped regions formed in the P-well region.

Please refer to FIG. 23H. The first drain/source terminal of the select transistor S is connected with the bit line BL. The gate terminal of the select transistor S is connected with the word line WL. The gate terminal of the first antifuse transistor A1 is connected with the second drain/source terminal of the select transistor S. The two drain/source terminals of the first antifuse transistor A1 are connected with the first antifuse control line $AF_1$. The gate terminal of the second antifuse transistor A2 is connected with the second drain/source terminal of the select transistor S. The two drain/source terminals of the second antifuse transistor A2 are connected with the second antifuse control line $AF_2$.

In this embodiment, the OTP memory cell c1 comprises two storing circuits. That is, the first antifuse transistor A1 is a first storing circuit, and the second antifuse transistor A2 is a second storing circuit. By providing proper bias voltages, an enroll action or a read action is selectively performed on the OTP memory cell c1. During the enroll action of the OTP memory cell c1, a high voltage stress is applied to both of the first antifuse transistor A1 and the second antifuse transistor A2. Under this circumstance, one of the gate dielectric layers 724 and 734 of the first antifuse transistor A1 and the second antifuse transistor A2 is ruptured. Consequently, the storage state is changed.

When the read action is performed on the OTP memory cell c1, a random code for the PUF technology can be determined according to the result of judging whether the first antifuse transistor A1 is in the ruptured state or the unruptured state. For example, in case that the first antifuse transistor A1 is in the ruptured state, the logic value "1" is determined as the random code. Whereas, in case that the first antifuse transistor A1 is in the unruptured state, the logic value "0" is determined as the random code.

In an embodiment, each of the doped regions 710 and 712 has a first dopant concentration, and each of the doped regions 720, 722, 730 and 732 has a second dopant concentration. The first dopant concentration is higher than, lower than or equal to the second dopant concentration. In an embodiment, the gate dielectric layer 724 of the second gate structure has a thickness d1, and the gate dielectric layer 714 of the first gate structure has a thickness d2. The thickness d1 is smaller than or equal to the thickness d2.

In an embodiment, the gate length of the select transistor S is $L_s$, and the gate width of the select transistor S is $L_w$. Generally, the limited current allowed to be outputted from the select transistor S is determined according to the gate length $L_s$ and the gate width $L_w$ of the select transistor S. As known, in case that the enroll current generated by the OTP memory cell c1 during the enroll action is larger, the OTP memory cell c1 is possibly damaged. By properly designing the gate length $L_s$ and the gate width $L_w$ of the select transistor S, the limited current of the select transistor S is appropriately determined and the enroll current is lower than or equal to the limited current of the select transistor S. For example, the gate length $L_s$ and the gate width $L_w$ of the select transistor S can be 100 nm and 500 nm, respectively. Consequently, when the enroll action is performed, the OTP memory cell c1 will not be damaged.

Figure 24A:
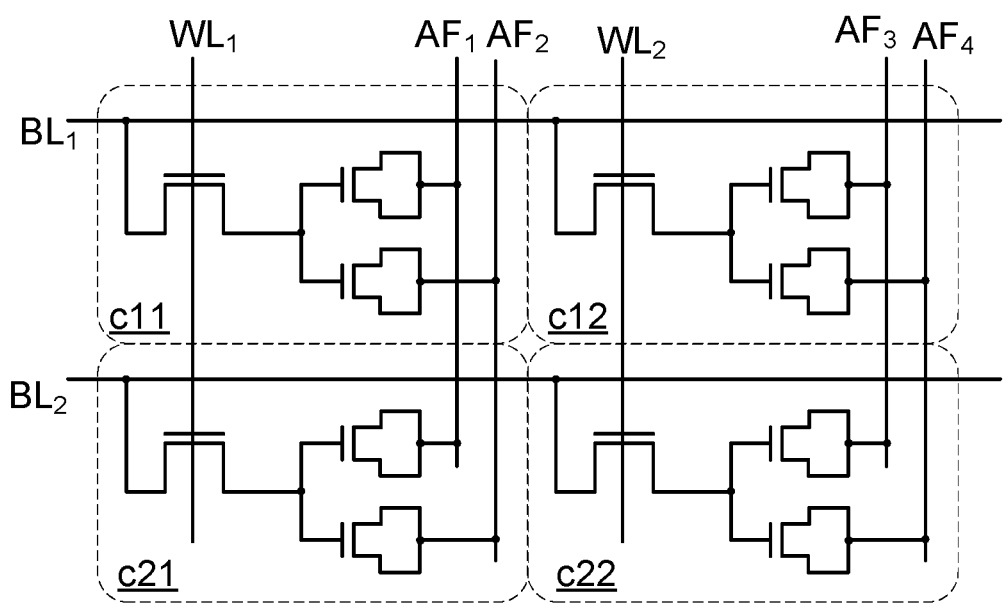
FIG. 24A is a schematic equivalent circuit diagram illustrating a memory array of OTP memory cells according to the thirteenth embodiment of the present invention.

FIG. 24A is a schematic equivalent circuit diagram illustrating a memory array of OTP memory cells according to the thirteenth embodiment of the present invention. As shown in FIG. 24A, the memory array comprises OTP memory cells c11~c22 in a 2×2 array arrangement. The structure of each of the OTP memory cells c11~c22 is similar to the structure of the OTP memory cell as shown in FIG. 23D. In this embodiment, each of the OTP memory cells c11~c22 comprises a select transistor, a first antifuse transistor A1 and a second antifuse transistor A2.

In the memory array, the memory cells c11 and c21 are connected with a first word line $WL_1$, a first antifuse control line $AF_1$ and a second antifuse control line $AF_2$, and the memory cells c12 and c22 are connected with a second word line $WL_2$, a third antifuse control line $AF_3$ and a fourth antifuse control line $AF_4$. In addition, the memory cells c11 and c12 are connected with a first bit line $BL_1$, and the memory cells c21 and c22 are connected with a second bit line $BL_2$.

Figure 24B:
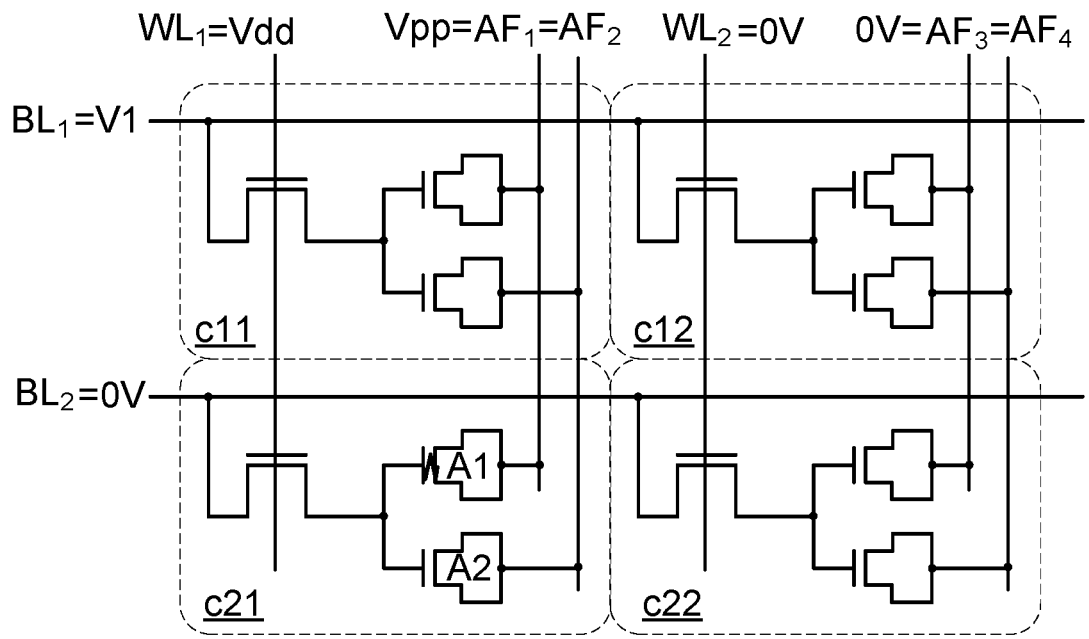
FIGS. 24B and 24C schematically illustrate associated voltage signals for programming and reading the memory array using the PUF technology according to the thirteenth embodiment of the present invention.
Figure 24C:
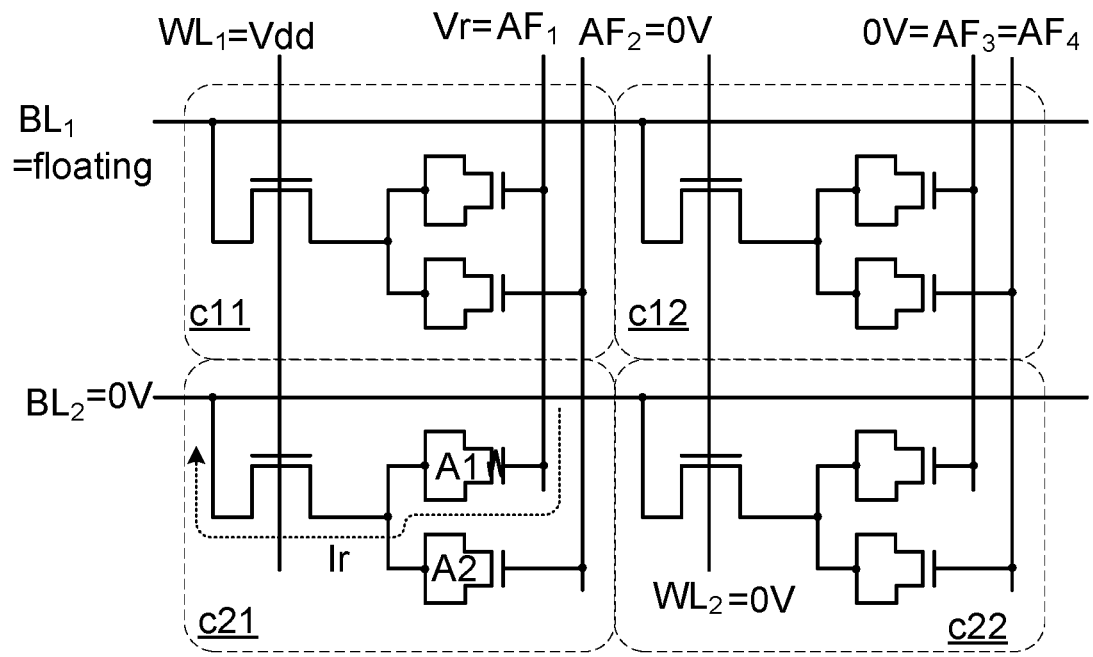

FIGS. 24B and 24C schematically illustrate associated voltage signals for programming and reading the memory array using the PUF technology according to the thirteenth embodiment of the present invention. For example, the OTP memory cell c21 is a selected memory cell.

Please refer to FIG. 24B. For programming the selected OTP memory cell c21, a ground voltage (0V) is provided to the second bit line $BL_2$, a select voltage Vdd is provided to the first word line $WL_1$, and an enroll voltage Vpp is provided to the first antifuse control line $AF_1$ and the second antifuse control line $AF_2$. For example, the select voltage Vdd is in the range between 0.75V and (2Vpp/3), and the enroll voltage Vpp is in the range between 3.6V and 11V.

The memory cells c11, c12 and c22 are unselected memory cells. For these unselected memory cells, a first voltage V1 is provided to the first second bit line $BL_1$, the ground voltage (0V) is provided to the second word line $WL_2$, and the ground voltage (0V) is provided to the third antifuse control line $AF_3$ and the fourth antifuse control line $AF_4$. In an embodiment, the first voltage V1 is higher than or equal to the select voltage Vdd, and the first voltage $V_1$ is low than a half of the enroll voltage Vpp (i.e., Vdd≤V1<Vpp/2).

Please refer to FIG. 24B again. Since the memory cell c21 is the selected memory cell, the voltage stress of the enroll voltage Vpp is applied to the gate dielectric layers of the first antifuse transistor A1 and the gate dielectric layer of the second antifuse transistor A2. Consequently, the gate dielectric layer of one of the first antifuse transistor A1 and the second antifuse transistor A2 is ruptured. The ruptured gate dielectric layer is in a ruptured state corresponding to the low resistance value. For example, in the memory cell c21 as shown in FIG. 24B, the gate dielectric layer of the first antifuse transistor A1 is ruptured, but the gate dielectric layer of the second antifuse transistor A2 is not ruptured.

In case that the OTP memory cell c11, c12 or c22 is the selected memory cell, the bias voltages for performing the enroll action are similar to those for the memory cell c21. The detailed descriptions will not be redundantly described herein.

After the enroll action on the selected memory cell c21 is completed, a read action is performed to judge the storage states of the two storing circuits of the selected memory cell c21. Please refer to FIG. 24C. When the read action is performed on the selected memory cell c21, the ground voltage (0V) is provided to the second bit line $BL_2$, the select voltage Vdd is provided to the first word line $WL_1$, a read voltage Vr is provided to the first antifuse control line $AF_1$, and the ground voltage (0V) is provided to the second antifuse control line $AF_2$. In an embodiment, the read voltage Vr is in the range between 0.75V and 3.6V.

For the unselected memory cells c11, c12 and c22, the first bit line $BL_1$ is in a floating state, the ground voltage (0V) is provided to the second word line $WL_2$, and the ground voltage (0V) is provided to the third antifuse control line $AF_3$ and the fourth antifuse control line $AF_4$.

Since the gate dielectric layer of the first antifuse transistor A1 in the selected memory cell c21 is ruptured, the read current Ir flowing through the second bit line $BL_2$ has a larger value. The first antifuse control line $AF_1$ is connected with the second bit line $BL_2$ through the first antifuse transistor A1 and the select transistor S. According to the read current, the first antifuse transistor A1 is verified to be in the ruptured state corresponding to the low resistance value. In case that the first antifuse transistor A1 is in the ruptured state, the logic value "1" is determined as the one-bit random code.

Furthermore, the storage states of the first antifuse transistor A1 and the second antifuse transistor A2 are complementary to each other. Consequently, a single read action is sufficient to confirm the storage state of the second antifuse transistor A2 and determine the one-bit random code. Alternatively, after two read actions are performed to confirm the storage states of the first antifuse transistor A1 and the second antifuse transistor A2, the one-bit random code is determined.

Moreover, after the enroll actions and the read actions on the four memory cells c11~c22 in the memory array are completed, a four-bit identity code for the PUF technology is generated.

Figure 25A:
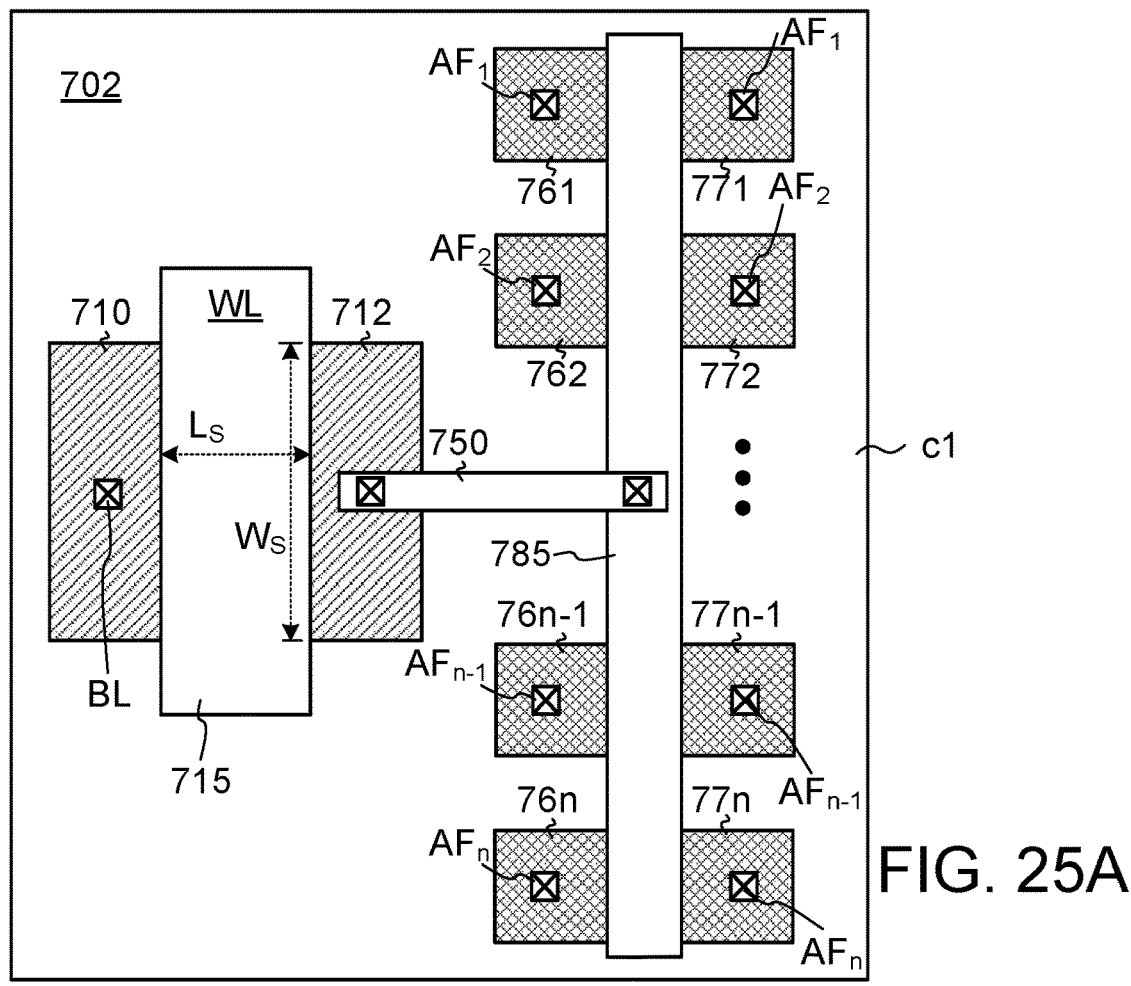
FIG. 25A is a schematic top view illustrating an OTP memory cell according to a fourteenth embodiment of the present invention.
Figure 25B:
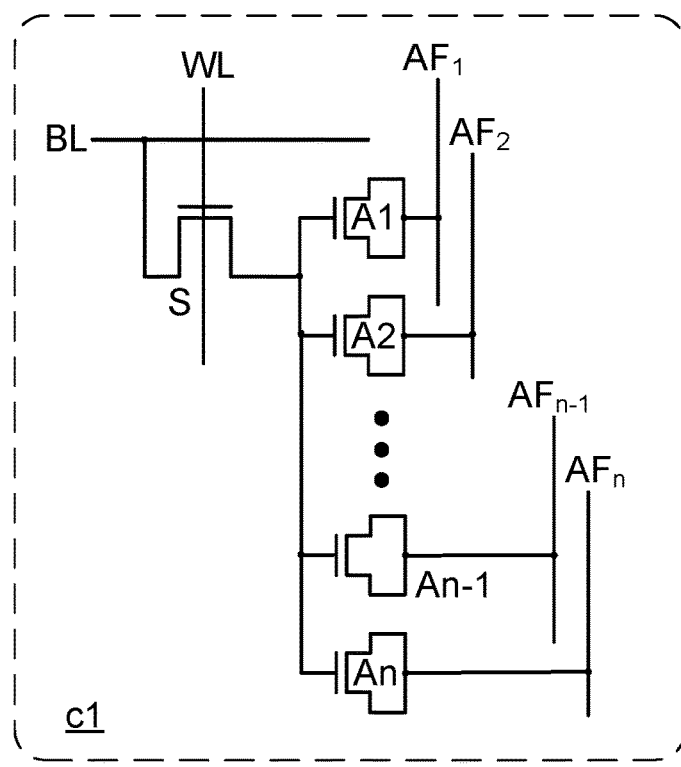
FIG. 25B is a schematic equivalent circuit diagram of the OTP memory cell according to the fourteenth embodiment of the present invention.

FIG. 25A is a schematic top view illustrating an OTP memory cell according to a fourteenth embodiment of the present invention. FIG. 25B is a schematic equivalent circuit diagram of the OTP memory cell according to the fourteenth embodiment of the present invention. The cross-sectional view of the OTP memory cell c1 of this embodiment is similar to that of the OTP memory cell c1 of the thirteenth embodiment, and not redundantly described herein.

In comparison with the thirteenth embodiment of FIG. 23D, the OTP memory cell c1 of this embodiment is equipped with more antifuse transistors. As shown in FIG. 25A, 2n doped regions 761~76n and 771~77n are formed in the P-well region PW, wherein n is an even number larger than or equal to 4.

The doped region 761, the doped region 771 and the second gate structure are collaboratively formed as a first antifuse transistor A1. The doped region 761 and the doped region 771 are connected with a first antifuse control line $AF_1$. The doped region 762, the doped region 772 and the second gate structure are collaboratively formed as a second antifuse transistor A2. The doped region 762, the doped region 772 are connected with a second antifuse control line $AF_2$. The rest may be deduced by analogy. The doped region 76n−1, the doped region 77n−1 and the second gate structure are collaboratively formed as an (n−1)-th antifuse transistor An−1. The doped region 76n−1 and the doped region 77n−1 are connected with an (n−1)-th antifuse control line $AF_{n-1}$. The doped region 76n, the doped region 77n and the second gate structure are collaboratively formed as an n-th antifuse transistor An. The doped region 76n and the doped region 77n are connected with an n-th antifuse control line $AF_n$.

The doped region 710, the doped region 712 and the first gate structure are collaboratively formed as a select transistor S. A metal contact line 750 is connected with the doped region 712 and the gate layer 785 of the second gate structure. Similarly, by properly designing the gate length $L_s$ and the gate width $L_w$ of the select transistor S, the limited current of the select transistor S is appropriately determined and the enroll current is lower than or equal to the limited current of the select transistor S. Consequently, when the enroll action is performed, the OTP memory cell c1 will not be damaged.

Please refer to FIG. 25B. The first drain/source terminal of the select transistor S is connected with a bit line BL. The gate terminal of the select transistor S is connected with a word line WL. The gate terminal of the first antifuse transistor A1 is connected with the second drain/source terminal of the select transistor S. The two drain/source terminals of the first antifuse transistor A1 are connected with the first antifuse control line $AF_1$. The gate terminal of the second antifuse transistor A2 is connected with the second drain/source terminal of the select transistor S. The two drain/source terminals of the second antifuse transistor A2 are connected with the second antifuse control line $AF_2$. The rest may be deduced by analogy. The gate terminal of the (n−1)-th antifuse transistor An−1 is connected with the second drain/source terminal of the select transistor S. The two drain/source terminals of the (n−1)-th antifuse transistor An−1 are connected with the (n−1)-th antifuse control line $AF_{n-1}$. The gate terminal of the n-th antifuse transistor An is connected with the second drain/source terminal of the select transistor S. The two drain/source terminals of the n-th antifuse transistor An are connected with the n-th antifuse control line $AF_n$.

In this embodiment, the OTP memory cell c1 comprises n storing circuits, i.e., the n antifuse transistors A1~An. By providing proper bias voltages, an enroll action or a read action is selectively performed on the OTP memory cell c1. During the enroll action of the OTP memory cell c1, a high voltage stress is applied to all of the n antifuse transistors A1~An. Under this circumstance, the gate dielectric layer of one of the n antifuse transistors A1~An is ruptured. Consequently, the storage state is changed.

After one or plural read actions are performed on the OTP memory cell c1, a one-bit random code or a multi-bit random code is generated.

Similarly, after the enrolling action on the OTP memory cell c1 is completed, a read action is performed to determine a one-bit random code. Similarly, in case that the OTP memory cell c1 comprises n antifuse transistors, these n antifuse transistors are classified into two groups. Each group contains (n/2) antifuse transistors. If the antifuse transistor in the ruptured state belongs to the first group, it means that one of the antifuse transistors in the first group is in the ruptured state. Under this circumstance, the logic value "1" is determined as the one-bit random code. Whereas, if the antifuse transistor in the ruptured state does not belong to the first group, it means that all of the antifuse transistors in the first group are in the unruptured state. Under this circumstance, the logic value "0" is determined as the one-bit random code. For example, n is an even number larger than or equal 4.

Similarly, after the enrolling action on the OTP memory cell c1 is completed, plural read actions are performed to determine a multi-bit random code. For example, the OTP memory cell c1 of the fourteenth embodiment comprises n antifuse transistors, wherein $n=2^X$. After plural read actions are completed and the storage states of the n antifuse transistors A1~An are confirmed, an X-bit random code is generated.

Similarly, plural OTP memory cells c1 of the fourteenth embodiment may be collaboratively formed as a memory array. The operations of the memory array are similar to those of FIGS. 24A~24C, and not redundantly described herein.

From the above descriptions, the present invention provides an OTP memory cell and a memory array for a PUF technology and an associated random generating method. When the OTP memory cell c1 undergoes an enroll action, all antifuse transistors receive the same predetermined voltage. Consequently, one of these antifuse transistors is changed to the ruptured state. When the OTP memory cell c1 undergoes a read action, the ruptured state of a specified antifuse transistor is confirmed and a random code is determined. Due to the process variation of the OTP memory cell c1, the gate dielectric layer of which antifuse transistor is ruptured during the enroll action cannot be realized. Consequently, the OTP memory cell c1 can utilize the PUF technology.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A memory array for a physically unclonable function technology, the memory array comprising a first memory cell, the first memory cell comprising:
   a first select transistor, wherein a first drain/source terminal of the first select transistor is connected with a first bit line, and a gate terminal of the first select transistor is connected with a first word line;
   a first antifuse transistor, wherein a gate terminal of the first antifuse transistor is connected with a second drain/source terminal of the first select transistor, and two drain/source terminals of the first antifuse transistor are connected with a first antifuse control line; and
   a second antifuse transistor, wherein a gate terminal of the second antifuse transistor is connected with a second drain/source terminal of the first select transistor, and two drain/source terminals of the second antifuse transistor are connected with a second antifuse control line,
   wherein when an enroll action is performed, the first memory cell is determined as a selected memory cell, the first select transistor is turned on, and a voltage stress is applied to a gate dielectric layer of the first antifuse transistor and a gate dielectric layer of the second antifuse transistor, so that one of the first antifuse transistor and the second antifuse transistor is changed from a first storage state to a second storage state, wherein when a read action is performed, a random code is determined according to a result of judging whether the first antifuse transistor of the selected memory cell is in the first storage state or the second storage state.

2. The memory array as claimed in claim 1, wherein the first memory cell comprises:
a first gate structure comprising a first gate dielectric layer and a first gate layer, wherein the first gate layer is connected with the first word line;
a first doped region and a second doped region, wherein the first doped region is connected with the first bit line, the first gate structure is arranged between the first doped region and the second doped region, and the first doped region, the second doped region and the first gate structure are collaboratively formed as the first select transistor;
a second gate structure comprising a second gate dielectric layer and a second gate layer;
a metal contact line connected with the second doped region and the second gate layer;
a third doped region and a fourth doped region connected with the first antifuse control line, wherein the second gate structure is arranged between the third doped region and the fourth doped region, and the third doped region, the fourth doped region and the second gate structure are collaboratively formed as the first antifuse transistor; and
a fifth doped region and a sixth doped region connected with the second antifuse control line, wherein the second gate structure is arranged between the fifth doped region and the sixth doped region, and the fifth doped region, the sixth doped region and the second gate structure are collaboratively formed as the second antifuse transistor.

3. The memory array as claimed in claim 1, wherein when the enroll action is performed, the first antifuse control line and the second antifuse control line receive an enroll voltage, the first word line receives a select voltage, and the first bit line receives a ground voltage, wherein the enroll voltage is equal to the voltage stress, so that one of the first antifuse transistor and the second antifuse transistor is changed from an unruptured state to a ruptured state.

4. The memory array as claimed in claim 1, wherein when the read action is performed, the first antifuse control line receives a read voltage, the second antifuse control line receives a ground voltage, the first word line receives a select voltage, and the first bit line receives the ground voltage, wherein when the read action is performed, a read current is generated in a region between the first antifuse control line and the first bit line, and the random code is determined according to the read current.

5. The memory array as claimed in claim 1, wherein the first select transistor has a first gate width and a first gate length, and a limited current outputted from the first select transistor is determined according to the first gate width and the first gate length, wherein when the enroll action is performed, an enroll current generated by the first memory cell is equal to or lower than the limited current of the first select transistor.

6. The memory array as claimed in claim 1, wherein the memory array further comprises a second memory cell, and the second memory cell comprises:
a second select transistor, wherein a first drain/source terminal of the second select transistor is connected with the first bit line, and a gate terminal of the second select transistor is connected with a second word line;
third antifuse transistor, wherein a gate terminal of the third antifuse transistor is connected with a second drain/source terminal of the second select transistor, and two drain/source terminals of the third antifuse transistor are connected with a third antifuse control line; and
a fourth antifuse transistor, wherein a gate terminal of the fourth antifuse transistor is connected with a second drain/source terminal of the second select transistor, and two drain/source terminals of the fourth antifuse transistor are connected with a fourth antifuse control line.

7. The memory array as claimed in claim 6, wherein the memory array further comprises a third memory cell, and the third memory cell comprises:
a third select transistor, wherein a first drain/source terminal of the third select transistor is connected with a second bit line, and a gate terminal of the third select transistor is connected with the first word line;
a fifth antifuse transistor, wherein a gate terminal of the fifth antifuse transistor is connected with a second drain/source terminal of the third select transistor, and two drain/source terminals of the fifth antifuse transistor are connected with the first antifuse control line; and
a sixth antifuse transistor, wherein a gate terminal of the sixth antifuse transistor is connected with a second drain/source terminal of the third select transistor, and two drain/source terminals of the sixth antifuse transistor are connected with the second antifuse control line.

8. A memory array for a physically unclonable function technology, the memory array comprising a first memory cell, the first memory cell comprising:
a first select transistor, wherein a first drain/source terminal of the first select transistor is connected with the first bit line, and a gate terminal of the first select transistor is connected with a first word line; and
n antifuse transistors connected with n antifuse control lines, respectively, wherein n is an even number larger than or equal to 4, and the n antifuse transistors comprise:
a first antifuse transistor, wherein a gate terminal of the first antifuse transistor is connected with a second drain/source terminal of the first select transistor, and two drain/source terminals of the first antifuse transistor are connected with a first antifuse control line;
a second antifuse transistor, wherein a gate terminal of the second antifuse transistor is connected with a second drain/source terminal of the first select transistor, and two drain/source terminals of the second antifuse transistor are connected with a second antifuse control line;
a third antifuse transistor, wherein a gate terminal of the third antifuse transistor is connected with a second drain/source terminal of the first select transistor, and two drain/source terminals of the third antifuse transistor are connected with a third antifuse control line; and
a fourth antifuse transistor, wherein a gate terminal of the fourth antifuse transistor is connected with a second drain/source terminal of the first select transistor, and two drain/source terminals of the fourth antifuse transistor are connected with a fourth antifuse control line,
wherein when an enroll action is performed, the first select transistor is turned on, a voltage stress is applied to gate dielectric layers of the n antifuse transistors, so that one of the n antifuse transistors is changed from a first storage state to a second storage state, wherein a random code is determined according to the antifuse transistors in the second storage state.

9. The memory array as claimed in claim 8, wherein the n antifuse transistors are classified into a first group and a second group, and the first group comprises (n/2) antifuse transistors, wherein after a single read action is performed, storage states of the (n/2) antifuse transistors in the first group are determined, wherein if the antifuse transistor in the second storage state belongs to the first group, a first logic value is determined as an one-bit random code, wherein if the antifuse transistor in the second storage state does not belong to the first group, a second logic value is determined as the one-bit random code.

10. The memory array as claimed in claim 8, wherein n=$2^X$, wherein after plural read actions are performed, the antifuse transistor of the n antifuse transistors changed to the second storage state is confirmed, and an X-bit random code is determined.

11. The memory array as claimed in claim 8, wherein the first memory cell comprises:
   a first gate structure comprising a first gate dielectric layer and a first gate layer, wherein the first gate layer is connected with the first word line;
   a first doped region and a second doped region, wherein the first doped region is connected with the first bit line, the first gate structure is arranged between the first doped region and the second doped region, and the first doped region, the second doped region and the first gate structure are collaboratively formed as the first select transistor;
   a second gate structure comprising a second gate dielectric layer and a second gate layer;
   a metal contact line connected with the second doped region and the second gate layer;
   a third doped region and a fourth doped region connected with the first antifuse control line, wherein the second gate structure is arranged between the third doped region and the fourth doped region, and the third doped region, the fourth doped region and the second gate structure are collaboratively formed as the first antifuse transistor;
   a fifth doped region and a sixth doped region connected with the second antifuse control line, wherein the second gate structure is arranged between the fifth doped region and the sixth doped region, and the fifth doped region, the sixth doped region and the second gate structure are collaboratively formed as the second antifuse transistor;
   a seventh doped region and an eighth doped region connected with the third antifuse control line, wherein the second gate structure is arranged between the seventh doped region and the eighth doped region, and the seventh doped region, the eighth doped region and the second gate structure are collaboratively formed as the third antifuse transistor; and
   a ninth doped region and a tenth doped region connected with the fourth antifuse control line, wherein the second gate structure is arranged between the ninth doped region and the tenth doped region, and the ninth doped region, the tenth doped region and the second gate structure are collaboratively formed as the fourth antifuse transistor.

12. The memory array as claimed in claim 8, wherein the first select transistor has a first gate width and a first gate length, and a limited current outputted from the first select transistor is determined according to the first gate width and the first gate length, wherein when the enroll action is performed, an enroll current generated by the first memory cell is equal to or lower than the limited current of the first select transistor.

13. A one time programming memory cell for a physically unclonable function technology, the one time programming memory comprising:
   a first select transistor, wherein a first drain/source terminal of the first select transistor is connected with a bit line, and a gate terminal of the first select transistor is connected with a word line; and
   n antifuse transistors coupled to a second drain/source terminal of the first select transistor, and gate terminals of the n antifuse transistors are respectively connected with n antifuse control lines, wherein n is an even number larger than or equal to 4,
   wherein when an enroll action is performed, the first select transistor is turned on, and a voltage stress is applied to gate dielectric layers of the n antifuse transistors, so that one of the n antifuse transistors is changed from a first storage state to a second storage state, wherein a random code is determined according to the antifuse transistor in the second storage state.

14. The one time programming memory cell as claimed in claim 13, further comprising:
   a first doped region;
   n gate structures formed beside the first doped region, wherein the n gate structure comprises a first gate structure, a second gate structure, a third gate structure and a fourth gate structure; wherein the first gate structure is connected with a first antifuse control line, the second gate structure is connected with a second antifuse control line, the third gate structure is connected with a third antifuse control line, and the fourth gate structure is connected with a fourth antifuse control line; wherein the first doped region and the first gate structure are collaboratively formed as a first antifuse transistor, the first doped region and the second gate structure are collaboratively formed as a second antifuse transistor, the first doped region and the third gate structure are collaboratively formed as a third antifuse transistor, and the first doped region and the fourth gate structure are collaboratively formed as a fourth antifuse transistor;
   a fifth gate structure, connected with the word line; and
   a second doped region and a third doped region, wherein the second doped region is connected with the bit line, the third doped region and the first doped region are contacted with each other, the fifth gate structure is arranged between the second doped region and the third doped region, and the second doped region and the third doped region and the fifth gate structure are collaboratively formed as the first selector transistor.

15. The one time programming memory cell as claimed in claim 14, wherein the third gate structure and the fourth gate structure are located at two corners of the first doped region.

16. The one time programming memory cell as claimed in claim 14, wherein the each of the second doped region and the third doped region has a first dopant concentration, and the first doped region has a second dopant concentration, and the first dopant concentration is different from the second dopant concentration.

17. The one time programming memory cell as claimed in claim 13, further comprises a second select transistor, wherein a first drain/source terminal of the second select transistor is connected with the bit line, and a gate terminal of the second select transistor is connected with the word line; and n antifuse transistors are coupled to a second drain/source terminal of the second select transistor.

18. The one time programming memory cell as claimed in claim 17, further comprising:
  n gate structures, wherein the n gate structure comprises a first gate structure, a second gate structure, a third gate structure and a fourth gate structure; wherein the first gate structure is connected with a first antifuse control line, the second gate structure is connected with a second antifuse control line, the third gate structure is connected with a third antifuse control line, and the fourth gate structure is connected with a fourth antifuse control line;
  a first doped region, a second doped region, a third doped region, a fourth doped region and a fifth doped region, wherein the first gate structure is arranged between the first doped region and the second doped region, the second gate structure is arranged between the second doped region and the third doped region, the third gate structure is arranged between the third doped region and the fourth doped region, and the fourth gate structure is arranged between the fourth doped region and the fifth doped region, wherein the first doped region and the second doped region and the first gate structure are collaboratively formed as a first antifuse transistor, the second doped region and the third doped region and the second gate structure are collaboratively formed as a second antifuse transistor, the third doped region and the fourth doped region and the third gate structure are collaboratively formed as a third antifuse transistor, the fourth doped region and the fifth doped region and the fourth gate structure are collaboratively formed as a fourth antifuse transistor;
  a fifth gate structure, connected with the word line; and
  a sixth doped region and a seventh doped region, wherein the sixth doped region is connected with the bit line, the seventh doped region and the first doped region are contacted with each other, the fifth gate structure is arranged between the sixth doped region and the seventh doped region, and the sixth doped region and the seventh doped region and the fifth gate structure are collaboratively formed as the first selector transistor;
  a sixth gate structure, connected with the word line; and
  an eighth doped region and a ninth doped region, wherein the ninth doped region is connected with the bit line, the sixth gate structure is arranged between the eighth doped region and the ninth doped region, and the eighth doped region and the ninth doped region and the sixth gate structure are collaboratively formed as the second selector transistor.

19. The one time programming memory cell as claimed in claim 17, wherein the second drain/source terminal of the first select transistor is coupled to the n antifuse transistors through a first switch transistor, the second drain/source terminal of the second select transistor is coupled to the n antifuse transistors through a second switch transistor, a gate terminal of the first switch transistor is connected with a switch control line, and a gate terminal of the second switch transistor is connected with the switch control line, wherein when the enroll action is performed, the first switch transistor and the second switch transistor are turned on.

20. The one time programming memory cell as claimed in claim 13, wherein the second drain/source terminal of the first select transistor is coupled to the n antifuse transistors through a first switch transistor, and a gate terminal of the first switch transistor is connected with a switch control line, wherein when the enroll action is performed, the first switch transistor is turned on.

21. The one time programming memory cell as claimed in claim 13, wherein the n antifuse transistors are classified into a first group and a second group, and the first group comprises (n/2) antifuse transistors, wherein after a single read action is performed, storage states of the (n/2) antifuse transistors in the first group are determined, wherein if the antifuse transistor in the second storage state belongs to the first group, a first logic value is determined as an one-bit random code, wherein if the antifuse transistor in the second storage state does not belong to the first group, a second logic value is determined as the one-bit random code.

22. The one time programming memory cell as claimed in claim 13, wherein $n=2^X$, wherein after plural read actions are performed, the antifuse transistor of the n antifuse transistors changed to the second storage state is confirmed, and an X-bit random code is determined.

* * * * *